(12) United States Patent
Sharma

(10) Patent No.: US 8,818,838 B1
(45) Date of Patent: Aug. 26, 2014

(54) SYSTEM AND METHOD FOR EFFICIENTLY DEVELOPING A HYPOTHESIS REGARDING THE STRUCTURE OF A MARKET

(75) Inventor: Alok Sharma, Glenview, IL (US)

(73) Assignee: Henry Rak Consulting Partners, LLC, Libertyville, IL (US)

( * ) Notice: Subject to any disclaimer, the term of this patent is extended or adjusted under 35 U.S.C. 154(b) by 910 days.

(21) Appl. No.: 12/547,953

(22) Filed: Aug. 26, 2009

Related U.S. Application Data

(60) Provisional application No. 61/159,680, filed on Mar. 12, 2009.

(51) Int. Cl.
*G06Q 10/00* (2012.01)
*G06Q 30/02* (2012.01)

(52) U.S. Cl.
CPC ........ *G06Q 30/0201* (2013.01); *G06Q 30/0202* (2013.01)
USPC ........................................ 705/7.29; 705/7.31

(58) Field of Classification Search
CPC .................. G06Q 30/0201; G06Q 30/0202
USPC ................................. 705/7.29, 7.31
See application file for complete search history.

(56) References Cited

U.S. PATENT DOCUMENTS

| | | | |
|---|---|---|---|
| 6,009,407 A * | 12/1999 | Garg ............................ | 705/7.25 |
| 6,687,705 B2 | 2/2004 | Agrawal et al. | |
| 6,708,156 B1 | 3/2004 | Gonten | |
| 6,928,434 B1 | 8/2005 | Choi et al. | |
| 6,990,485 B2 | 1/2006 | Forman et al. | |
| 6,996,560 B1 | 2/2006 | Choi et al. | |
| 7,177,851 B2 | 2/2007 | Afeyan et al. | |
| 7,188,069 B2 | 3/2007 | Hagelin | |
| 7,191,143 B2 | 3/2007 | Keli et al. | |
| 7,246,079 B2 | 7/2007 | Ando et al. | |
| 7,287,000 B2 | 10/2007 | Boyd et al. | |
| 7,689,456 B2 | 3/2010 | Schroeder et al. | |
| 7,711,596 B2 | 5/2010 | Cristol | |
| 2003/0154092 A1 | 8/2003 | Bouron et al. | |
| 2005/0091077 A1* | 4/2005 | Reynolds ...................... | 705/1 |
| 2005/0096963 A1 | 5/2005 | Myr et al. | |
| 2005/0189415 A1 | 9/2005 | Fano et al. | |
| 2005/0256844 A1* | 11/2005 | Cristol ........................... | 707/2 |
| 2006/0004622 A1 | 1/2006 | Fanelli et al. | |
| 2006/0026055 A1 | 2/2006 | Gascoigne et al. | |
| 2006/0085255 A1 | 4/2006 | Hastings et al. | |
| 2006/0143075 A1 | 6/2006 | Carr et al. | |
| 2006/0247956 A1 | 11/2006 | Rosen et al. | |

(Continued)

OTHER PUBLICATIONS

P.M. Cain, Modelling and forecasting brand share: A dynamic demand system approach. Intern. J. of Research in Marketing 22 (2005), 203-220.*

(Continued)

*Primary Examiner* — Timothy Padot
(74) *Attorney, Agent, or Firm* — Marshall, Gerstein & Borun LLP; Randall G. Rueth

(57) ABSTRACT

A method in a computer system for efficiently modeling a market corresponding to a set of competing products includes receiving product attribute selection data associated with the set of competing products from an interactive user interface, automatically generating a hierarchical market structure based on the received product attribute selection data, so that the hierarchical market structure is descriptive of hypothesized competitive relations within the set of competing products, and displaying a graphical representation of the hierarchical market structure on the interactive user interface.

12 Claims, 42 Drawing Sheets

(56) References Cited

U.S. PATENT DOCUMENTS

| | | | |
|---|---|---|---|
| 2007/0067213 | A1 | 3/2007 | Brown |
| 2007/0106550 | A1* | 5/2007 | Umblijs et al. ............ 705/10 |
| 2007/0143186 | A1 | 6/2007 | Apple et al. |
| 2008/0065471 | A1 | 3/2008 | Reynolds et al. |
| 2008/0235073 | A1 | 9/2008 | Cavander et al. |
| 2009/0018996 | A1* | 1/2009 | Hunt et al. ............... 707/2 |
| 2009/0216611 | A1 | 8/2009 | Leonard et al. |
| 2010/0057525 | A1 | 3/2010 | Wagner et al. |
| 2010/0106555 | A1 | 4/2010 | Mneimneh et al. |
| 2010/0106561 | A1 | 4/2010 | Peredriy et al. |
| 2010/0145793 | A1 | 6/2010 | Cavander et al. |
| 2010/0217650 | A1 | 8/2010 | Hartnell |

OTHER PUBLICATIONS

Baohong Sun et al., Measuring the Impact of Promotions on Brand Switching When Consumers Are Forward Looking, Journal of Marketing Research vol. XL (Nov. 2003), 389-405.*

Dillon et al., A Segment-level Model of Category Volume and Brand Choice. Marketing Science/vol. 15, No. 1, 1996, pp. 38-59.*

Sehoon Park et al., A hierarchical elimination modeling approach for market structure analysis, European Journal of Operational Research, vol. 111, Issue 2, Dec. 1, 1998, pp. 328-350.*

International Search Report and Written Opinion for Application No. PCT/US10/22265 dated Mar. 17, 2010.

International Search Report and Written Opinion for Application No. PCT/US10/22253 dated Mar. 16, 2010.

Bass, "The Theory of Stochastic Preferences and Brand Switching," Journal of Marketing Research, vol. 11, No. 1, Feb. 1974, pp. 1-20.

Herniter, "An Entropy Model of Brand Purchase Behavior," Journal of Marketing Research, vol. 10, No. 4, Nov. 1973, pp. 361-375.

Rao et al., "Inference of Hierarchical Choice Processes from Panel Data," The Journal of Consumer Research, vol. 8, No. 1, Jun. 1981, pp. 85-96.

Kannan et al., "On Testing Competitive Market Structures," Marketing Science, vol. 10, No. 4, Autumn 1991, pp. 338-347.

Uncles et al., "Patterns of Buyer Behavior: Regularities, Models, and Extensions," Marketing Science, vol. 14., No. 3, 1995, pp. 71-78.

Urban et al., "Testing Competitive Market Structures," Jun. 1981, 59 pages.

Ehrenberg et al., "The Switching Constant," Management Science, vol. 25, No. 7, Jul. 1979, pp. 703-705.

Edwards et al., "Multivariate Analysis of Multiple Response Data," Journal of Marketing Research, vol. XL, Aug. 2003, pp. 321-334.

Shannon, "A Mathematical Theory of Communication," The Bell System Technical Journal, vol. 27, Jul., Oct. 1948, 55 pages.

"Information entropy," Wikipedia, 11 pages.

"Claude Shannon," http://www.nyu.edu/pages/linguistics/courses/v610003/shan.html, 5 pages.

"Claude Shannon," Wikipedia, 8 pages.

Hyman, "MGTG 620: Marketing Models Final Set of Review Questions," http://buisness.nmsu.edu/~mhyman/m620qst.htm, Dec. 27, 1999, 9 pages.

International Preliminary Report on Patentability for Application No. PCT/US2010/022265 dated Sep. 13, 2011.

International Preliminary Report on Patentability for Application No. PCT/US2010/022253 dated Sep. 13, 2011.

Urban et al., "Market Entry Strategy Formulation: A Hierarchical Modeling and Consumer Measurement Approach," Dec. 1979, 104 pages.

Office Action for U.S. Appl. No. 12/547,971 issued Mar. 5, 2012.

Office Action for U.S. Appl. No. 12/547,991 issued Mar. 29, 2012.

Office Action for U.S. Appl. No. 12/547,983 issued Dec. 23, 2011.

Final Office Action for U.S. Appl. No. 12/547,983 dated Jul. 5, 2012.

Office Action for U.S. Appl. No. 12/547,971 dated Jul. 3, 2012.

Chaudhuri et al., "The Chain of effects From Brand Trust and Brand Affect to Brand Performance: the Role of Brand Loyalty," Journal of Marketing, vol. 65, Apr. 2001, pp. 81-93.

Balachandra et al., "Factors for Success in R&D Projects and New Product Innovation: A Contextual Framework," IEEE Transactions on Engineering Management, vol. 44, No. 3, Aug. 1997, pp. 276-287.

Neelamegham et al., "A Bayesian Model to Forecast New Product Performance in Domestic and International Markets," Marketing Science, vol. 18, No. 2, 1999, pp. 115-136.

* cited by examiner

FIG. 15

Frequencies

- HHID (Household ID)
- Date (Purchase Date)
- Module (Category)
- Brand (Brand Name)
- Vendor (Vendor)
- Manuf (Manufacturer)
- Flavor (Product Flavor)
- Form (Product Form)
- Style (Product Style)
- UPC (UPC Code)
- Fage (Female Age)
- Mage (Male Age)
- Kids (Number Children)
- Income (HH Income)

| ID | Brand Name | Count | Distribution |
|----|------------|-------|--------------|
| 1 | Pepsi | 2,000 | 17% |
| 2 | Diet Pepsi | 3,000 | 25% |
| 3 | Coke | 1,500 | 12% |
| 4 | Diet Coke | 1,000 | 8% |
| 5 | RC | 500 | 4% |
| 6 | Diet RC | 250 | 2% |
| 7 | Private Label Cola | 1,750 | 14% |
| 8 | Diet Private Label Cola | 2,100 | 17% |

Refresh  Export  Close

SYSTEM AND METHOD FOR EFFICIENTLY DEVELOPING A HYPOTHESIS REGARDING THE STRUCTURE OF A MARKET

CROSS-REFERENCE TO A RELATED APPLICATION

This application claims the benefit of U.S. Provisional Patent Application No. 61/159,680, entitled "Strategic Market Modeling and Planning" filed Mar. 12, 2009, the disclosure of which is hereby expressly incorporated herein by reference.

TECHNICAL FIELD

The following disclosure relates to consumer behavior and, more particularly, to a software module for modeling and testing theoretical market structures.

BACKGROUND

To successfully market products and services, manufacturers and distributors must make numerous technical and financial decisions related to technical and financial factors. In particular, these manufacturers and distributors, referred to hereinafter as "marketers," must appropriately set prices when introducing new products, properly brand these new products, select effective packaging, size, and other visual attributes, choose optimal geographic areas for introducing new products, etc. Additionally, markets must allocate reasonable amounts of resources (e.g., money, personnel) to advertisement, as well as properly select the timing and duration of consumer and trade promotions. Although these decisions are relevant in marketing of both existing and new products, the difficulties of introducing products into a market are particularly severe. According to some studies, as much as 99% of new products in the food industry fail within one year of introduction.

For these reasons, marketers must understand the underlying dynamics of the markets in which products and services compete. These dynamics may be understood in terms of the structure of the market and the consumer switching tendencies (i.e., trends in purchasing or using one product instead of another). The structure of a market may, in turn, correspond to what consumers consider to define a particular set of choices for a potential purchase. Products and services accordingly compete within a particular set of choices in view of various factors such as perceived quality, price, overall attractiveness, etc. In other words, the general perception of which products and services compete with each other and which substitutions are possible defines the landscape of competition.

Traditionally, marketers, investors, economists, and other observers have relied on econometric modeling, consumer surveys, and tracking purchases over time to understand market dynamics. However, each of these approaches yields only a very a limited understanding of the market. Using an econometric approach, for example, observers analyze the impact of the manufacturers' commercial activities on the share price or the sales volume. In accordance with econometric theories, it is possible to measure the impact of a particular sales promotion and derive data from these measurements useful in planning the future strategy. However, this approach is largely unsuitable in situations that involve multiple product categories, hundreds of brands, and/or large numbers of stock keeping units (SKUs).

On the other hand, some marketers collect consumer survey data to determine how the consumers view a particular market. A written, online, or an oral survey may ask, for example, whether the consumer considers a certain item to be a potential replacement for another item, and how close the consumer considers the two items to be. The surveys thus seek consumers' opinions regarding the structure and, to some extent, the mechanics of competition. However, consumer surveys frequently are very superficial generally fail to reflect actual switching behavior. Further, surveyed consumers typically respond to only a subset of relevant factors such as visual characteristics, for example, and may not have access to other factors affecting switching such as taste.

In accordance with another known approach, marketers track consumer behavior over a certain period of time. Inherent in this approach is the premise that a user will switch to other items according to the way he or she mentally defines the set of competing items. However, it is impossible to know from this data whether the switching is due to direct substitution (e.g., one make of a car instead of another) or a complementary relationship (e.g., purchasing a car instead of using mass transit). In most industries, the differences tend to be evolutionary and small, and precision is therefore a critical requirement.

Thus, most known techniques are largely based either on guesswork or on a trial-and-error approach. These techniques generally fail to yield correct understanding of how products and services complete, particularly in densely saturated markets such as the soft drink market, for example, in which manufacturers offer hundreds of brands in a variety of flavors, sizes, types of packaging, etc.

Recently, attempts have been made to apply advanced statistical methods to model markets and ultimately improve the quality of predictions. In particular, hierarchical models of market segmentation provide a structured view of a particular market. A hierarchical model describes the market as a nested structure having one or several items within a partition on a particular level, with a further restriction that any one item belongs to only one partition at a given level. The hierarchical modeling approach stipulates that switching is more probable among items that belong to the same partition.

Some theories of hierarchical modeling propose a probabilistic view of brand switching and assert that for directly competing brands (i.e., brands within the same market partition), the level of switching among these brands is proportional to the product of the respective market shares of these brands. Further, some of these theories postulate that the exact level of switching between brands (sometimes referred to as the "proportionality constant") is the value that maximizes the randomness of information related to brand shares, i.e., entropy of the system. In other words, techniques consistent with such theories of hierarchical modeling attempt to predict how often consumers will switch between items within a certain partition given the specific market shares of these items.

Applying a hierarchical model, marketers attempt to develop a comprehensive view of the competitive framework. However, while the market share of a particular item may be relatively easy to obtain from the sales data available for the item and the competing items, placing the item within the hierarchical structure is a matter of hypothesizing a certain market structure. As a result, many of the problems discussed above such as subjective assessment of competitive sets, for example, persist in hierarchical modeling.

Moreover, to the extent that software tools support hierarchical modeling at all, these tools lack the convenience of user interface that is essential in modeling complicated multi-attribute and multi-brand markets. Some statistical and mathematical tools, for example, offer a text-based interface that requires that the user master a number of relatively complicated commands to define and test market structures. Further, the available tools lack the flexibility required for accurate prediction of consumer behavior.

SUMMARY

In one aspect, the system and method for modeling market structures and predicting consumer behavior allows users such as marketers, business analysts, or economists to efficiently construct a hypothesis regarding the structure of a particular market and apply the analytical functionality of the system to generate prediction data. In some embodiments, the prediction data may include expected switching rates among items or groups of items within the specified hypothetical structure. The system and method further allows the user to assess the quality of the hypothetical structure by applying empirical data to the prediction data to determine the degree of proximity between the predicted and actual data. In an embodiment, the system may receive the empirical data from one or several distributors.

In an embodiment, a user interacts with the software system executing on a standalone or network host to define item attributes and associate each of a plurality of items with a respective one or several item attributes. The software system may provide a convenient graphical user interface to select item attributes and associate these attributes with items using a simple drag-and-drop function. Additionally, the user interface may allow users to construct Boolean or other logic expressions to specify inclusion or exclusion of certain attributes. In some embodiments, the system may receive attribute definitions in form of data files specifying the manner in which the household data should be interpreted. The attribute definition data may indicate, for example, the type of information supplied as part of household data files and the positioning of informational elements within the household data files.

In some embodiments, the software system includes an analytical engine that supports a probabilistic hierarchical model of a market. The analytical engine calculates or estimates brand switching between items based on market shares of these products and, in at least some cases, relies on entropy maximization in calculating brand switching. The software system then uses these results to assess brand loyalty, purchasing behavior, price elasticity, brand preference in a multi-brand environment, and measurement of brand substitution and brand competition. In some embodiments, the software system provides additional flexibility to hierarchical modeling by allowing the user to adjust various constants for all or some categories or partitions.

In one aspect, the software system enables users to evaluate the impact of marketing and sales strategies on the market structure by adjusting spending targets. In an embodiment, the software system allows the user to adjust consumer promotion spending independently from trade promotion spending, and dynamically apply the adjusted spending targets to the structure. Additionally, the user may adjust one or several price attributes for a selected item. In response to detecting changes in these or other parameters, the software system may efficiently re-calculate previously generated data such as predicted switching rates. In some embodiments, the software system may highlight or apply another visual indicator to the displayed parameters affected by the user's adjustment in price, spending, etc. In this manner, the user may easily manipulate one or several parameters and observe the expected impact on the market in real time.

In another aspect, the method allows the user to determine whether a certain product competes with one or several other specified products. In particular, the method allows the user to efficiently construct a hypothesis that specifies the placement of the product relative to a set of products and compare the hypothesis to empirical data. To this end, the software system provides a convenient interface to create nested partitions and various levels of the market structure, place items into the desired locations in the market structure, save and subsequently retrieve saved structures, visually demarcate partitions and levels of the market structure, etc.

In yet another aspect, the system and method enable the user to deter mine the impact of introducing a new product to the market, e.g., determine with which items the new product will compete, what level of spending is likely to produce the best commercial result, which price of the new product will maximize profits, etc. The user may select the level and segment to which the new product is introduced, select and easily modify the price, specify distribution options, and easily manipulate other parameters. Further, the software system allows the user to perform multi-year planning and otherwise incorporate time factors into the model.

In some embodiments, the software system may calculate and graphically display optimal spending curves. In particular, the software system enables the user to graph consumer promotion spending, trade promotion spending, or a combination thereof. In an embodiment, the software system calculates optimal spending parameters in view of the placement of the new product relative to the existing market structure. In some embodiments, the system applies different criteria to products entering the market as line extensions, new brands, new partitions, etc. In another aspect, the software system allows user to model specific markets characterized by a particular degree of loyalty.

In at least some of the embodiments, a method for providing strategic modeling and integration of internal corporate data (financial data, sales data, inventory data) with syndicated (e.g., household) data includes providing a convenient and efficient user interface for developing a hypothetical market structure, applying the syndicated data to the market structure, and assessing the quality of the model using various statistical methods.

In some embodiments, a method in a computer system for efficiently modeling a market corresponding to a set of competing products includes receiving product attribute selection data associated with the set of competing products from an interactive user interface, automatically generating a hierarchical market structure based on the received product attribute selection data, such that the hierarchical market structure is descriptive of hypothesized competitive relations within the set of competing products; and displaying a graphical representation of the hierarchical market structure on the interactive user interface.

In other embodiments, a modeling tool stored on a computer-readable medium and adapted for implementation by a processor for developing an hierarchical model of a market associated with a set of competing products, such that the hierarchical model is stored as data in a computer readable memory, includes an item definition module stored as a first set of instructions on the computer-readable medium that executes on the processor to provide a first display interface, to receive item definition data from a user via the first display interface, and to generate a plurality of items for use by the modeling tool, where the item definition data includes, for each item, one or more product attributes associated with the item; and a structure definition module stored as a second set of instructions on the computer-readable medium that executes on the processor to provide a second display interface and to receive item selection and positioning data associated with the plurality of items from the user via the second display interface, and which further executes on a processor to create the hierarchical model defining a plurality of nodes at a multiplicity of levels successively removed from a root node using the received item selection and positioning data and to generate a graphical representation of the hierarchical model on the second display interface.

In yet other embodiments, a method in a computer system for efficiently developing a hierarchical structure representing interaction of products within a competitive set, so that the hierarchical structure is stored as data on a computer-readable medium and includes a plurality of nodes at a multiplicity of levels, includes providing a listing of a plurality of items at an interactive user interface, where each item is associated with at least one product attribute; displaying a first version of the hierarchical structure via the interactive user interface; receiving a selection of one of the plurality of items from the interactive user interface; receiving a selection of a position within the hierarchical structure from the interactive user interface; creating a new node at the selected position; automatically linking the new node to the hierarchical structure at the selected position to thereby generate a second version of the hierarchical structure; and displaying the second version of the hierarchical structure via the interactive user interface.

BRIEF DESCRIPTION OF THE DRAWINGS

FIG. 15 is an example output of a frequency module which the system of FIG. 1 may provide to the user as part of data diagnostics.

FIG. 16 is an example output of a validation module which the system of FIG. 1 may apply to a selected market structure.

FIGS. 17A and 17B illustrate additional example outputs of the structure analysis module.

FIG. 25 illustrates an example of an interface the system of FIG. 1 may provide to a user for simultaneously analyzing parameters of multiple items.

DETAILED DESCRIPTION

Figure 1:
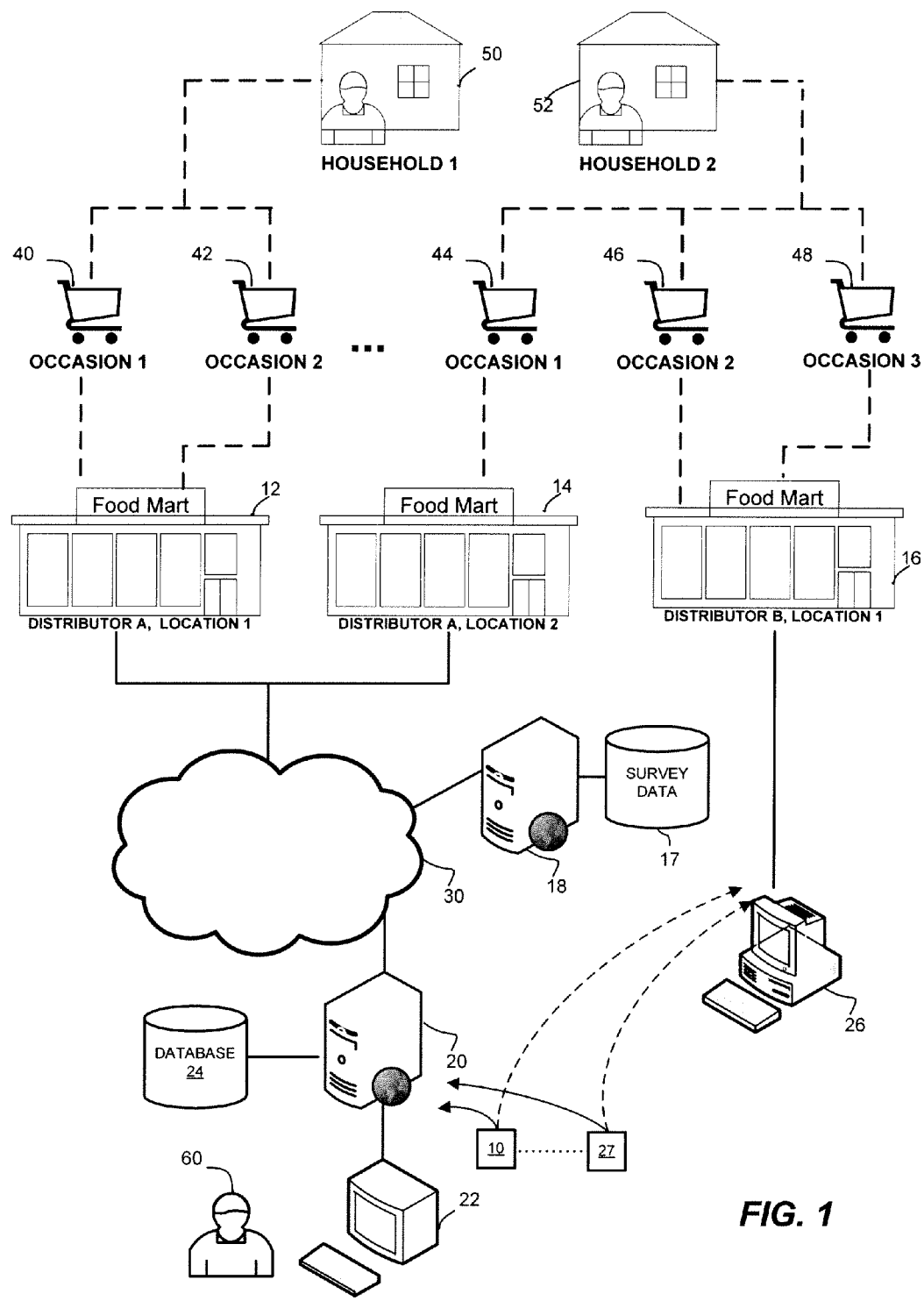
FIG. 1 illustrates an example market environment in which multiple households purchase consumer products through one or several distributors that, in turn, collect and supply syndicated consumer data to a system for modeling and testing market structures according to the teachings of the present disclosure.

FIG. 1 illustrates a modeling and simulation software system 10 that interacts with several suppliers of syndicated data 12, 14, and 16. Each of the suppliers 12-16 may be, for example, a supermarket store collecting consumer transaction data via so-called preferred cards, store-specific credit cards, or other methods of identifying consumers during a check-out procedure. In general, a supplier 12-16 could be any kind of a merchant selling products or services in a physical store or online. Further, as illustrated in FIG. 1, the suppliers 12 and 14 may be different locations of the same merchant such as a supermarket franchise while the supplier 16 may be a single distributor of a certain product, for example. If desired, the system 10 may provide additional analysis of household data to the merchant associated with the suppliers 12 and 14 to determine regional variations in sales and other location-dependent factors.

The software system 10 may also obtain survey data from a consumer survey database 17 via a provider 18. In contrast to syndicated data collected from the suppliers 12-16, consumer survey data may be indicative of why consumers purchase particular items and what choices they make when purchasing these items, for example. A typical survey question may ask whether the respondent buys a certain food item for lunch or dinner, and the respondent's answer accordingly helps the software system 10 to identify the use of the item. More specifically, the software system 10 may use this information to estimate with which products the item competes in general or in a particular geographic region, during a particular time of day, during a particular season, etc. It will be noted that at least some of the information in a typical survey is, in principle, inaccessible through syndicated data alone. Accordingly, the software system 10 may operate with both syndicated data and survey data to accurately analyze consumer behavior. However, some of the functionality of the software system 10 may be focused exclusively on syndicated data, whereas some of the other functionality may be focused exclusively on survey data.

The software system 10 may be implemented in one or several of a web server 20, a host 24 communicatively connected to the web server 20, and a database 24, in a non-distributed or distributed manner. Additionally or alternatively, a partial or complete version of the software system 10 may execute on a computer 26. The computer 26 may be a standalone computer or, as illustrated in FIG. 1, the computer 26 may be connected to a local area network of a particular distributor. In the latter case, the software system 10 may be used exclusively by the supplier 16 to only process data related to the merchant associated with the supplier 16. Depending on the particular embodiment or configuration of the system 10, the suppliers 12-16 may supply syndicated data to the system 10 via a network 30, on a physical medium such a CD-ROM or a DVD, or using any other suitable method.

The software system 10 may also interact with a statistical analysis system 27 that may be centralized or distributed software that executes on the web server 20 and/or the host 24. In some embodiments, the system 27 may be PASW or SPSS developed by SPSS Inc. or SAS developed by SAS Institute, for example. To perform initial analysis, users may utilize the system 27 to apply standard statistical techniques such as chaid or cluster analysis to syndicated and survey data. The software system 10 may then be used to develop and test purchase structures.

In certain situations, the software system 10 may process syndicated and/or survey data to prepare the data for use by the system 27. Analysis may use the software system 10 to identify and model key metrics of consumer behavior which may then be applied to a standard statistical tool such as the system 27. For example, one of the parameters recognized by the SPSS software is distance between items. The software system 10 may provide a behavioral metric (e.g., a quantitative measure of how closely a certain item competes with another item within a particular defined competitive set) based on a purchase structure, for example. This behavioral metric may be automatically or manually provided to the software system 27 as the distance-between-items parameter following an analysis of syndicated and/or survey data with the software system 10.

To continue with the example of supermarkets illustrated in FIG. 1, each supplier 12-16 may collect and organize syndicated data by processing register check-out occasions 40-48. A typical occasions 40-48 corresponds to a multiple transactions (e.g., a purchase of several items), although occasions having only one transaction are also possible. Further, each occasion 40-48 is associated with a particular supplier 12-16 and a household having one or more consumers. In the particular example illustrated in FIG. 1, the occasions 40 and 42 associated with the household 50 occurred at the supplier 12, the occasion 44 associated with the household 52 occurred at the supplier 14, and the occasion 46 and 48 also associated with the household 52 occurred at the supplier 16. Because the suppliers 12 and 14 may be two franchises of the same merchant, each of the occasions 40-48 preferably identifies both the merchant and the location. Further, the occasions 40-48 may include a timestamp to enable trending of consumer behavior over time, as well as proper calculation of switches from one brand to another over a certain period of time.

To take one specific example, each of the occasions 40-48 may include a purchase of a non-alcoholic beverage, referred to hereinafter as a "soft drink." The occasion 40 may include the purchase of a two-liter plastic bottle of a diet carbonated cola drink of a brand A, the occasion 42 may include the purchase of two two-liter plastic bottles of a similar diet cola drink of brand B, and each of the transactions 44-48 may include the purchase of a six-pack of 12-ounce metal cans of an orange-flavored drink of brand C and a half-gallon plastic jug of orange juice. Thus, a certain soft drink market may be considered to include at least brand A, B, and C, with the additional variations within each brand according to the size, packaging, diet variation, and flavor of the drink.

Figure 1A:
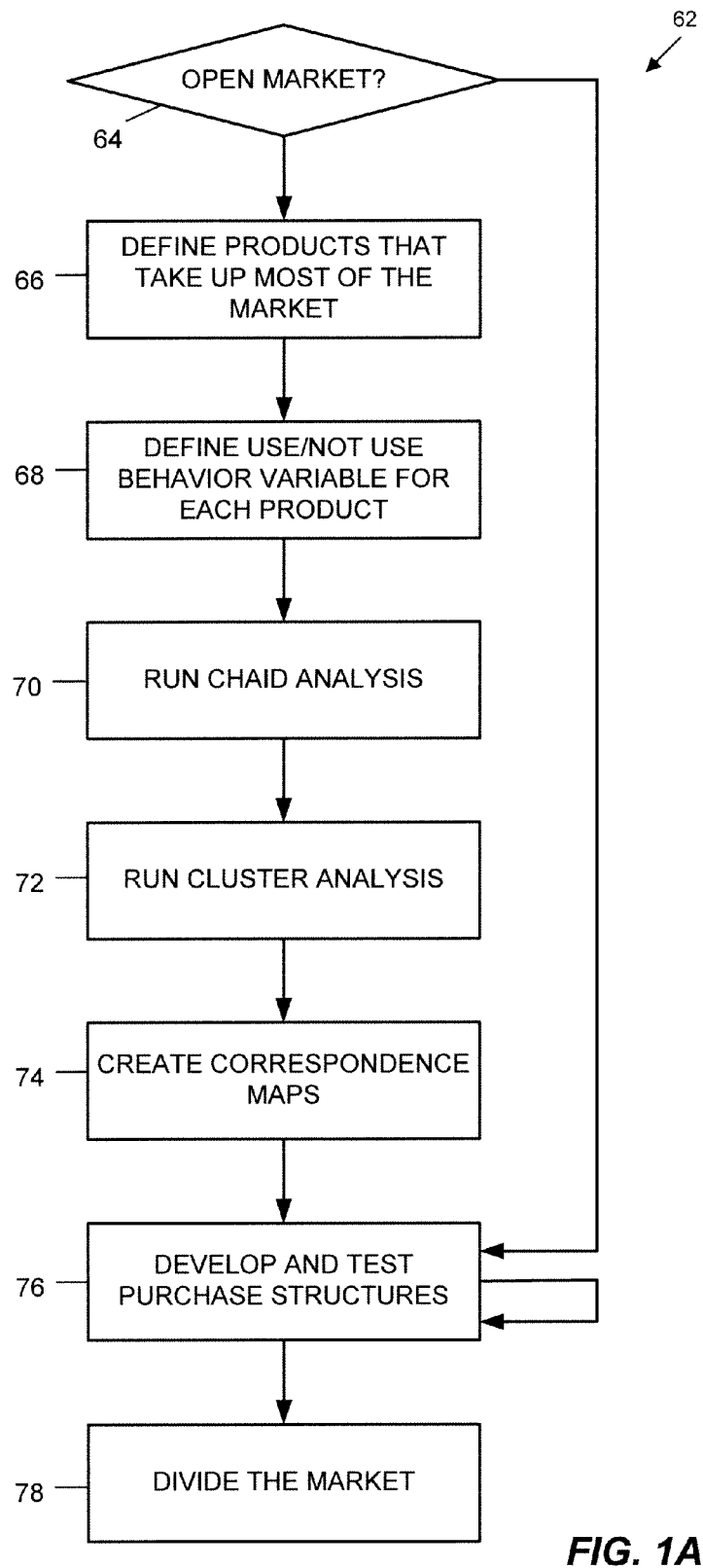
FIG. 1A is a flow chart of a general algorithm for analyzing market and product categories using the system of FIG. 1.

In operation, a user 60 (also referred to herein as "the analyst") may use the modeling and simulation software system 10 to analyze usage behavior and purchase behavior, i.e., conduct usage domain analysis and purchase domain analysis, respectively. FIG. 1A illustrates a flowchart of an algorithm 62 for analyzing a certain market, with at least some of the steps performed automatically by the software system 10 (alone or in cooperation with the system 27). As an initial matter, the user may assess the market to which the inquiry and the available generally pertains to determine whether usage domain analysis is necessary (block 64). For example, diaper products may be considered to define a relatively closed set because diapers have a well-known, specific use. By contrast, hot dogs do not necessarily define a clear set because a certain hot dog product may conceivably compete with other hot dog products, hamburgers, picnic foods, and food products in general. The user may thus choose to perform certain initial analysis prior to developing purchasing structures as a part of purchase domain analysis.

Generally speaking, usage domains are primarily related to how consumers use purchased products. Usage domain analysis may be directed to occasions on which products are used (e.g., is a particular food item consumed mostly for lunch or dinner?), locations where products are used, purposes for which products are purchased, etc. In this sense, usage domain analysis is situation-driven. As discussed in more detail in reference to FIGS. 28 and 29, a usage domain is associated with principles for organizing markets, and accordingly involves a benefit hierarchy that extends across product categories.

In one aspect, usage domain methodology supported by the software system 10 provides a platform for integrating behaviors and attitudes to allow users to understand situational contexts and the impact of situational contexts of functional and emotional benefits. In another aspect, usage domains focus on individual perspective rather than household averages to ultimately support more effective marketing.

On the other hand, purchase structures focus on brand/product benefit hierarchy within a product category. During purchase domain analysis, household needs (e.g., pack size, variety) and retail conditions (channel, deal, etc.) are considered. In contrast to a usage domain, a purchase domain is associated with principles for organizing categories, segments, brands, etc. and involves a benefit hierarchy within a particular category.

With continued reference to FIG. 1A, a set of products that lead to, for example, 70-80% of market usage may be defined in block 66. Next, in block 68, a "use/not use" behavior variable may be defined for each of the products defined in block 66. The software system 10, alone or in cooperation with the software system 27, may run CHAID analysis against the defined behavior variables (block 70). In some embodiments, CHAID analysis may focus on the "5 Ws," i.e., the framework of questions targeted at identifying product usage domains. To consider a food product as an example, the 5 Ws include the questions of what is being eaten; who is eating the product (e.g., a person of what age, gender?); why the person is eating the product (e.g., a comfort meal?); when the product is being eaten (e.g., what time of day? Formal or informal setting?); and where the product is being eaten (e.g., in a restaurant? At home?). In general, there may be a larger number of possible drivers of behavior (people-related, benefit-related, occasion-related, etc.) that defines an even larger number of permutations, and CHAID analysis enables analysts to reduce the set to a smaller number of relatively significant variables. Using the results of CHAID analysis, i.e., a set of identified key drivers of consumer behavior, the user 60 may create profiles of products and brands and conduct cluster analysis 72.

Next, the software system 10 may be used to create correspondence maps in block 74. In block 76, the user 60 may operate the software system 10 to develop hypothesized purchase structures and test the hypotheses by comparing the developed structures to actual data. The development and testing of purchase structures is discussed in detail below. In block 78, the user 60 may use the results of testing to divide the market into several parts including as a complementary market (characterized by higher predicted switching than confirmed by actual data) a substitute market (characterized by a close match between predicted and actual switching).

Figure 2:
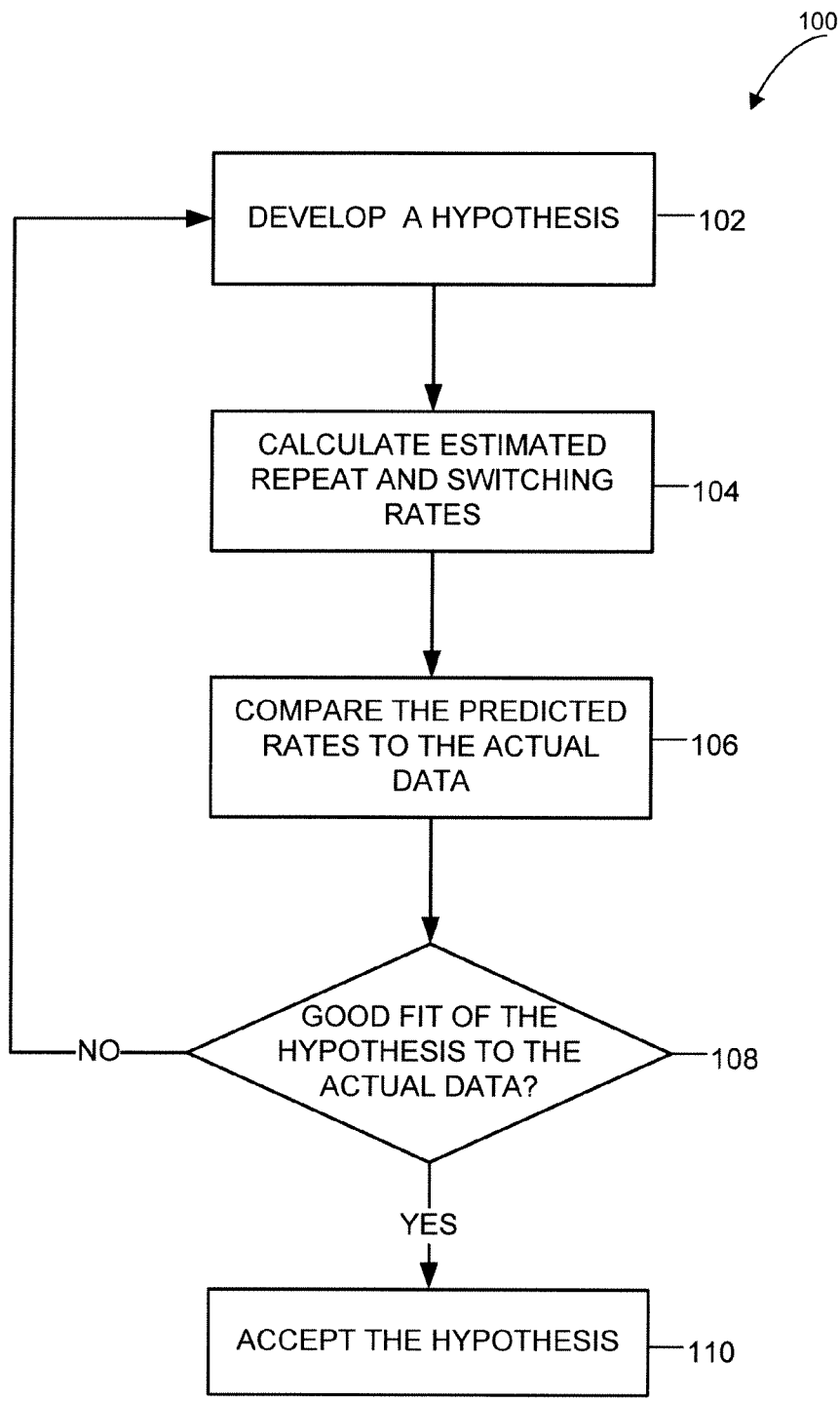
FIG. 2 is a flow chart of a general algorithm for developing and testing a hypothesis regarding the structure of a particular market.

Specifically with respect to purchase structures, the user 60 may use the modeling and simulation software system 10 to create a hypothetical structure of a market M including the brands A, B, and C (see FIG. 2). In many cases, the user 60 may be an analyst who has various assumptions about the particular market she attempts to model. Depending on the user's 60 current understanding of the dynamics of the market M, the user 60 may assign the brands A-C to the first level of the hierarchy and nest the other attributes within each of the brand categories A-C. In particular, the user 60 may associate the diet and non-diet varieties of each of the brands A-C with the second level of the hierarchy, the flavors with the third level so that several flavors are nested within each of the diet and non-diet categories, etc. Thus, according to such model, a consumer would first consider the brand name; having selected the desired brand of the soft drink, she would select a diet or non-diet variants; upon the selection of the brand of the diet or non-diet drink, she would proceed to choosing the flavor, etc. Alternatively, the user 60 could define a different structure in which the selection proceeds from flavor to brand and only then to diet and non-diet variants. In either case, the user 60 would typically define the structure of the market M as a hypothesis only, with the expectation of later adjusting the hypothesis in view of test results and various statistical analysis discussed below.

Having defined a hypothetical structure (block 102), the user 60 may use the system 10 to generate expected repeat and switch rates in accordance with a predefined or selected algorithm such as a particular hierarchical entropy maximization model, for example, which stipulates that the rate of switching is proportional to the market shares of items (block 104). As discussed in more detailed below, the user 60 may additionally manipulate various parameters via visual and textual controls in order to account for category specificity (e.g., to specify low-involvement categories such as cigarettes or high-involvement categories such as cereals), validate the structure to identify inconsistencies, etc.

The user 60 may then instruct the system 10 to obtain the syndicated data from the suppliers 12-16 to assess the quality of the structure. In another embodiment, the system 10 may include a background task that automatically collects syndicated data from the suppliers 12-16 as the data becomes available, or at predetermined intervals. In yet another embodiment, the user 60 may construct a hypothesis regarding the structure of the market M only after receiving at least some of the syndicated data and viewing the list of available brands and other attributes. In either case, the user may utilize the analytic functionality of the system 10 to determine how well real-life data corresponds to the constructed model (blocks 106 and 108), adjust the model if necessary, and apply the data again. In this manner, the user 60 may iteratively adjust the structure until the structure closely matches the empirical data (block 110).

Figure 3:
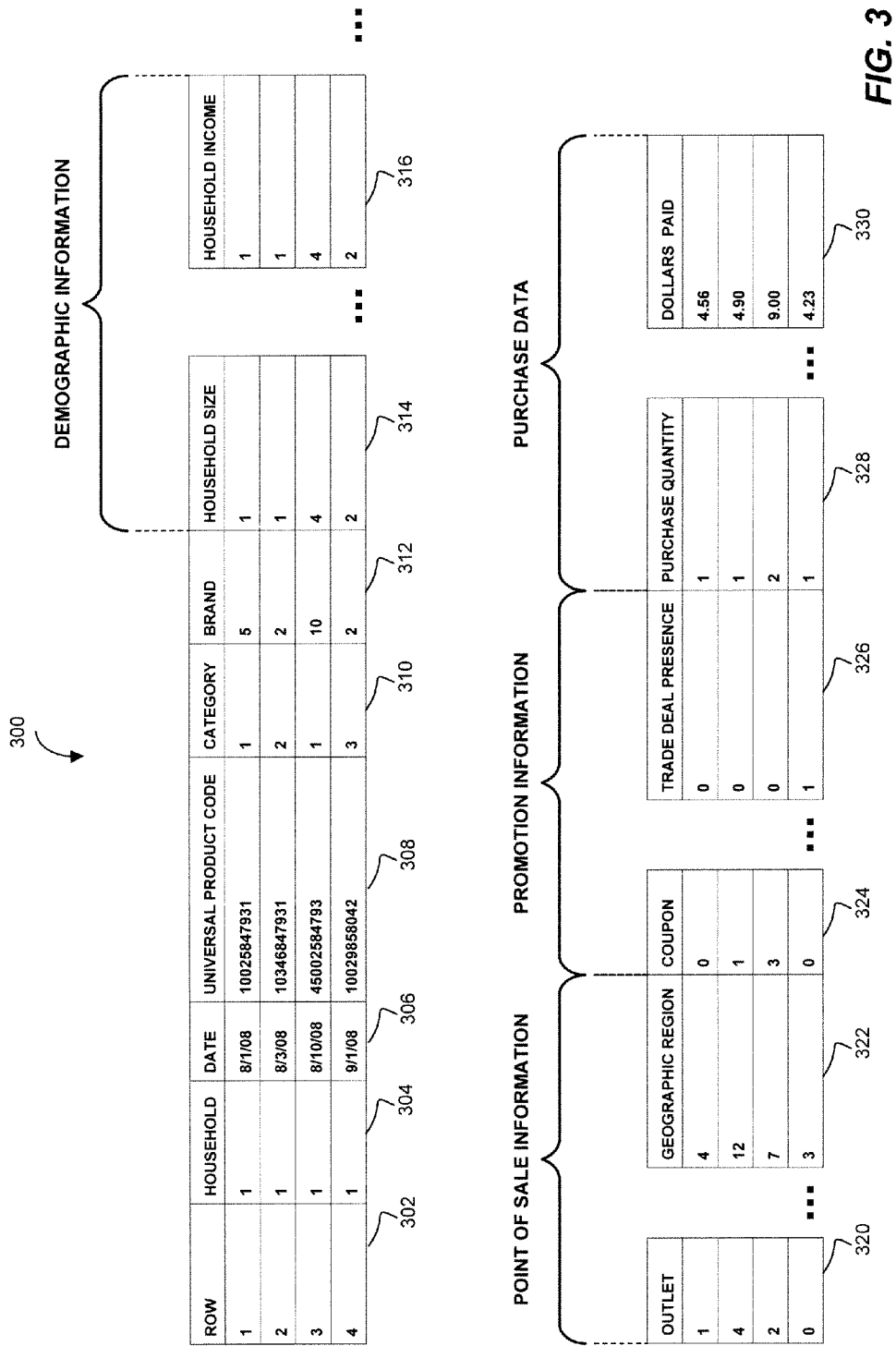
FIG. 3 is a sample format of syndicated data used by the system illustrated in FIG. 1.
Figure 4:
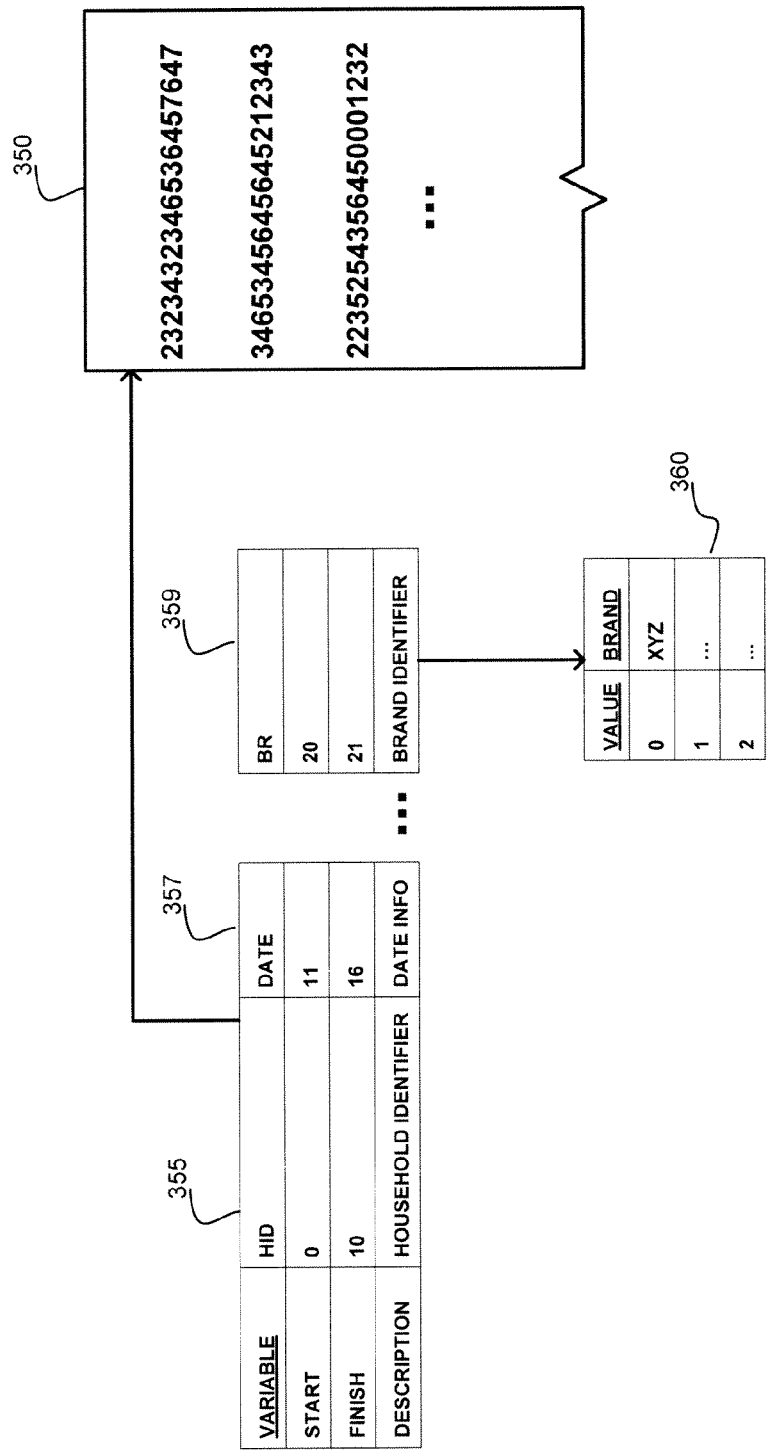
FIG. 4 illustrates an example of a data file and a dictionary or layout file used by the system illustrated in FIG. 1.
Figure 5:
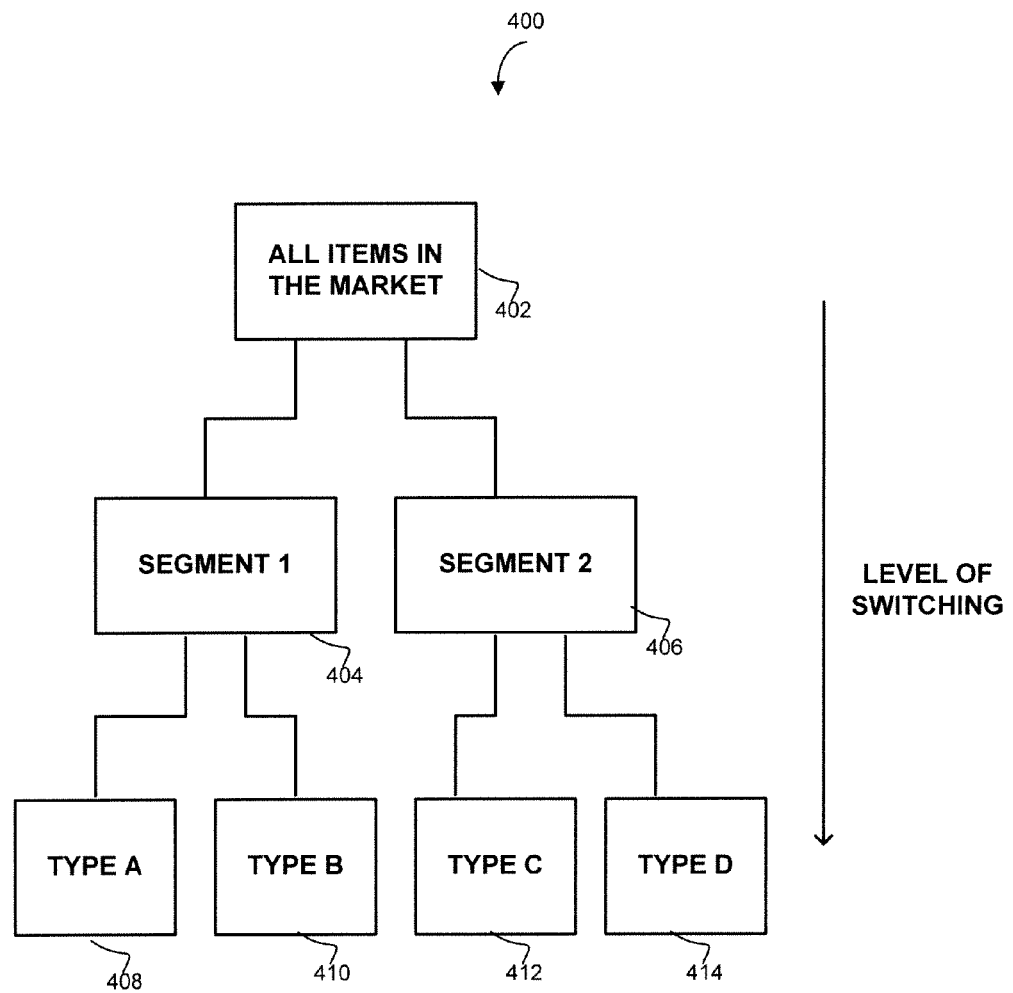
FIG. 5 schematically illustrates a general market structure to which the algorithm illustrated in FIG. 4 may apply.

Several teems and phrases used herein to describe the system 10 will be explained next, followed by a discussion of various components of the system 10 with reference to FIG. 2A. FIGS. 3-4 then illustrate various demographic, geographical, and temporal attributes of the syndicated data which the suppliers 12-16 may provide to the system 10. Several general aspects of developing and testing hypothetical market structures will be discussed in references to FIG. 5-9.

As used herein, "consumer" refers to a household or individual whose switching behavior the user 60 may analyze using the system 10. One of ordinary skill in the art may also refer to consumers as buyers or users; in a survey setting, the consumer may be known as a respondent; in certain industry-specific contexts, consumers may also be known as eaters, for example. Further, consumer data may be understood as a collection of "transactions" which may correspond to the atomic level of records. Several transactions occurring together and forming a data unit may be referred to as "an occasion." Referring back to FIG. 1, the occasion 40 in this example is a purchase of multiple groceries by the household 50, each of the groceries possibly but not necessarily defining an individual transaction.

An "item" is an individual stock keeping unit (SKU) or a logical grouping of several SKUs. An "item set" is a set of competing products in a particular analysis. Further, a "switch" refers to a comparison of usage or purchase behavior on subsequent occasions. In the general sense, a switch may include a purchase or use of the same product, although in most cases a switch includes a purchase of a product by a consumer who previously purchased a competing product. The first purchase or use of a new product by a consumer is referred to herein as "a trial," and the second purchase or use of the product by the same consumer is "a repeat." Further, "an additional repeats" may be an additional purchase or use, e.g., a second repeat, a third repeat, etc. A "competitive set" refers to a group of items viewed as mutually competing for the purposes of a certain analysis.

System Overview

Figure 2A:
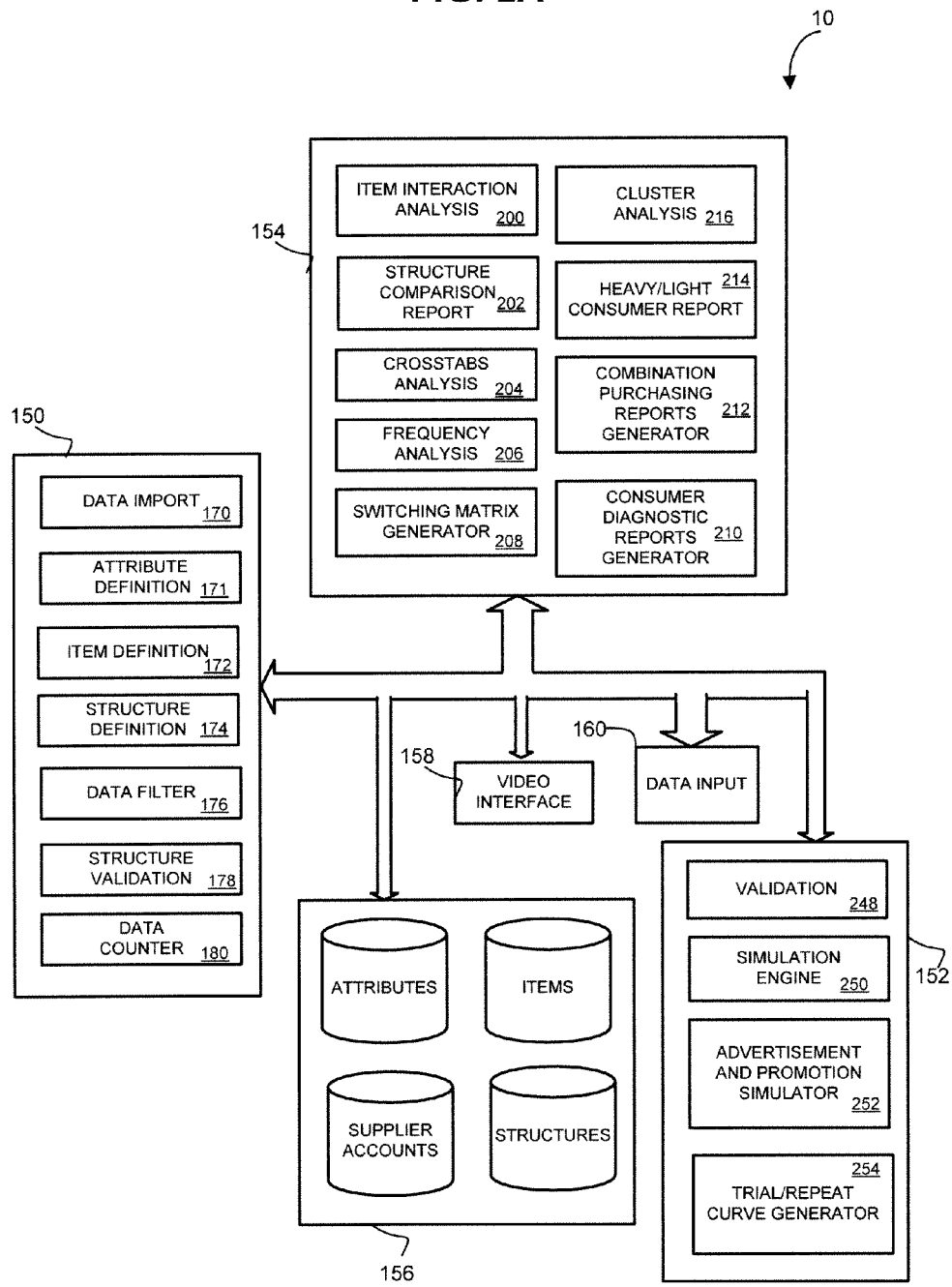
FIG. 2A schematically illustrates various components of the system illustrated in FIG. 1.

Referring to FIG. 2A, the modeling and simulation software system 10 may be implemented using object-oriented techniques, for example, on any desired platform such as the Windows® operating system. In an embodiment, the system 10 may also conform to the graphical user interface conventions of Windows-based products. The system 10 may include a structure management module 150, a simulation module 152, an analysis module 154, a data storage 156, a video interface module 158, and a data input module 160. The modules 152-160 may be distributed among one or several hosts in any desirable manner. In an embodiment, the structure management module 150 and the analysis module 154 may be provided as part of one software package separate from the simulation module 152, for example. Further, it will be noted that the data storage 156 may be implemented in a file system of personal computer, a separate data server, or in any desired manner. Some or all of the modules 150, 152, and 154 may support administrative functions for saving project data, attributes, items, and structure definitions in a corresponding database associated with the data storage 156.

With continued reference to FIG. 2A, the structure management module 150 may include a data import module 170 for obtaining and processing syndicated data. The data import module 170 may support a variety of formats such as those discussed with reference to FIGS. 3 and 4. Additionally, the data import module 170 may allow the user 60 to interactively explore the source data in a tabular form, for example. Referring back to FIG. 1, the user 60 may select a data source associated with a supplier of syndicated data such as the supplier 12, for example. In some embodiments, a user associated with the supplier 12 may purchase or otherwise obtain a license to access the system 10 for uploading data specific to the supplier 12 and subsequently modeling a particular market using the uploaded data. Additionally, the system 10 may provide each supplier or, in some embodiments, each user associated with a supplier with a data account maintained by the data storage 156. In this manner, the supplier may maintain a model of a particular market and iteratively add new data as new surveys are collected, for example. Further, in some embodiments, the module 170 may prompt the user 60 for descriptive information regarding a particular data source. When processing record, the module 170 may display a progress bar to indicate the status of data being processed. In an embodiment, the module 170 may automatically detect errors such as out-of-range or improperly formatted values during the import procedure.

Figure 11:
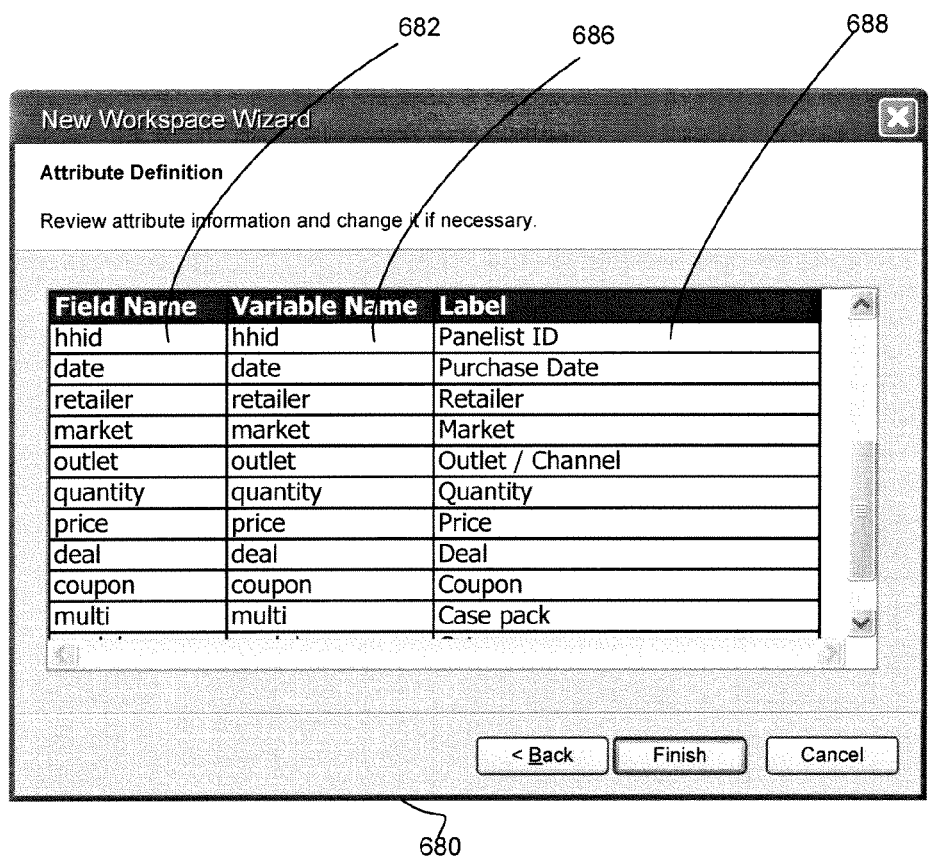
FIG. 11 is an example of an interface the system of FIG. 1 may provide to a user for defining item attributes.

In at least some of the embodiments, the suppliers 12-16 provide data files including transaction and consumer data along with layout and/or dictionary files. A dictionary file may specify the attributes used in defining items (e.g., household identity, product identity, product type, retail price, etc.) and a layout file may specify the parsing rules for the corresponding data file. The system 10 may also support a combined dictionary/layout file in form of a multi-tab Excel spreadsheet, for example. In an embodiment, the structure management module 150 may optionally include an attribute definition module 171 to create and modify data attributes. In some embodiments, an analyst may operate the attribute definition module 171 to define attributes for use with the syndicated data to be received from the supplies 12-16. The attribute definition module 171 may provide an interactive screen to edit attribute names, attribute labels, and other information (as illustrated in FIG. 11).

The user 60 may then select several primary keys from the plurality of data attributes for use in subsequent analysis. In many cases, the user 60 may select household identifier to be the consumer identifier key and the transaction data to be the timestamp key, with the rest of the attributes corresponding to secondary data specifying the details of a certain transaction by a particular consumer (as illustrated in FIG. 11A).

With continued reference to FIG. 2A, an item definition module 172 may provide several interactive graphical views for creating and editing item definitions. In general, analysts define items to aggregates atomic-level data, thereby reducing granularity. The atomic-level may be at the level of an SKU, a store, or a particular day, for example. Thus, each item may include one or several attributes depending on the desired level of granularity and, optionally, a description field for a brief textual explanation of the item. For example, one relatively specific item may include attributes "cola," "can," "12-ounce size," and "brand XYZ," while another item may only include attributes "cola" and "can." Thus, in this example, the definition of the latter item may encompass all items matching the former definition. Further, the item definition module 172 may support logical (e.g., Boolean) expressions including exclusion clauses, predefined keywords, nested expressions, and other constructs in item definitions. To consider one simple example, an analyst working with a data set related to soft drinks may define an item "clear" for all clear or transparent liquids within the soft drink market category. One of the attributes associated with the available data set may be "brand," with each brand name assigned a certain unique identifier defined and explained in the corresponding dictionary file (see FIGS. 3 and 4 below). If the analyst knows that brands with the identifiers 1, 4, 6, and 7 are bottled water brands, for example, she can define the item clear via a logical expression IF (ANY (brand 1,4,6,7)) clear=1. To take another example, an attribute "package" may be associated with values 1,2,3, etc. corresponding to eight-ounce aluminum cans, twelve-ounce glass bottles, two-gallon plastic bottles, etc. To define an item "bottled" for all drinks within the soft drink market category that are in glass bottles, the analyst may define a trivial logical expression IF (package=2) bottled=1. As a less trivial example, the analyst may define an item "clear cans" in a recursive manner using the previously defined item "clear," and a predefined keyword recognized by the item definition module 172: IF (Existing_Item_Definition=clear) and (package=1) clear_cans=1. In general, it will be appreciated that the item definition module 172 may support statements for defining items of varying degree of generality, so that analysts may associate items with different levels of a market structure.

One example of the graphical drag-and-drop interface of the item definition module 172 will be discussed later with reference to FIG. 12.

As indicated above, a structure is a hypothetical organization of product characteristics from the perspective of a consumer. It will be noted that the consumer associated with the structure is also a fictional construct corresponding to an approximate average of preferences of multiple real-life consumers. In an embodiment, the structure definition module 174 provides a drag-and-drop interface for dragging items to a desired level and dropping the selected items into the desired positions. The module 174 may then display the resulting structure in a variety of formats, e.g., as a hierarchical tree, a list, a table, etc. FIG. 15, discussed infra, provides one illustration of the interface of the module 174. Upon addition of a new item to a structure, the module 174 may automatically connect the new item to a level above the item. In some embodiments, the user 62 may right-click on an item to associate the item with a cross-category, add the item to a particular view, etc. Similarly to item management, the structure definition module 174 preferably allows users to save, delete, or modify saved structures at any time.

With continued reference to FIG. 2A, a data filter module 176 allows analysts to selectively exclude data from modeling and simulation. In an embodiment, the interface of the filter module 176 may be similar to the interface of the item definition module 172 so that the user may filter data matching a certain attribute, several attributes, or satisfying an expression including multiple attributes. The system 10 may not use excluded data in calculations at all or, if desired, the user may associate one or several filters with particular structures or scenarios to efficiently focus on certain aspects of the market, for example.

Further, the structure management module 150 may include a validation module 178 to detect definitions inconsistent with item placement, overlap in mutually exclusive categories, and other errors. The validation module 178 consistent with one embodiment allows overlapping item definitions within a single data source but requires that all items definitions associated with a given structure level be mutually exclusive and exhaustive. A can of orange of brand A, for example, cannot match the definitions of both items X and Y competing with each other on the same level of the market. As another example, an analyst may erroneously assign an item to a category which is associated with an attribute excluded by the item. The validation module 178 may automatically process some or all item definitions and the structures using these items by comparing data entries to both item definitions and structure definitions and flagging data entries associated with conflicting results, for example. Additionally, the validation module 178 may detect logical inconsistencies or suspicious constructs in expressions used in defining individual items (e.g., IF (brand=1) and (brand!=1) which produces the same result regardless of the value of attribute brand). It is contemplated that the analyst may execute the function provided by the validation module 178 at any time using an appropriate command or visual control, or the validation module 178 may execute as a background task to test every new item or structure upon definition.

A data counter module 180 allows the user 60 to view the frequency of occurrence of certain values. For example, the user 60 may select one or more attributes and, in response to the user selection, the module 180 may calculate the frequency of occurrence of the attribute within the provided data set. Upon loading a source file, the system 10 may execute a frequency analysis, automatically or in response to a user request. During frequency analysis, the system 10 may determine how often customers purchase a particular item. Additionally, the system 10 provides an interface to receive a selection of one or several parameters and analyzes the data set to display the frequency of occurrence of the item matching these parameters. In some embodiments, the system 10 may perform validation of the supplied data to detect such errors as, for example, an overlap in item categories or other forms of inconsistent placement of items.

Still referring to FIG. 2A, the analysis module 154 may provide the analyst with quantified (e.g., numerical) as well as intuitive (e.g., visual) indications of how closely selected items compete with each other, how much switching occurs between pairs of items, how often certain transactions occur together in a common occasion, how well a structure matches a certain set of data, etc. In one aspect, the analysis module 154 may calculate and perform further operations with such metrics as item consumer count, item consumer share, actual repeating item consumer count, actual repeating item consumer share of item consumers, actual repeating item consumer share of total consumers, predicted repeating item consumer count, predicted repeating item consumer share of item consumers, predicted repeating item consumer share of total consumers, predicted switching item consumer count, predicted switching item consumer share of item consumers, predicted switching item consumer share of total consumers, switching in item consumer count, switching in item consumer share of item consumers, switching in item consumer share of total consumers, switching out item consumer count, item chi square significance, item impact, item stability, etc. To calculate these and other parameters, the analysis module 154 may include some or all of an item interaction analysis module 200, a structure compare module 202, a crosstab analysis module 204, a frequency analysis module 206, a switching matrix generator 208, a consumer diagnostic reports generator 210, a combination purchasing reports generator 212, a heavy/light report generator 214, and a cluster analysis module 216. The operation of the modules 200-216, as well as the interaction between these modules and the structure definition module 150, is discussed below.

The item interaction analysis module 200 may prompt the user 62 to select a structure to be processed, the type(s) of output the user 62 wishes to see, and one of several counting methods supported by the system 10. In an embodiment, the analyst may select between summary reports, detailed reports, and custom reports to be generated by the module 200. The system 10 may support such counting methods as minimum two apart, date-constrained window, maximization with overlap, maximization without overlap, maximum distance apart, etc. Using the interface of the analysis module 154 in general and of the item interaction analysis module 200 in particular, the user may customize the output report to include actual switching, indexes only, actual and predicted with indexes, etc. Further, the analysis module 154 may allow users to save reports, export report data to other formats such as Excel, for example, open and view saved reports, delete reports, and perform other administrative functions. While certain aspects of the user interface of the interaction analysis module 200 will be discussed later with reference to FIGS. 17 and 17A, one example of a summary report which the module 200 may generate based on a certain data set is illustrated below:

| | |
|---|---:|
| NUMBER OF CONSUMERS | 27,758 |
| ACTUAL SWITCHING | 5,265 |
| PREDICTED SWITCHING | 4,907 |

-continued

| | |
|---|---|
| PREDICTED TO ACTUAL INDEX | 93 |
| OVERALL FIT, AGGREGATE CHI-SQUARE | 289 |
| ITEM FITS DISAGGREGATE CHI-SQUARE | 3165 |

In this example, the analyst may select a desired definition of a switch and the product item interaction analysis module 200 calculates total switching, predicted switching according to a predetermined model (e.g., a hierarchical entropy maximization model), preference metrics, etc.

A structure compare module 202 allows the user 62 to compare output from multiple item interaction reports. Upon receiving a selection of two or more structures from the user 62 and one or more pairs of items as the basis for comparison, the module 202 may use a statistical method such as chi square analysis, for example, to the selected and the data set to determine how well the selected structures fit the data. To allow the analyst to efficiently identify the best or worst structures (as assessed by the closeness of fit), the module 202 may tabulate the results and/or apply various graphical indicators to the results.

To consider one example of using the analysis module 154 to quickly view key metrics across item interaction reports for convenient and efficient analysis, the user may define two structures, "type/form" and "brand/type," describing two respective hypothesis regarding a certain market. In particular, the "type/form" structure may hypothesize the type of a product (e.g., juice vs. carbonated drinks) within a bounded market category above all other considerations, followed by the form of the product (e.g., aluminum cans vs. glass bottles), while the "brand/type" structure may predict that consumers selects the brand first, followed by the type of the product. Upon receiving a selection of the counting method and several key pairs, and applying syndicated data to the selected "type/form" and "brand/type" structures, the analysis module 154 may display the following example result in any desired format such as a tabular form, for example:

| Statistic | 1 Type/Form | 2 Brand/Type |
|---|---|---|
| Set Chi Square Key Pairs | 1231.2 | 401.1 |
| Brand A Package A/Brand B Package A | 984.3 | 456.1 |
| Brand A Package B/Brand B Package B | 789.5 | 345.4 |
| Brand A Package A/Brand A Package B | 234.3 | 538.9 |

In this example, the data suggests that the "brand/type" structure provides a better fit with the actual data given the same degrees of freedom. Further, the analysis module 154 may calculate and display the degree of fit between key pairs such as products of the same type offered in a similar form by two competing brands so that the analyst may make proper adjustments to the structures, including the "winning" structure that displays the better overall degree of fit. For example, the output illustrated above may suggest to the analyst that while the "brand/type" hypothesis is associated with a lower chi squared value, the data corresponding to the brand A package A/brand A package B key pair fits the "type/form" hypothesis better.

With continued reference to FIG. 2A, the analysis module 154 may support a cross-tab module 204 to analyze joint distribution of two or more variables. For example, the cross-tab module 204 may process a certain data set to calculate how often bottled water is purchased along with a carbonated drink. In an embodiment, the module 204 operates on any level of the structure so that the user 62 may detect joint distribution of high-level items such as water and carbonated drinks of the previous example, or more specific items such as plastic eight-ounce bottles of brand A and two-liter plastic bottles of orange-flavored soda of brand B.

Further, a frequency analysis module 206 may provide single-variable analysis of items and customers. In particular, the module 206 may calculate the share of each item as a percentage of the total market, the frequency of purchases of selected items by a particular household, etc. Additionally, the module 206 may operate as a background task to provide distribution indication to the graphical interface of the analysis module 154 so that each item conveniently displays its market share.

As also illustrated in FIG. 2A, the analysis module 154 may include a switching matrix generator 208 to generate and display predicted and actual switching counts between items in a certain competitive set. If desired, the switching matrix generator 208 may be provided as an integral part of the item interaction analysis module 200. By including switching indices in the corresponding reports, the analysis module 154 may allow the user 60 to quickly identify key interactions among items. In an embodiment, the interactions may be color-coded to identify low values, high values, or values falling within certain specified ranges. Further, color coding may be user-configurable.

A consumer diagnostic report generator 210 may provide generate reports directed to such measurements as market penetration, purchase cycle (e.g., elapsed days), purchase size, occasions per buyer, volume per buyer (i.e., buying rate), share of requirements (i.e., loyalty), exclusivity, worth, substitutability of items, average items, average non-promoted price, average promoted price, average price, total dollars, total volume, total units, promoted dollars, volume, and units, percentage sold on deal, coupon, or by an outlet, raw consumer numbers, projected consumer numbers, percentage of first time consumers, repeat rate, etc.

A combination purchasing report module 212 may allows analysts to analyze combination purchasing behavior among items in a competitive set. In an embodiment, several item sets may be displayed as a Venn diagram, with each resulting intersection or non-overlapping subset preferably listing the percentage of items falling into the corresponding category.

A heavy/light consumer report generator 214 automatically identifies groups of consumers that account for a disproportionate amount of volume. In general, the analysis module 154 may support the definition of any number of buying groups using corresponding volume cut-off values. The report generator 214 may additionally support user-configurable color coded conditional formatting to enable analysts to quickly identify and categorize the calculated data. It is contemplated that the results of heavy/light analysis may be provided in any desired format. To take one specific example, the report generator 214 may display the results as a table including a row for the cluster including heavy buyers and a separate row for the cluster including light buyers, with each column corresponding to a particular group such as young singles, childless younger couples, new families, etc. In this tabulated format, each entry of the table may include the number of consumers within each category and cluster, and each entry may be additionally color-coded to indicate the relative deviation from the average, mean, or another benchmark value.

Figure 19:
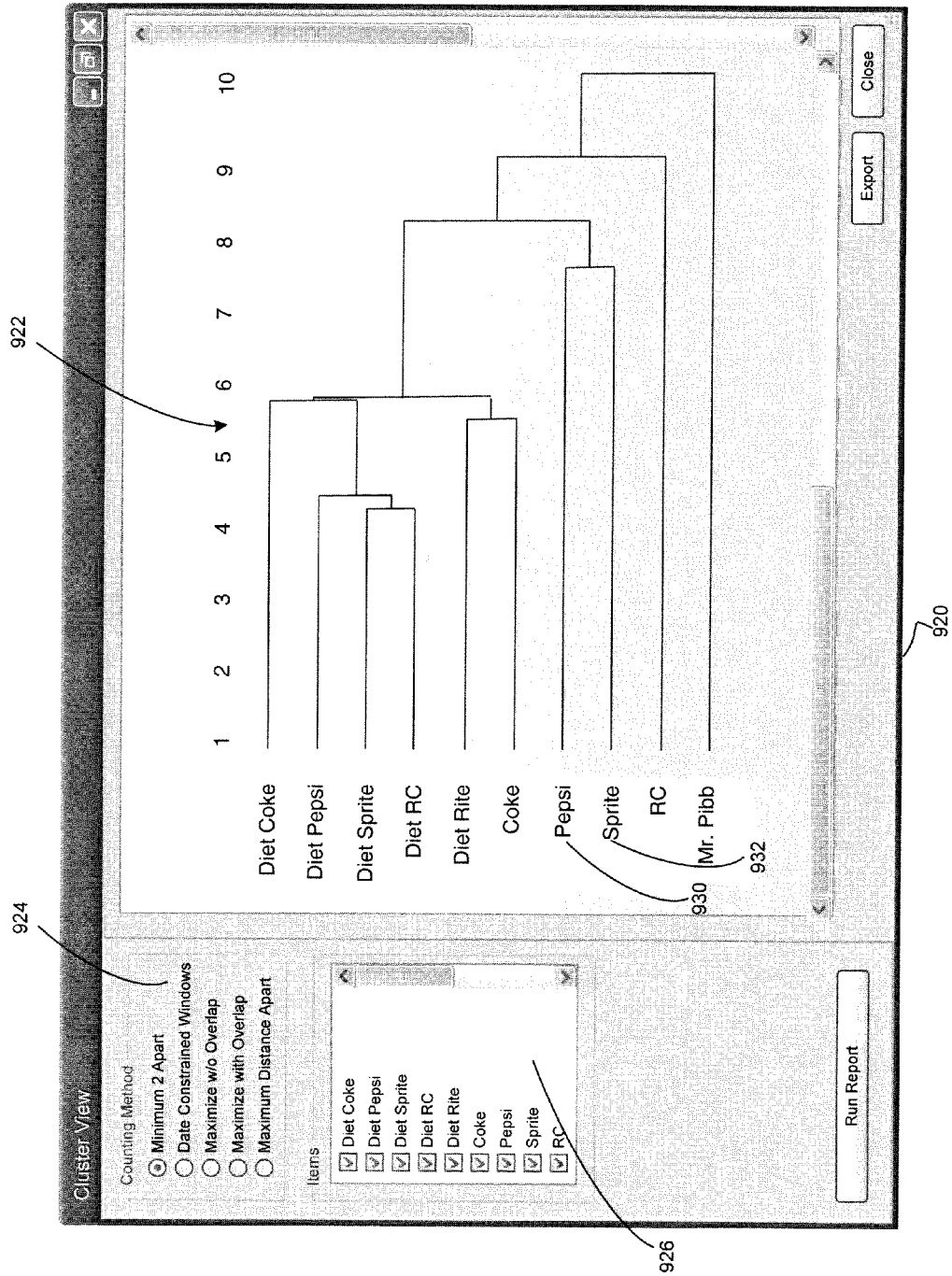
FIG. 19 is an example output of a cluster analysis module of the system of FIG. 1, represented visually in form of a dendogram.

A cluster report generator 216 allows analysts to view switching interactions between items in a certain competitive set to assess relative proximity between the items. The results may be displayed in form of a dendogram, i.e., a graph displaying the proximity of variables as lines parallel lines of a proportional length (FIG. 19). In general, cluster analysis is an exploratory data analysis tool used to detect groupings in the data. Cluster analysis includes a set of techniques designed to cluster objects such as products, people, places, etc. into smaller numbers of homogeneous groups based on a number of observed characteristics. The software system 10 uses cluster analysis to classify products into similar groups based on the "5 Ws" discussed above.

Generally with respect to the analysis module 154, it will be noted that some of the modules (e.g., the switching matrix generator 208) may support a set of default general rules as well as selectable counting rules when analyzing structures and/or syndicated data. In an embodiment, some or all of the general rules may be user-configurable. As one specific example of a general rule, the analysis module 154 may count switches using the transactions of a given household and may exclude switches between households. As another example, the module 154 may require that each item in the transaction pair must be from different time periods and, accordingly, not count switches between purchases during the same time period. In addition to providing user interface for reconfiguring these and other general rules, the module 154 may allow the analyst to define time periods in any desired manner. Thus, when working with a certain market category the analyst may override the general value of one day with a custom value of one week, for example.

As additional examples of default general rules, the analysis module 154 may associate all purchases during a single time period with a single transaction if all of these purchases relate to the same item. In other words, if a certain household that purchases certain product (e.g., bread) several times a day, the transactions may be simplified to an equivalent single purchase. On the other hand, the module 154 may consider purchases of different items during the same time period to be multiple-item transactions. Further, the module 154 may associate each counting rule with a certain minimum number of unique transaction periods to be included in the switching counts.

As an illustration of application of counting rules, the system 10 may receive the following fragment of a data set as part of syndicated data from one of the suppliers 12-16, test data entered by the user 60, or in any other manner:

| Transaction | Consumer | Occasion | Item |
|---|---|---|---|
| 1 | 1 | Apr. 1, 2006 | Brand A |
| 2 | 1 | May, 15, 2006 | Brand B |
| 3 | 1 | Jun. 28, 2006 | Brand A |
| 4 | 1 | Aug. 11, 2006 | Brand C |
| 5 | 1 | Sep. 24, 2006 | Brand A |
| 6 | 1 | Nov. 7. 2006 | Brand A |
| 7 | 1 | Dec. 21, 2006 | Brand A |
| 8 | 1 | Feb. 3, 2007 | Brand C |
| 9 | 1 | Mar. 19, 2007 | Brand A |
| 10 | 1 | May, 2, 2007 | Brand B |
| 11 | 1 | Jun. 15, 2007 | Brand A |
| 12 | 1 | Jul. 29, 2007 | Brand C |

Several examples of applying the counting rules such as discussed above are illustrated in the following table:

| Approach | Description | Counting Rules | Pairs | Count |
|---|---|---|---|---|
| 1 | Two Minimum Apart Transactions | Compares first single-item transaction date with nearest, non-adjacent single-item transaction date. | {1,3} | 1 |
| 2 | Date Constrained Transactions | Compares first single-item transaction within one date window with first single-item transaction from a previous date window. | Variable | 1 |
| 3 | Maximum Transactions with Overlap | Compares adjacent single-item transactions while allowing transactions to be both the first and second positions in transaction pairs. | {1,2} {2,3} {3,4} ... | 11 |
| 4 | Maximum Transactions without Overlap | Compares adjacent single-item transactions using each transaction only once in a transaction pair. | {1,2} {3,4} {5,6} ... | 6 |
| 5 | Two Maximum Apart Transactions | Compares first and last single-item transactions. | {1,12} | 1 |

Thus, by selecting different approaches to counting, the analyst may arrive at different interpretation of data. It will be appreciated that the analyst may select the appropriate counting technique according to the type, geographic location, and other aspects of the modeled market category. In some situations, the analyst may select several or all of the available counting methods to consider multiple perspectives regarding the same data set.

To continue with the same example of a 12-transaction data set, the switching matrix generator 208 may generate several switching matrices based on approaches 1 and 2-5 illustrated above. In the example output matrices below, a number in the particular cell corresponds to a transition from the brand associated with the column to the brand associated with the row. Thus, for example, the value "1" in the first column of the second row in the Two Minimum Apart matrix corresponds to one transaction from brand A to brand B identified in the data set in accordance with two minimum apart counting technique. It will be further noted that in all of the matrices illustrated below, the values on the diagonal correspond to repeat purchases.

Two Minimum Apart Transactions:

| | Brand A | Brand B | Brand C |
|---|---|---|---|
| Brand A | 0 | 0 | 0 |
| Brand B | 1 | 0 | 0 |
| Brand C | 0 | 0 | 0 |

Maximum Transactions with Overlap:

| | Brand A | Brand B | Brand C |
|---|---|---|---|
| Brand A | 2 | 2 | 2 |
| Brand B | 2 | 0 | 0 |
| Brand C | 3 | 0 | 0 |

Maximum Transactions without Overlap:

|         | Brand A | Brand B | Brand C |
|---------|---------|---------|---------|
| Brand A | 1       | 0       | 0       |
| Brand B | 2       | 0       | 0       |
| Brand C | 3       | 0       | 0       |

Two Maximum Apart Transactions:

|         | Brand A | Brand B | Brand C |
|---------|---------|---------|---------|
| Brand A | 0       | 0       | 0       |
| Brand B | 0       | 0       | 0       |
| Brand C | 1       | 0       | 0       |

Still referring to FIG. 2A, the simulation engine 152 may be provided as a separate software system independent of the structure definition module 150 and the structure analysis module 152, or as part of an integrated system 10. In either case, the simulation engine 152 preferably supports the formats of attribute, item, and structure definitions used by the modules 150 and 152 to allow analysts to simulate various contemplated changes in one or several structures developed using the modules 150 and 152. In some situations, an analyst may wish to develop, via iterative modifications and testing, a hypothetical market structure that predicts switching and other consumer behavior at the desired level of accuracy. Once the analyst has obtained a workable model, he or she may wish to experiment with a hypothetical scenario, referred to herein as a "what-if?" For example, the analyst may wish to view the expected impact of a new product on the simulated market or how well an advertisement campaign is likely to improve the share of an existing item. In another aspect, the analyst may wish to determine optimal spending targets with respect to consumer promotions, trade promotions, television advertisement, or other forms of active marketing. In short, analysts may use the simulation module 152 to identify objective, market-driven spending targets for the established brands to properly manage short-term risk, as well as determine optimal level of spending for profitable growth of new brands. Moreover, the module 152 can predict volume and profit impact of major change in business strategy, improve portfolio effectiveness by determining better allocation of items across brands and categories, and provide input to shelving and assortment decisions.

To simulate various hypothetical scenarios, the simulation module 152 generally requires several variables such as, for example, number of shipments (preferably expressed in equivalized units), retail price or an average price per equivalized volume (i.e., price paid by consumer), working advertising spending (e.g., expenditures on media, print, production and distribution of coupons, point of purchase displays, etc.), working consumer and trade promotion spending (e.g., promotional expenditures aimed at reducing the price to the consumer such as consumer deals, coupon redemption, other price or value incentives), cost of product (including direct manufacturing cost, direct distribution cost such as transportation, direct volume-based selling cost such as commissions), and list price (i.e., price to the manufacturer). Further, the simulation module 152 may optionally apply certain assumptions during simulation, with the analysis preferably being able to override each of these assumptions using the interface of the simulation module 152. In particular, the default rules may require that approximately 75% of advertising dollars be associated with working advertisement dollars, and that 85-90% of all promotional vehicles be considered working promotional dollars. Still further, when no shipment information is available for a certain competing brand, the analyst may supply a competitor's ratio of shipments to IRI/Nielsen—equivalized volume to estimate the number of shipments for the brand using the simulation module 152. In some embodiments, the simulation module 152 may additionally use such variables as distribution and effectiveness. The distribution may correspond to all commodity volume (ACV) distribution, for example. It will be noted that if distribution is relatively high and similar to most for all brands, the simulation module 152 need not to take distribution into account at all.

As illustrated in FIG. 2A, the simulation engine 152 may include some or all of a validation module 248, a simulation engine 250, an advertisement and promotion simulator 254, and a trial and repeat curve simulator 256. When importing data from the structure or supplier account databases associated with the data storage 156, the validation module 248 may identify such issues with the data as, for example, the ratio of a list price to the retail price of a particular product standing apart from the average for the particular category by more than 1.5 standard deviations. In an embodiment, the validation module 248 may display a warning message upon detecting this or a similar condition and provide a prompt for the user to accept or rejected the suspicious data.

In operation, a simulation engine 250 allows the analyst set up a scenario, associate the scenario with data such as the syndicated data imported to the system 10 from one of the suppliers 12-16 (see FIG. 1). The analyst may configure each scenario with an individual name and possibly additional notes describing the purpose and certain assumptions behind the simulation. The user 60 may select one or several levels of the structure for a particular simulation. In other words, simulation may apply to a part of a structure or a complete structure, if desired. Upon selecting a structure to be simulated, the analyst may select one or several levels of the structure for a particular simulation. In other words, simulation may apply to a part of a structure or a complete structure, if desired. Further, the simulation engine 250 in at least some of the embodiments may allow the user to create or select cross-category segment. Still further, the simulation engine 250 may allow the analyst to create and select custom aggregates, such as, for example, a row that sums up the volume and other variables of a particular brand.

An advertisement and consumer promotion simulator 252 may calculate the impact of advertisement, consumer promotions, and trade promotions on an existing or new item. In some situations, the analyst may initially elect to simulate the introduction of a new product into a market segment using the default advertisement and promotional spending benchmarks. Upon deciding that the expected market share of the new product falls short of the desired target, the analyst may run a "what-if" simulation including an increase in spending related to one or several of general advertisement, specific form of advertisement such as television or radio, trade promotion, or consumer promotion. The promotion simulator 252 in cooperation with the simulation engine 250 may then re-evaluate the market share in view of the new spending factors.

Further, a trial and repeat curve generator 254 may calculate the expected number of trials of an item over a selected period of time and render the results in form of a curve for the convenience of the analyst. In some embodiments, the trial and repeat curve generator 254 displays curves for any selected target of repeated trials (e.g., first trial, second trial, etc.). The one or several requested curves may be a graph of the percentage of the population versus the number of days elapsed since the introduction of the new item. In some embodiments, the trial and repeat curve generator 254 may conveniently display multiple graphs, differentiated by color or line style, for example, that correspond to different spending options.

Format of Input Data

Now referring to FIG. 3, the modeling and simulation software system 10 may receive a data file 300 from one or several of the suppliers 12-16, a third-party agency that collects consumer data related to one or multiple merchants, a web service that automatically tracks electronic transactions on the Internet, or any other source of data related to consumer transactions. As previously indicated, the system 10 may receive the data file 300 via a network connection, a storage device such as a CD or a DVD, or via any other medium including those known in the art. In some embodiments, the system 10 may receive syndicated data such as the data file 300 as delimited ASCII data, Excel spreadsheet data, or a secure proprietary format with a level of encoding, if desired. When configuring a new project, the software system 10 may prompt the analyst to enter a path or an internet link to a data file and optionally a dictionary file specifying includes item definition.

As illustrated in FIG. 3, the data file 300 may include a row identifier 302 to identify an individual data entry, a household identifier 304, and a date identifier or timestamp 306. In some cases, the system 10 may consider each data entry to be a separate transaction. However, in other cases, the analyst may configure the system 10 to associated several individual rows of the data file 300 with a single transaction if, for example, each of these rows includes the same household identifier 304 and a timestamp 306 associated with the same time period. With respect to the household identifier 304, the party supplying the data file 300 may assign household identifiers using the serial number of the corresponding preferred customer or frequent buyer card or using any other suitable technique. If desired, members of the same family may be associated with the same household identifier to simplify subsequent analysis. In some embodiments, the system 10 may automatically identify the consumer using such data elements as name, age, gender (none shown).

In some cases, the data file 300 may include a universal product code field 308 to streamline data received from multiple suppliers of information, for example. Further, a category field 310 may identify a general category of items associated with the transactions of the data file 300. For example, a certain supplier of data may provide data for various models and/or simulations and may assign a category such as "soft drinks" or "laundry detergents" to each entry in the data file 300 to ensure that the system 10 does not associate unrelated items to the same structure. Still further, a brand field 312 may identify the brand of the item using a mapping defined in a layout or dictionary file or, if desired, include an alphanumeric string storing the complete name of the brand.

With continued reference to FIG. 3, each row of the data file 300 may additionally specify demographic information of the household. In this example, the field 314 may specify the number of people in the household, the field 316 may specify the income category, etc. In general, the demographic information in the data file 300 includes enough detail to analyze consumer data for various geographic locations, different economic groups, age groups, etc. If desired, the data file 300 may include additional demographic information or no demographic information at all.

Further, point of sale information in the data file 300 may specify an outlet using a predefined set of identifiers (field 320) and a geographic region (field 322) which may be as specific as necessary for the purposes of the corresponding analysis. A coupon identifier field 324 and a trade deal presence flag 326 may specify promotional data of the file 300. The field 324 may indicate whether a coupon was used to purchase the item below the retail price and, optionally, a non-zero value of the field 324 may identify the type of coupon (e.g., newspaper, internet). In some cases, it may desirable to include additional promotional data if a particular analysis focuses specifically on assessing the effectiveness of promotional campaigns. Finally, a purchase quantity field 328 may specify the number of items purchased at one time and the dollars paid field 330 may identify the total monetary amount.

In at least some of the embodiments, the system 10 may receive consumer data as a delimited ASCII data file 350 (FIG. 4) storing consumer data in an efficient compact format. The system 10 may also receive a layout file including entries 355, 357, and 359 and a dictionary file including the entry 360 at the same time as receiving the file 350 or, if desired, as part of a setup procedure to associate the files 355 and 360 with multiple data files 350 supplied over a period of time. As illustrated in FIG. 4, the layout file 355 identifies the data fields and specifies the location and boundaries of each filed in the data file 350. In this example, the entry 355 indicates that a variable hid with the description "household identifier" begins in the zero byte of each row of the data file 350 and ends in the tenth byte while the entry 357 specifies that the variable date occupies the next six bytes (11 through 16). Additionally, the entry 360 in the corresponding dictionary file may list the brands associated with the two-character numerical identifiers used in the data file 355.

Segmentation and Switching Concepts

Several concepts used in implementing various components of the system 10 are discussed next with reference to FIGS. 5-9. In general, a market in which several items compete (or a "competitive set") may be represented by a hierarchical structure 400 (FIG. 5), with block 402 at the root of the tree 400 corresponding to the entire competitive set. At the next level, blocks 404 to 406 define the choices at next level of the structure 400 and together add up to the entire competitive set. In this sense, each level of the structure redefines the set of choices available to the consumer. Further, connections between blocks at different levels of the structure 400 identify choices at a higher (i.e., more general) level of the hierarchy refined at the lower (i.e., more specific) level. Thus, in the example illustrated in FIG. 5, blocks 404 and 406 refine choices associated with the parent block 402, and blocks 408 and 410 refine the choice associated with the parent block 404. Considered from another perspective, a user arrives at block 408 upon making successive selections of blocks 402, block 404, and finally block 408. According to the hierarchical theories of market segmentation, a consumer viewing a certain market as a structure 400 makes his or her selection traversing the structure from the general (in this case, block 402) to the particular (one of the blocks 408-414). As a consequence, items that belong the same parent block compete with each other more directly than items associated with different levels of the structure. As another consequence, these items "source" more from each other during advertisement-driven growth, for example. In the example illustrated in FIG. 5, advertisement and/or promotion of the item corresponding to block 408 is more likely to attract a consumer who normally buys the competing item corresponding to block 410 than a consumer who normally buys item corresponding to block 412.

Figure 6:
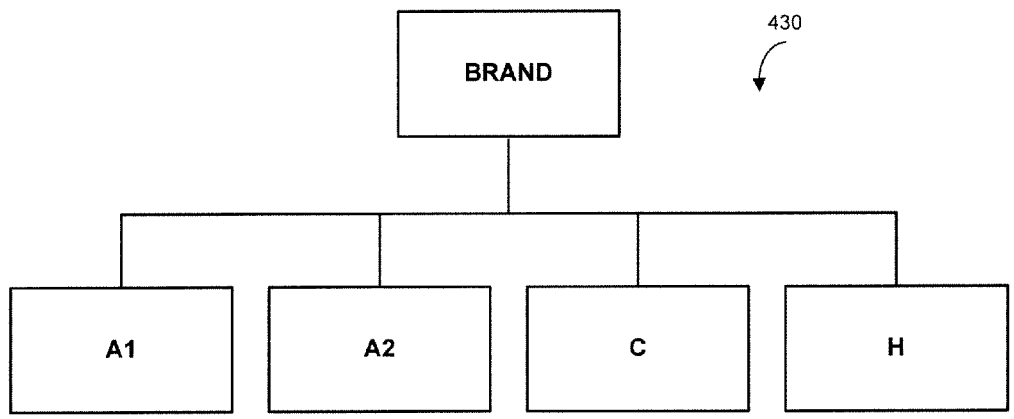
FIG. 6 illustrates the interaction between brands competing on the same level of a market structure consistent with the principles illustrated in FIGS. 4 and 5.
Figure 7:
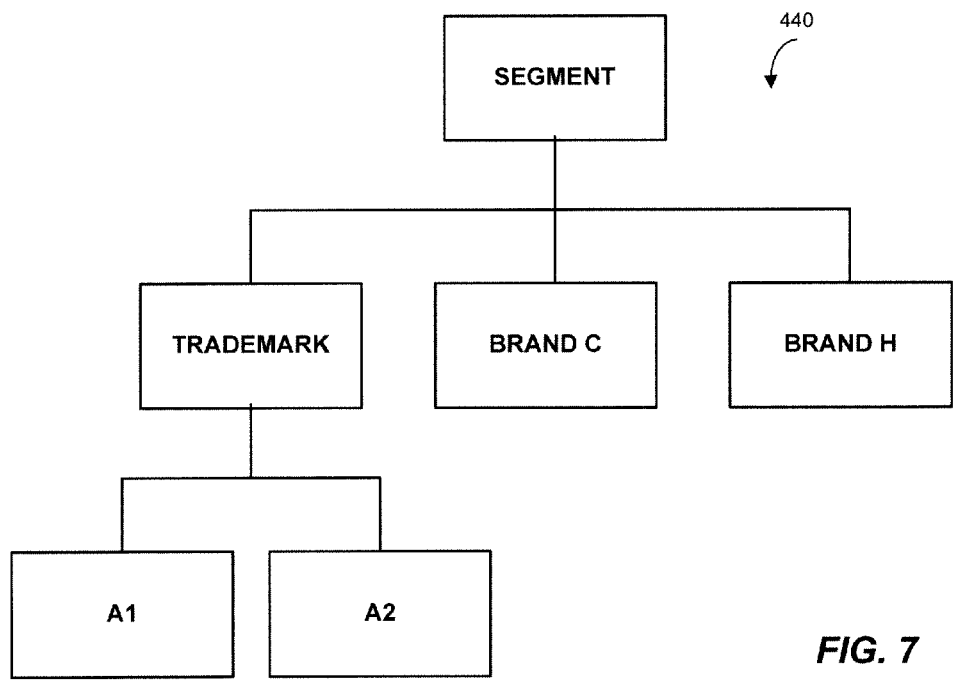
FIG. 7 illustrates the interaction between brands competing on different levels of a market structure consistent with the principles illustrated in FIGS. 4 and 5.

FIGS. 6 and 7 illustrate structures 430 and 440, respectively, in which brands A1 and A2 are positioned differently according to two hypotheses regarding the market in which brands A1 and A2 compete. If the hypothesis corresponding to the structure 430 is more correct, spending more money on advertising brands A1 and A2 is likely to increase switching between brands A1 and A2 as well as additional significant sourcing from brands C and H. If, on the other hand, the hypothesis corresponding to the structure 450 is more accurate, then advertising of brands A1 and A2 will result in some sourcing between A1 and A2 and relatively additional sourcing from brands C and H. Thus, establishing the correct market structure is critical in identifying the probable response to advertisement and ultimately determining optimal spending.

According to the general principles implemented by the system 10, consumer response to a particular market (i.e., purchase or use of items) is a direct function of the market shares of the items, the number of items competing in the market, and current market forces such as advertisement, pricing, and distribution within a category. The rate of change of the response depends on the number of available switchers defining the so-called headroom and the strength of the switchers' preferences. Further, different levels of a certain market structure correspond to different degrees of consumer switching and thus to marketing activities (as discussed above, more switching occurs on the more specific levels of the structure). As yet another principle, all spending may be considered to have two major forms of impact on the consumer: advertising value and price reflection. A response to a consumer promotion or a trade promotions can be seen as a net impact of advertising value and price reflection. Thus, the advertisement-driver share $S_{ad}$ can be expressed as:

$$S_{ad}=S_{loyal\ buyers}+S_{switchers}=F(\text{spending profiles, number of competitive items, loyalties})$$

Figure 8:
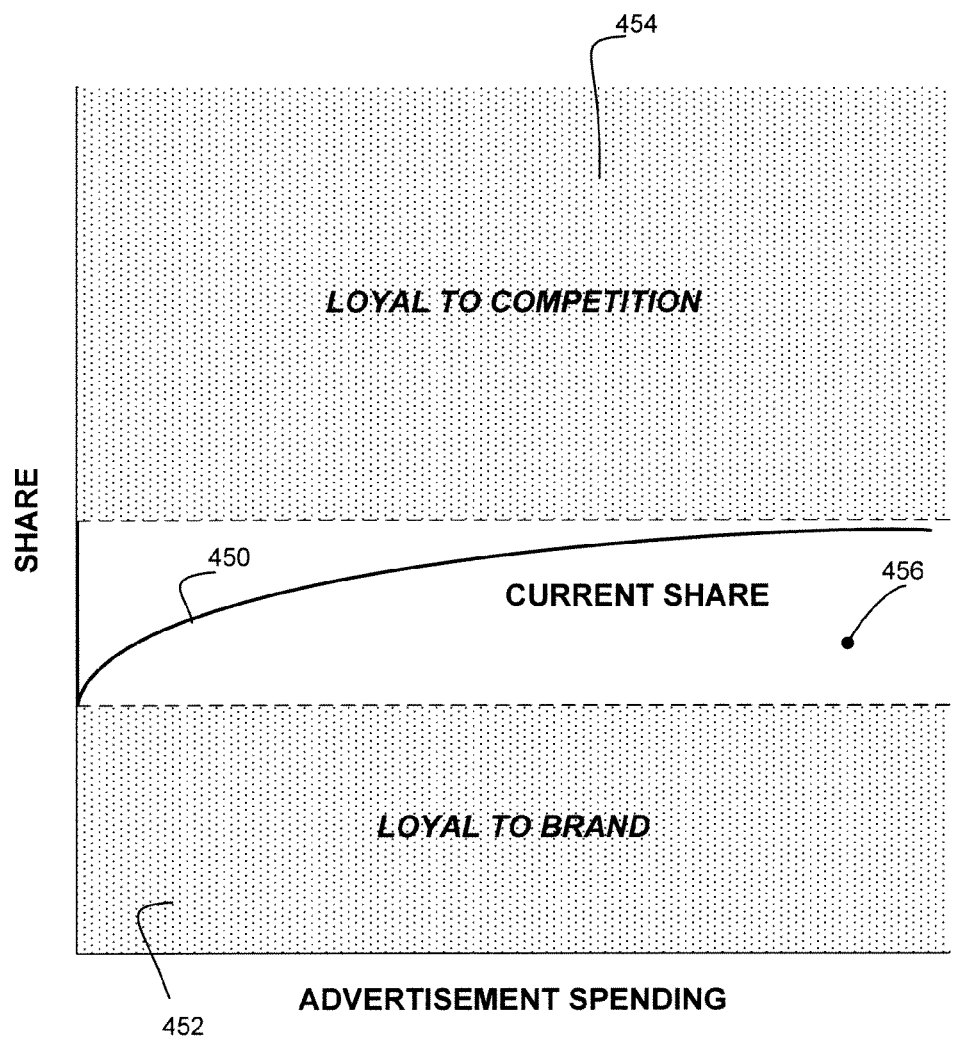
FIG. 8 illustrates the relationship between advertisement spending and the number of people purchasing a particular brand.

FIG. 8 illustrates a generalized response to advertisement of a particular brand. In particular, a curve 450 represents the change in market share of the brand relative to advertisement. The region 452 corresponds to the consumers loyal to the brand who will likely purchase the brand irrespective of advertisement and will not therefore switch from the brand. Analogously, the region 454 represents consumers loyal to competition (e.g., other brands) who will continue purchasing competing brands at any level of advertisement of the brand and will not therefore switch to the brand. In the headroom region 456 separating the regions 452 and 454, an increase in advertisement spending results in a higher market share with diminishing returns. Thus, as illustrated in FIG. 8, the curve 450 asymptomatically approaches the lower boundary of the region 454.

When testing and simulating models, the system 10 may also conform to several theoretical predictions validated by empirical data such as, for example, associating a greater level of consumer switching with a greater response to advertisement and promotion; associating a lower brand share with a higher response; associating a newer product with a higher response (i.e., the response decreases as the product ages); associating faster growth with a higher response; and associating a larger competitive product frame with a higher response. Further, it will be noted that the starting share depends on the inverse of entropy (or loyalty) as reflected in share positions and current levels of spending.

Figure 8A:
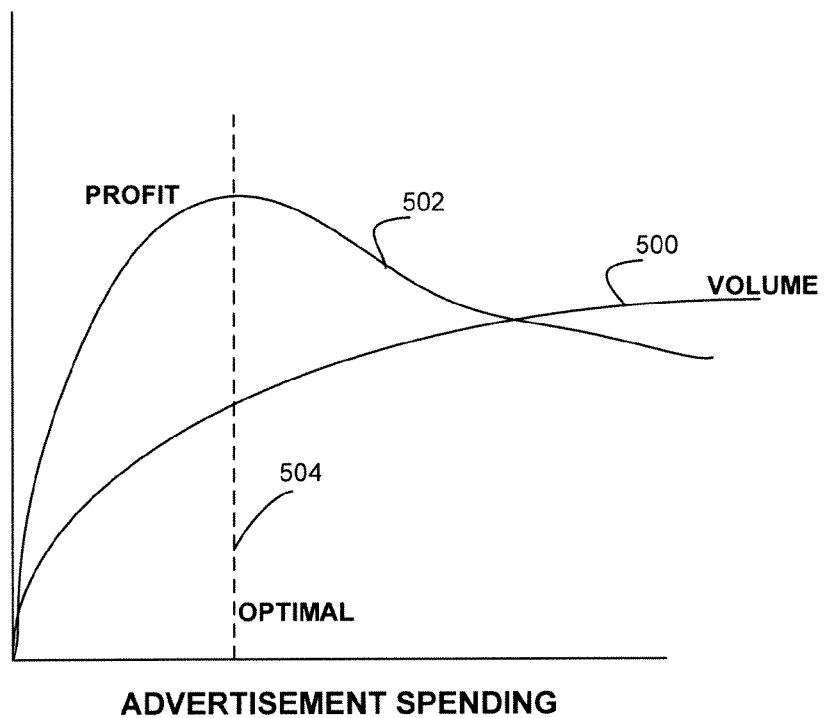
FIG. 8A illustrates optimal advertisement spending in view of dependencies of volume and profit on spending.

To better illustrate the operation of the simulation engine 152 with respect to identifying optimal spending levels, FIG. 8A illustrates a typical relationship between advertisement spending and profit. In particular, the curve 500 illustrates the volume (or market share) of an item increasing at a diminishing rate with an increase in advertisement spending. Meanwhile, the curve 502 illustrates the change in profit relative to changes in advertisement spending. From the curves 500 and 502, it will be appreciated that whereas an increase in advertisement spending generally results in a higher volume, the profit begins to diminish after reaching a maximum at the optimal advertisement level 504.

Figure 9:
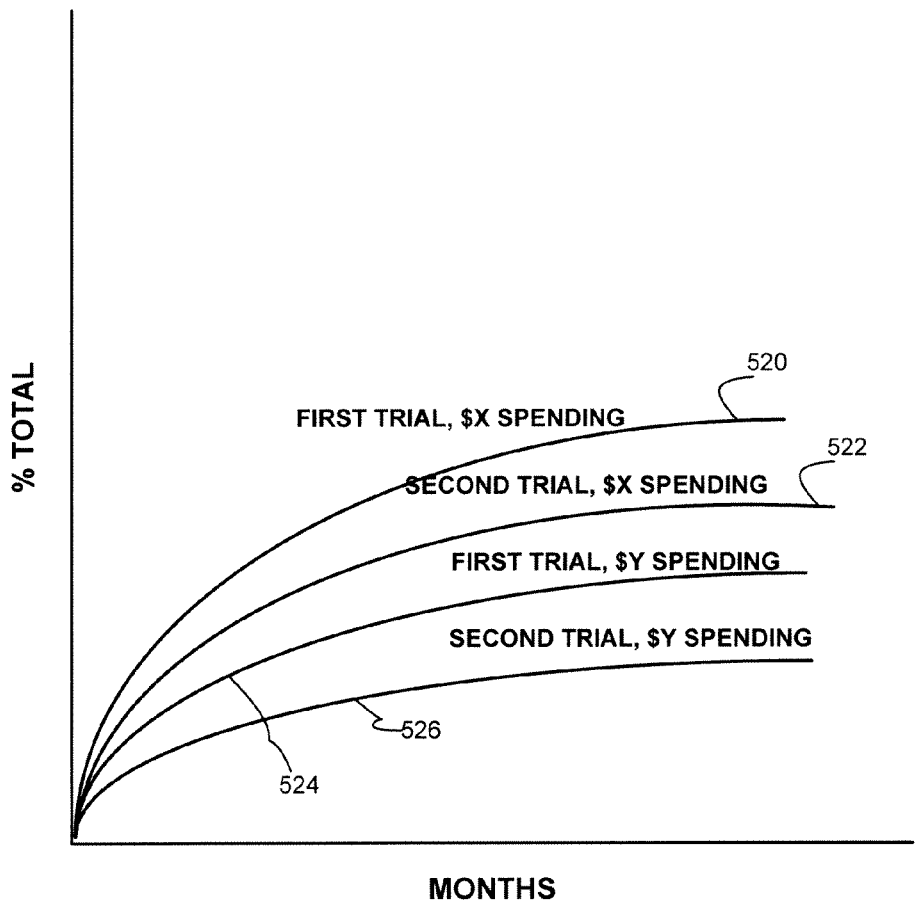
FIG. 9 illustrates several curves corresponding to first trials and repeat trials of an item over a period of time for different advertisement levels.
Figure 9A:
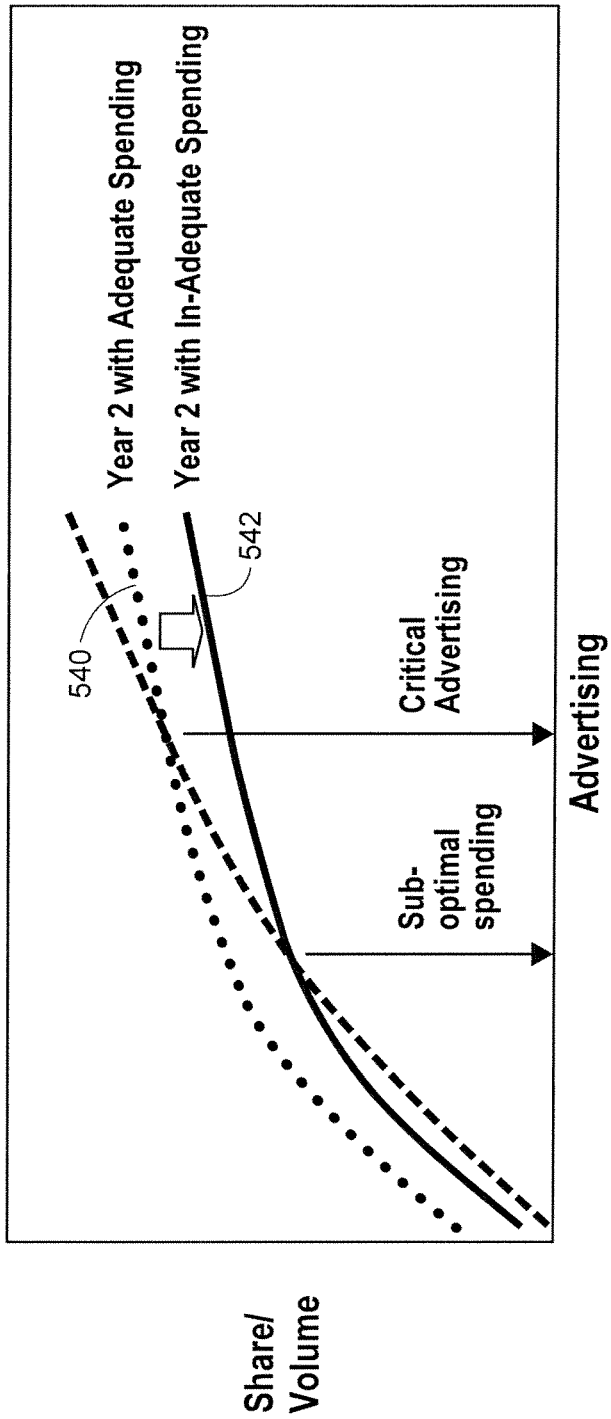
FIG. 9A illustrates example curves corresponding respectively to adequate and inadequate advertisement spending.
Figure 9B:
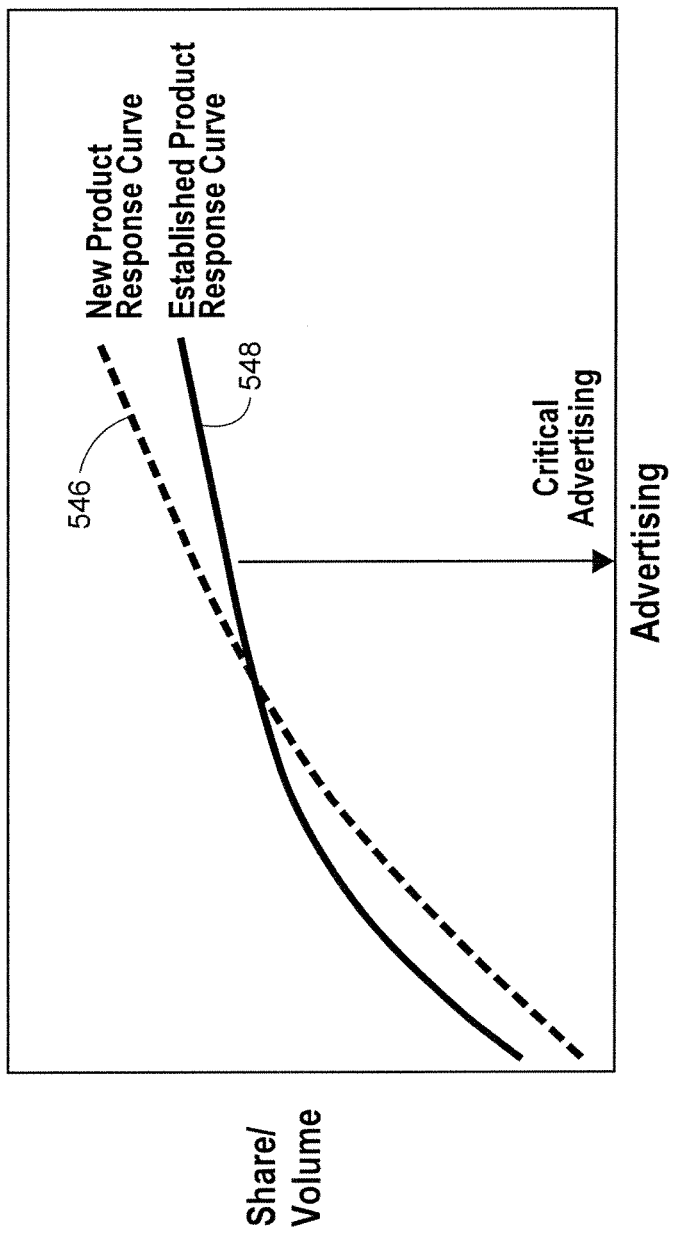
FIG. 9B illustrates example curves corresponding to respective responses to advertisement of a new product and an old product.

In another aspect, advertisement spending generally produces different results with respect to the first trial of a product and a repeat trial. Not surprisingly, advertisement is typically more effective in inducing consumers to try a product for the first time than to affect their decision regarding purchasing the product again. FIG. 9 illustrates curves 520 and 522 representing the percentage of consumers purchasing or using the product for the first and second time, respectively, over a certain period time at the same level of advertisement $X. Curves 524 and 526 represent similar quantities at the level of advertisement Y, with Y<X. Thus, consumer response to advertisement of a certain product is affected by both advertisement spending and previous trials of the product, and it is generally more difficult to induce repeat trials than first trials. Further, curves 540 and 542 in FIG. 9A illustrate the impact of inadequate spending on market share. Still further, curves 546 and 548 in FIG. 9B illustrate example responses to advertisement of an old product and a new product, respectively. It will be appreciated from the curves 546 and 548 that a new product is more responsive to advertisement spending than an old product. In this sense, the curves 546 a 548 illustrate the principle "you are new only once."

It will be noted that while the curves 450, 500, 502, 520-524, 540-548 relate to a hypothetical products, the relationships illustrated in FIG. 8, FIG. 8A, and FIGS. 9-9B have been found to agree with empirical data. Similarly, the mathematical theories set forth below have been tested and found to conform to real life observations. Several formulas which one or both of the structure analysis module 154 and the simulation module 152 may use in generating predicted switching matrices or simulating the introduction of a new product, for example, are discussed next.

To determine the aggregate switching between items, predictable uncertainty $U_p$ for a particular brand having a market share S can be defined as follows:

$$U_p=-S*(1-S)*(S*\text{Log}(S)) \quad \text{(Equation 1)}$$

while random uncertainty $U_r$ may be defined as:

$$U_p=S*(1-S) \quad \text{(Equation 2)}$$

Using the two values $U_p$ and $U_r$, the propensity to switch among competing items PSW may be defined as $$PSW = \frac{U_p}{U_r} \quad \text{(Equation 3)}$$

For example, in a market having brands A, B, C, and D having the respective shares 0.4, 0.3, 0.2, and 0.1, the predictable certainty and random certainty are as follows:

| Brand | Share | Predictable | Random |
|---|---|---|---|
| A | 0.4000 | 0.0880 | 0.2400 |
| B | 0.3000 | 0.0759 | 0.2100 |
| C | 0.2000 | 0.0515 | 0.1600 |
| D | 0.1000 | 0.0207 | 0.0900 |
| Total | 1.0000 | 0.2360 | 0.7000 |

From Equations 1-3 above, it will be noted that PSW is equal to 1.0 when no competition exists in the market and any selection is random. It will be further noted that the more competing items are present in a market, the smaller the value of PSW, and the more the market is concentrated, the smaller the value of the respective PSW becomes.

Further, the unique market rate of overall switching CF among n items may be defined as:

$$CF = 1 - \sum_{i=1}^{n} Ex_i,$$ (Equation 4)

where $Ex_i$ is percent exclusivity of the item i corresponding to the percentage of buyers who exclusively purchased this item over a certain time period.

Thus, in a market including several competing items including items A and B, aggregate switching $S_{A \to B}$ may be defined as:

$$S_{A \to B} = [Share_A] * [Share_B] * PSW * CF$$

User Interface of the Modeling and Simulation System

Figure 10:
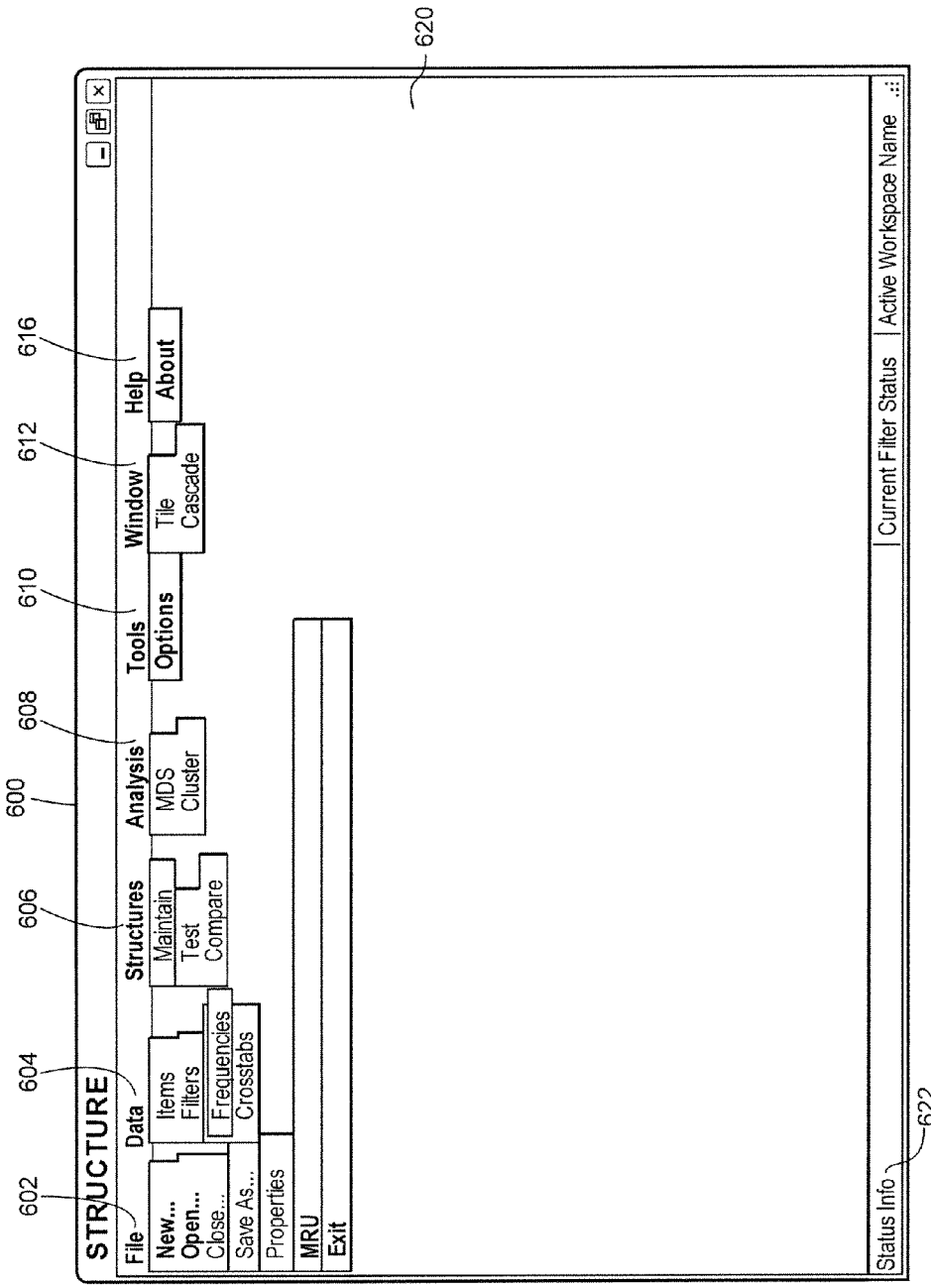
FIG. 10 is a wireframe view of an interface which the system illustrated in FIG. 1 may provide to a user for configuring and testing market structures.
Figure 10A:
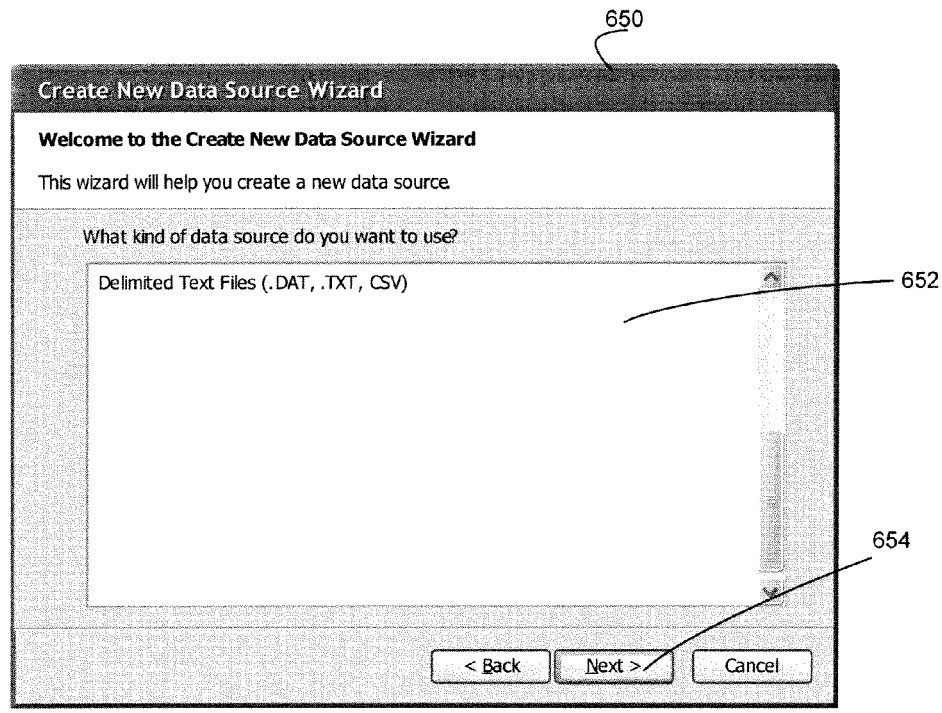
FIGS. 10A and 10B illustrate interface windows which the system of FIG. 1 may display to the user during importation of consumer data.
Figure 10B:
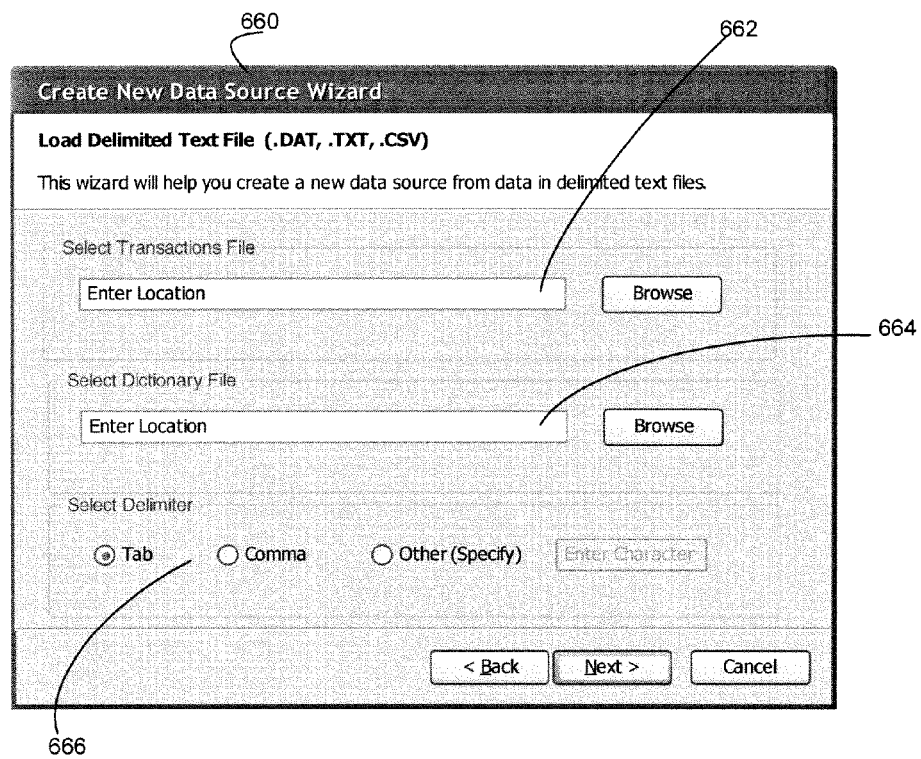

FIGS. 10-21 illustrate various aspects of the interface which the system 10 may support to enable efficient and intuitive definition of structures, importation of syndicated data, simulation of promotions or new products, and use of functions discussed above. In particular, FIG. 10 illustrates some of the menu options of the structure definition module 150 and/or structure analysis module 154; FIGS. 10A and 10B illustrate the interface for importing a data file into the system 10 for use with modules 150 and 154; FIGS. 11-14 illustrate attribute, item, cross-tab, and structure definition; and FIG. 15-21 illustrate the output of several analysis functions supported by the system 10.

Referring specifically to FIG. 10, a main window 600 may include a menu toolbar listing a file submenu 602 for administrative functions such as opening, closing files; a data management submenu 602 for invoking item definition functions, filters, frequency analysis functions, and other functions related to processing data sets; a structure management submenu 606 for creating and editing structures, testing the fit of empirical data to a selected one or several structures, comparing two or more structures, etc.; a tools menu 610 for selecting various options related to visual controls, data management, etc.; as well as the windows and help submenus 612 and 616 generally familiar to one of ordinary skill in the art. The analyst may manipulate consumer data, attributes, items, and structures using the canvass area 620. The status bar 622 may provide additional information related to the state of a current operation (e.g., importing data, calculating projected values, etc.).

In some embodiments, the window 600 as well as other windows or screens of the system 10 discussed below may display menu options and controls in the style similar to the Ribbon interface developed by the Microsoft Corporation. In particular, the system 10 may display options and controls in view of the particular context to further simplify the use of the various system functions. In some embodiments, the system 10 may support a different (e.g., "web-like") interface for remote users accessing the system 10 via the world wide web.

Now referring to FIGS. 10A and 10B, the system 10 may provide an automated procedure for applying consumer data to one or several structures and, as part of the automated procedure, may initially ask the analyst to specify the type of a source file. A window 650 illustrated in FIG. 10A includes a selection area 652 and several controls 654 for specifying the desired format such as delimited text in a binary file, an ASCII file, a Unicode file, etc. Referring back to FIGS. 3 and 4, the data file 300 or 350, the layout file 355, and the dictionary file 360 may be supplied in any consistent manner. Accordingly, the window 660 provides a selection area 662 for specifying a transaction file such as the data file 300, selection area 664 for specifying a dictionary file 355, and, if desired, a layout file (not shown). In this example, the window 660 also allows the user to specify one or several delimiters using controls 666.

Figure 10C:
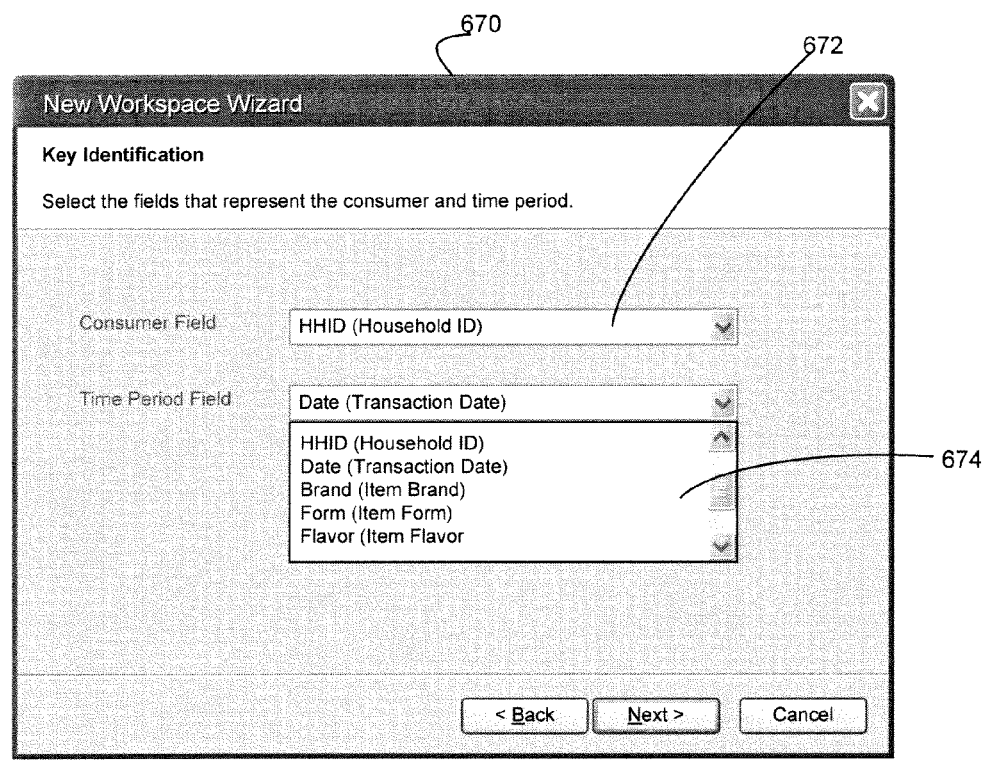
FIG. 10C illustrates an interface window for selecting a pair of attributes for use as a key in identifying transactions.

Next, the user may select one or several attributes from the data file imported using the interface of FIGS. 10A and 10B and associate these selected attributes with a key for identifying a particular transaction. FIG. 10C illustrates one example of an interface window 670 which, in this embodiment, guides the user to select a consumer identifier field and a time period field as the pair of key attributes. The system 10 may obtain the selections in the scrollable windows 672 and 675 from the corresponding layout or dictionary file discussed above.

Referring to FIG. 11, the analyst may then review and, if desired, edit the attribute information retrieved from the data, dictionary, and layout files. More specifically, the window 680 may display an interactive table with a field name column 682, a variable name column 684, and a label column 686. In an embodiment, the columns 684 and 686 may be editable while the column 682 may be read-only. Referring back to FIG. 2A, the interface illustrated in FIG. 11 may be used by the attribute definition module 171.

Figure 12:
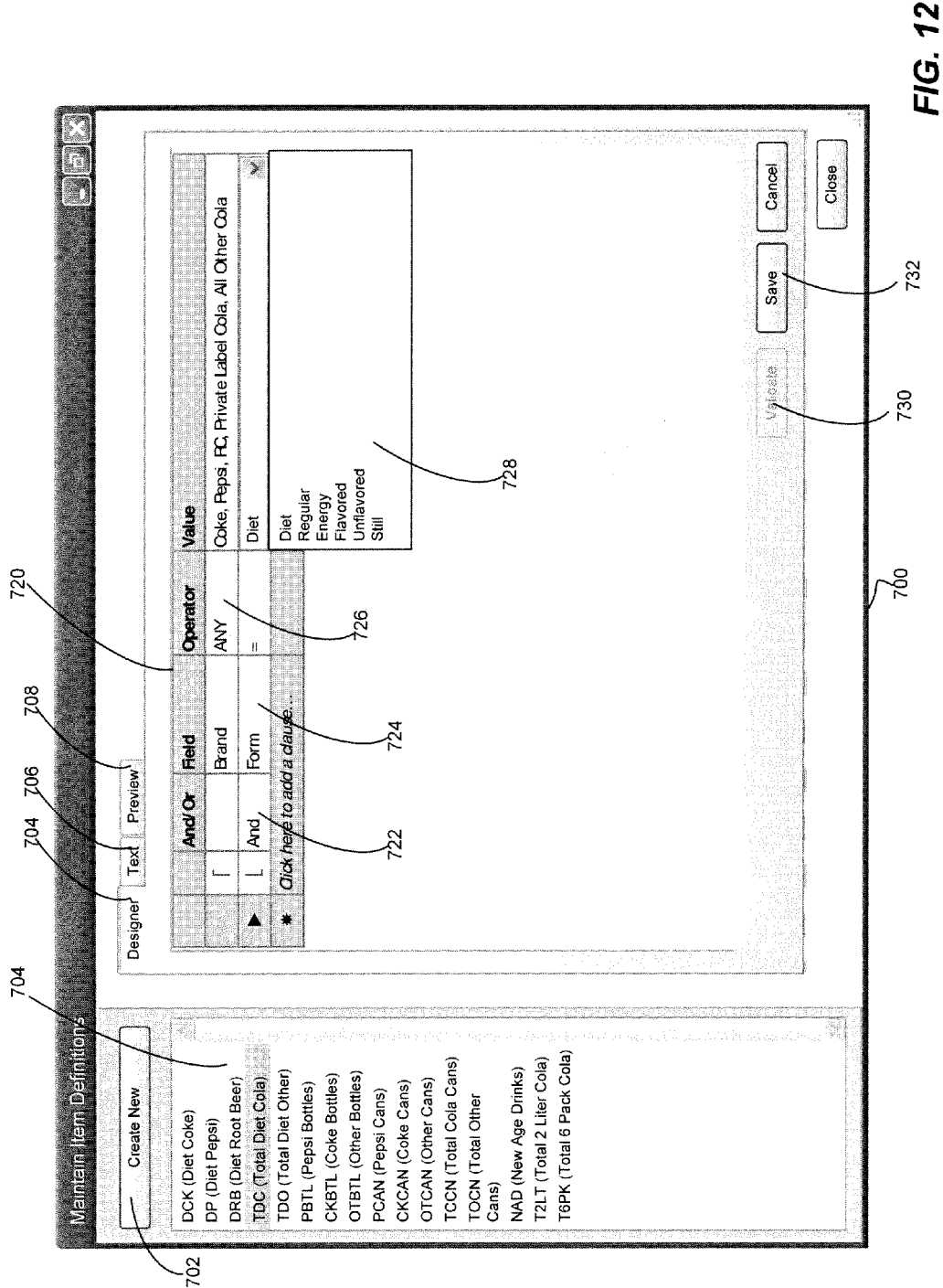
FIG. 12 is an example of an interface the system of FIG. 1 may provide to a user for defining items having one or several attributes.

Next, FIG. 12 illustrates an example interface screen 700 of the item definition module 172 (see FIG. 2A). The interface screen 700 may include a primary control 702 for creating a new item definition and a scrollable list 704 of existing item definitions. To create new or edit existing definitions, the interface 700 may include an item design tab 704 with an interactive builder 720, a text tab 706, and a preview tab 708. The interactive builder 720 provides a quick and efficient approach to defining items having any level of desired complexity. In particular, the analyst may select Boolean operators using a field 722, attributes (or fields in the source data file) using the filed 724, and non-Boolean logical operators using the field 726. Further, the user may invoke additional controls on the interface screen 700 for recursive definition, bracketed or nested expressions (e.g., grouping operators), and wildcard selections (some not shown). The field 728 allows the user to select or add values to match the resulting expression. As an alternative to the builder 720, the analyst may prefer to define items using a free-text format of the text tab 706.

Further, the preview tab allows the analyst to quickly apply the new definition to the available consumer data and see how many entries or transactions match the new definition. It will be appreciated that this features conveniently allows analysts to run a "sanity check" or, if desired, a more thorough validation test prior to completing multiple definitions and without leaving the item definition interface 700. This feature may be particularly useful when the analyst relies on recursive definitions because the preview tab 708 may help him or her to timely identify an error in definition.

Figure 13:
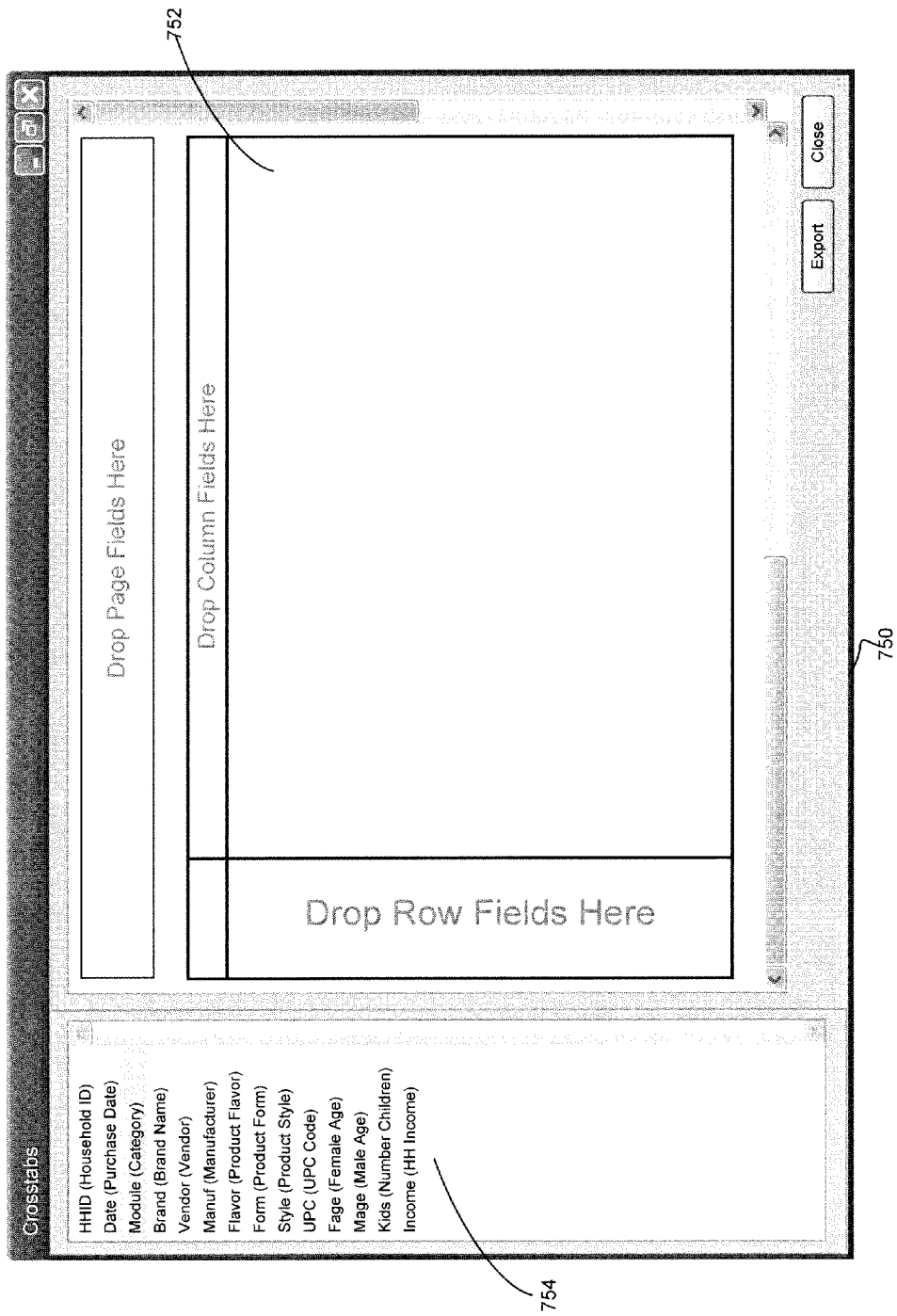
FIG. 13 is an example output of a crosstab definition and analysis module which the system of FIG. 1 may provide to the user as part of data diagnostics.

Referring to FIG. 13, a cross-tab module 204 (see FIG. 2A) may support a cross-tab definition interface 750 having a canvass area 752 and an item list 754. The interface 750 may rely on pivot grid interface so that the analyst can select items from the item list 754 and drag-and-drop the selected items onto the corresponding column and row drop-off areas of the canvass area 75.

Figure 14:
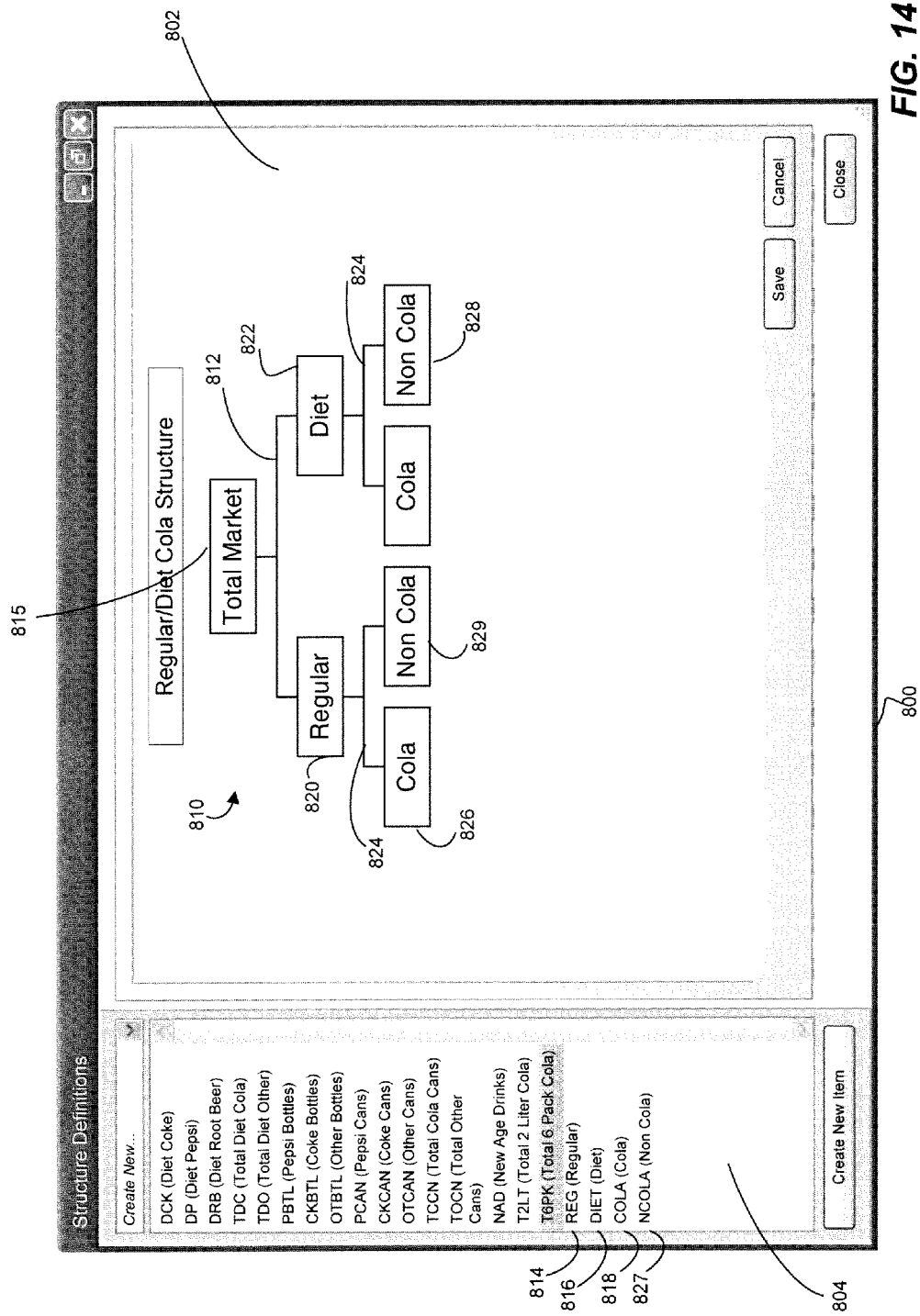
FIG. 14 is an example interface which the system of FIG. 1 may provide to a user for defining a market structure.

FIG. 14 illustrates a structure definition interface screen 800. As discussed above with reference to the structure definition module 172, the system 10 allows analysts to efficiently define a structure consistent with a hypothesis regarding the dynamics of competition as viewed from a customer's perspective. The interface screen 800 may include a canvass area 802, an item list 804, and several controls for saving and/or testing the structure. In an embodiment, the interface 800 may include one or more additional panes for viewing the levels of the structure, viewing structure properties, exploring cross-categories, etc. Further, the interface screen 800 may include a zoom option to allows users to focus on a particular segment of the market structure. Still further, the interface screen 800 in some embodiments may include controls for validating the structure, exporting the structure into a standard format such as ASCII text or spreadsheet data, changing the orientation of the display, etc.

As illustrated in FIG. 14, the interface screen 800 displays a certain structure 810 of a market M in form a hierarchical tree, with each item represented by a box at a particular level of the structure. If desired, each box may include any information deemed relevant by the particular analyst. The interface screen 800 may also apply partial coloring to a box representing an item to illustrate the percentage of the market currently occupied by the item or category. For example, if a certain level 812 of the market M includes two categories, regular and diet, having the respective shares of 40% and 60%, the box representing the carbonated category may be shaded, distinctly colored, or otherwise altered visually in approximately 40% of the area of the box, and the box representing the non-carbonated category may be accordingly altered visually in approximately 60% of the area of the box. Preferably, each box on a particular level is of the same size so that the user 60 may readily understand how big the share of a particular category is without looking at the actual numbers. Further, the interface screen 800 may allow analysts to expand or hide categories by clicking on the corresponding controls attached to each box. In this manner, analysts may define large complex structures and view these structures with different degrees of specificity depending on the particular application or scenario.

When constructing the structure 810, the user may select an item 814 from the item and place the item 814 under the default total market indicator 815. In this example, the user may have previously defined the item 814 as a product that satisfies the statement if (type=1) regular=1, for example, and assigned the name regular to the item. Similarly, the item 816 may be named diet and correspond to the statement if (type=2) diet=1. In an embodiment, the structure definition module 172 always places the total market indicator 815 into the canvass area 802 in response to a request to create a new structure. Once the user places the item 814 at the level 812 (by dropping the item 814 "into" the total market indicator 815, for example), the structure definition module 172 may automatically add a box 820 identifying the added item 814 and draw a line directly connecting the item 814 to the indicator 815 or provide another graphical or textual indication that the item regular has now been successfully associated with the most general level of selection within the market M. The structure definition module 172 may similarly generate a box 822 in response to the user selecting the item 816 and dropping the item 816 into the desired level 812 using the interface screen 800. Next, the user may select the item 818 named cola and matching the definition if (category=1) cola=1, for example, and drop the item 818 into text box 820 to generate another level 824 of the structure 810 and, in particular, a box 826. It will be appreciated that according to the resulting definition of the structure 810, a product properly associated with the box 826 matches at least two item definitions: regular and cola. The user may also drop the item into the box 822 to generate a box 828 matching definition of items diet and cola, and the item 827 to generate a box 829 matching the definition regular and non-cola. Proceeding in this manner, the user may define a market structure of any desired complexity.

Accordingly, the structure 810 requires that a typical selection of a product by a hypothetical consumer proceed by selecting between regular and diet drinks first and only then selecting the desired type (cola or non-cola in this simple example). As will be appreciated in view of the discussion above, the structure 810 also predicts certain switching decisions and a particular characterization of market dynamics when advertisement and promotional spending is applied to one or more products. For example, the structure 810 as illustrated in FIG. 14 suggests that consumers who typically purchase a product matching the definitions of items 814 and 818 (box 826) will more readily switch to a product matching the definitions of items 814 and 827 (box 829) than, for example, to a product matching the definition of item 816 (box 822).

With reference to FIG. 15, the frequency analysis module 206 or another component of the system 10 may generate a frequency distribution screen 830 in response to the analyst requesting a frequency analysis of the consumer data and, in particular, of the distribution of transactions with respect to one or several defined items and/or one or several data attributes. The frequency distribution screen 830 may include an item or attribute selection pane 832 and a frequency chart 834 which may specify an attribute or item in the field 840, a count field 842 specifying the number of entries matching the criteria specified in the field 840, and a distribution percentage field 844.

Figure 16:
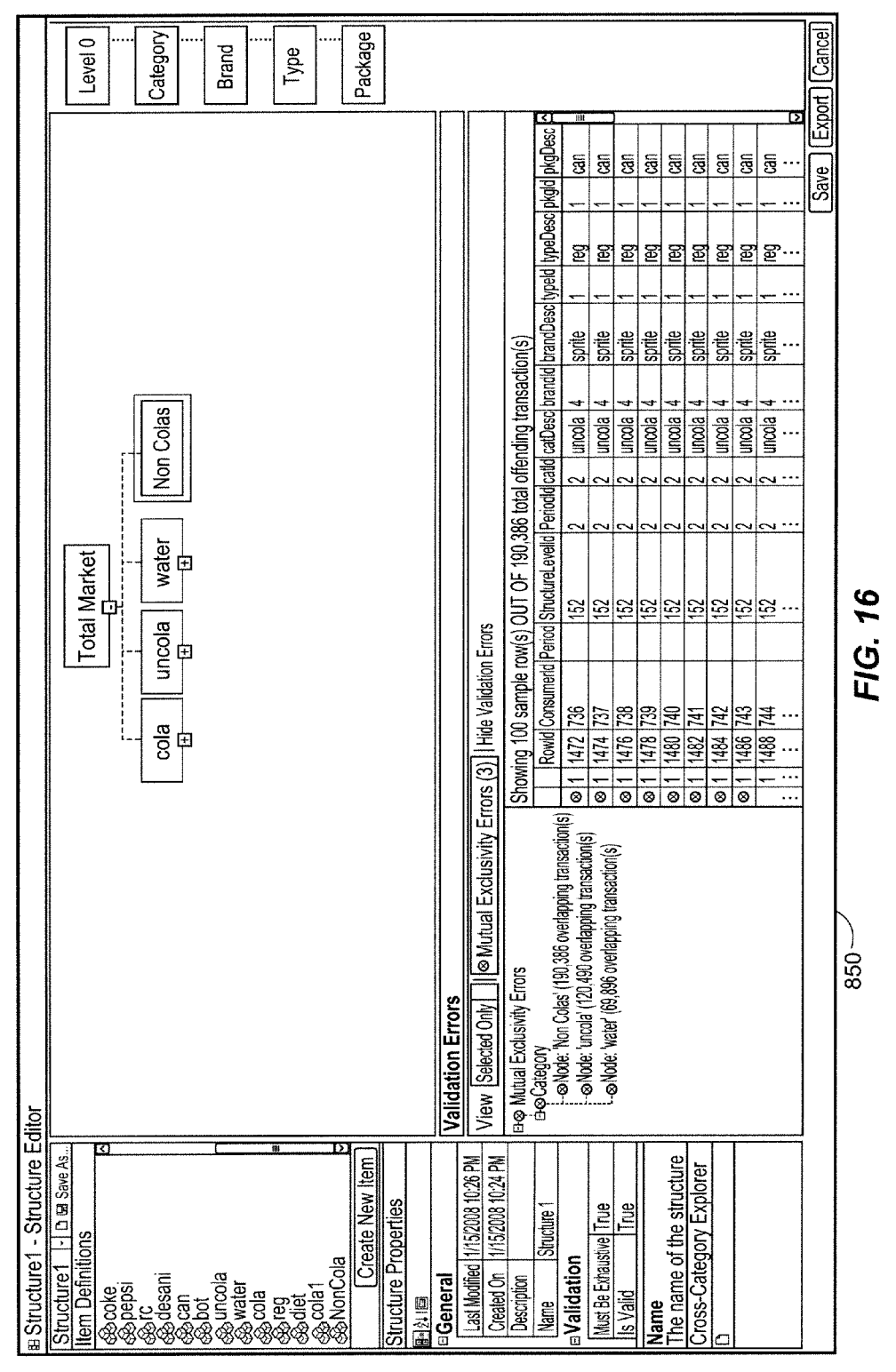

FIG. 16 illustrates one example of an output generated by the structure validation module 178. As indicated above, the module 178 may detect that the definitions on a certain level of the market structure are not mutually exclusive or, as another error condition, the definitions associated with a level of the structure may fail to exhaust all transactions. The analyst may invoke the validation function provided by the module 178 at any time. In some embodiments, the system 10 may invoke the validation function automatically.

Figure 17:
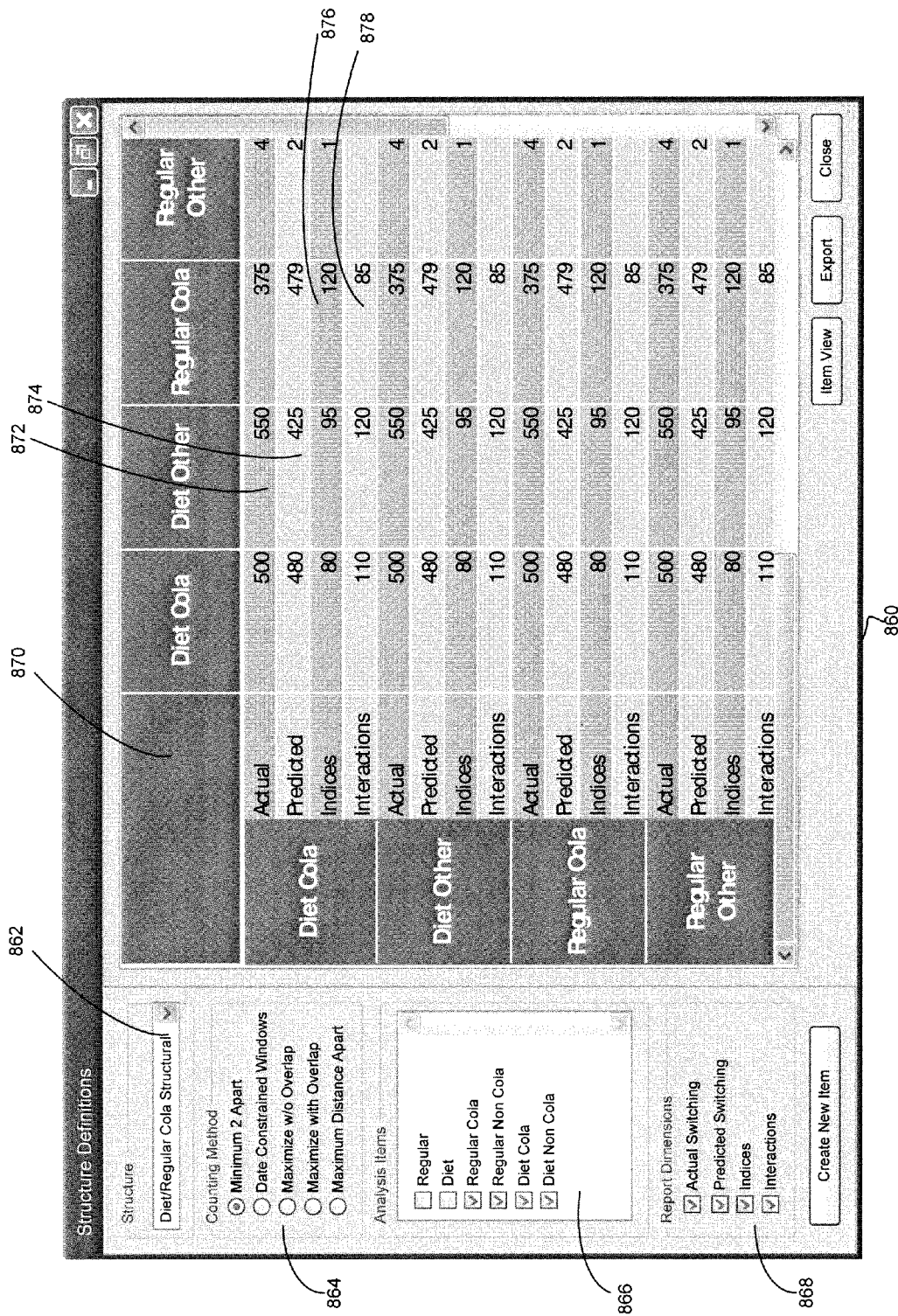
FIG. 17 is an example output of a structure analysis module which the system of FIG. 1 may apply to a structure defined using the interface illustrated in FIG. 15 and the syndicated data of FIGS. 2-3.
Figure 17A:
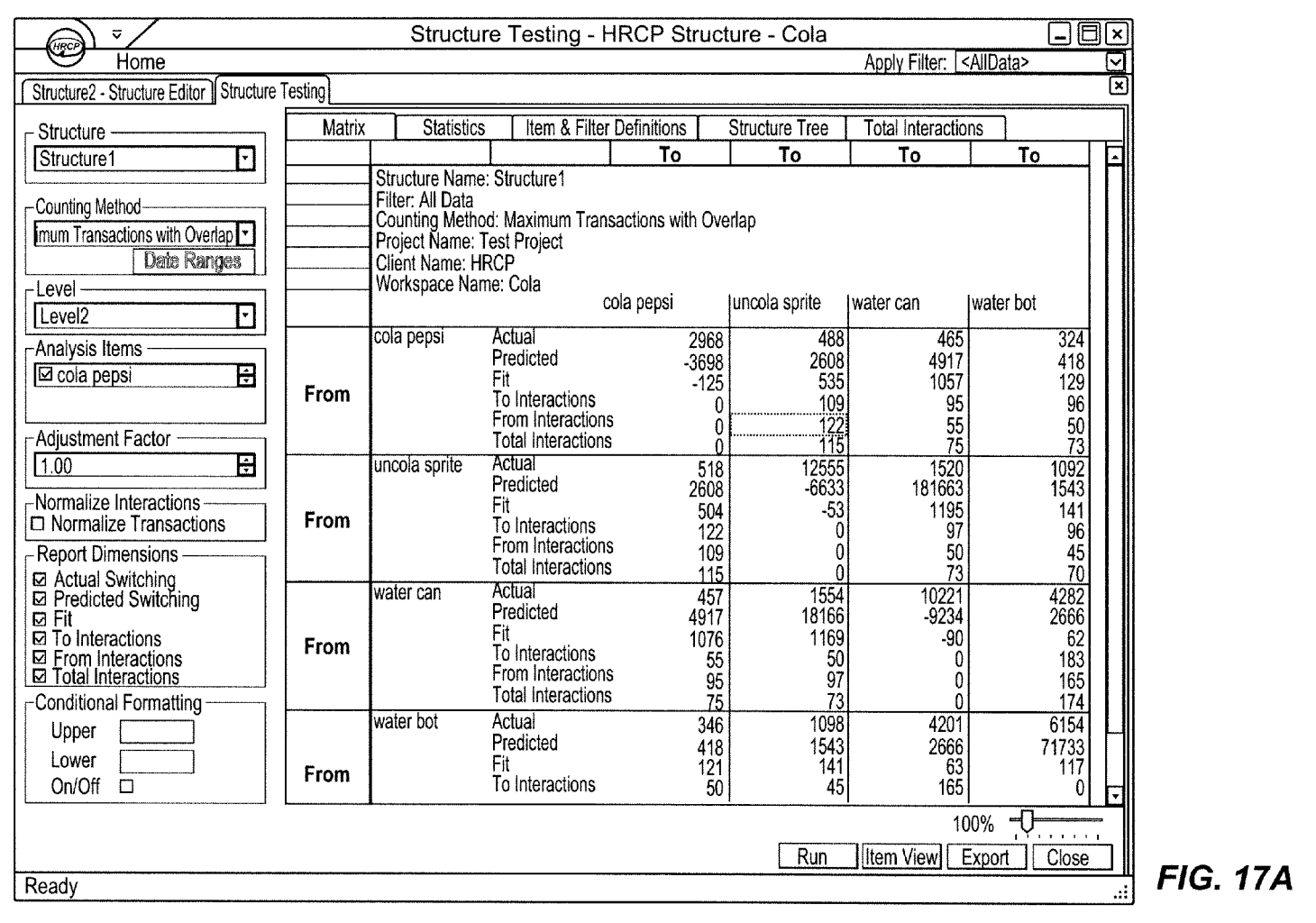
Figure 17B:
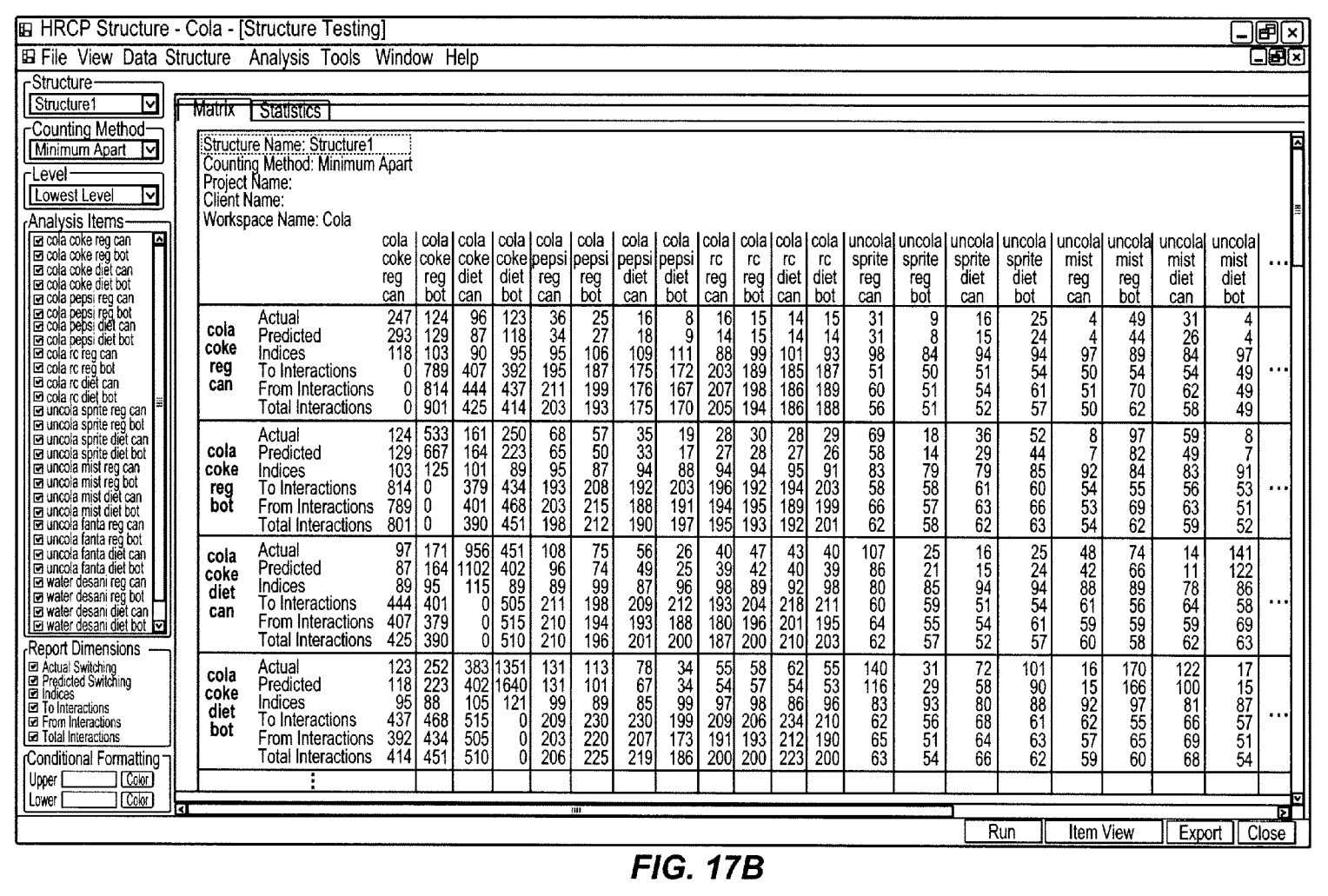

Now referring to FIG. 17, the item interactions analysis module 200 may cooperate with an interaction report interface associated with a primary screen 860. The screen 860 may include a structure selection control 862, counting method selection controls 864, item selection controls 866, report dimension selection controls 868, and a report window 870. As illustrated in FIG. 17, one possible output of the item interactions analysis module 200 based on the user selections entered via the elements 862-868 may be a square matrix listing each of the selected items in one column and one row. For each element of the resulting matrix, the report window 870 may list the number of actual switches calculated using the available consumer data in a field 872, and the number of predicted switches calculated in accordance with the theories outline above in a field 874. Additionally, the report window 870 may display the number of indices and interactions in the fields 876 and 878. FIGS. 17A and 17B illustrate additional example of reports which the item interactions analysis module 200 may generate in response to various selections of items, counting methods, structure levels, etc.

Figure 17C:
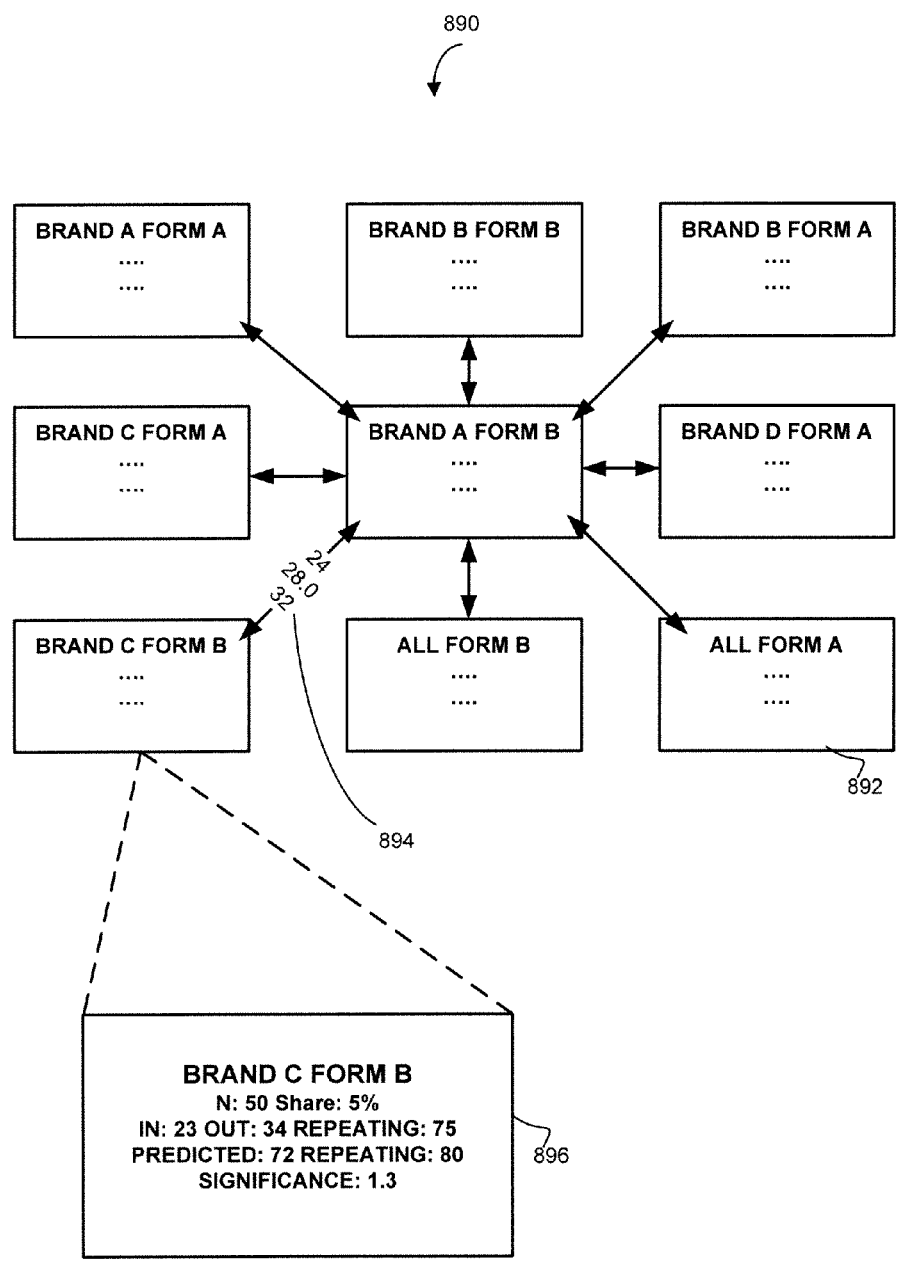
FIG. 17C is an example of a radial diagram generated by the structure analysis module.

As an alternative to the visualization technique illustrated in FIG. 17, the interactions analysis module 200 may report item interactions in form of a radial diagram 890 (FIG. 17C). In this example, each item brand/form tuple is displayed as a separate box 892 with arrows 894 indicating item interaction. An enlarged view of one of the items illustrates additional information provided inside each box: percentage of the total share, number of switches to the item (or "in" switches), number of switches from the item (or "out" switches), number of predicted switches, etc. In one embodiment, the radial diagram 890 includes all items associated with a particular level of the diagram so that together, the displayed items add up to the 100% of the market share. In other embodiments, the radial diagram may include only those items that were explicitly selected by the user.

Figure 17D:
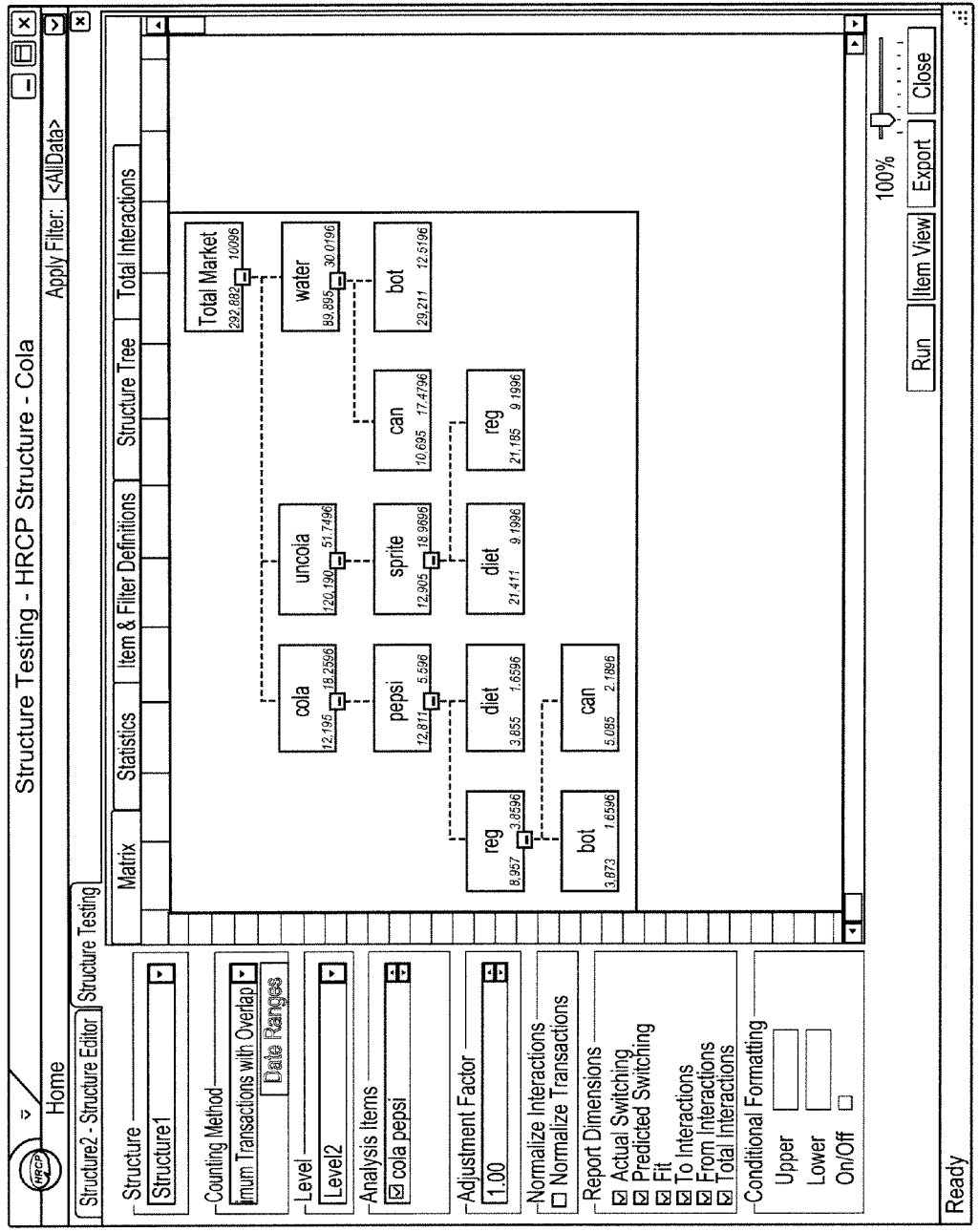
FIG. 17D illustrates an example structure tree view generated by the system of FIG. 1.

In addition to generating item interaction reports as illustrated in FIGS. 17-17C, the interactions analysis module 200 may generate a structure tree view illustrated in FIG. 17D. Each node may be conveniently indicate a number of transactions corresponding to the attributes of the node. If desired, each node may including an amount of shading or a progress bar, for example, to additionally indicate a proportion of the entire market share corresponding to the node.

Figure 18:
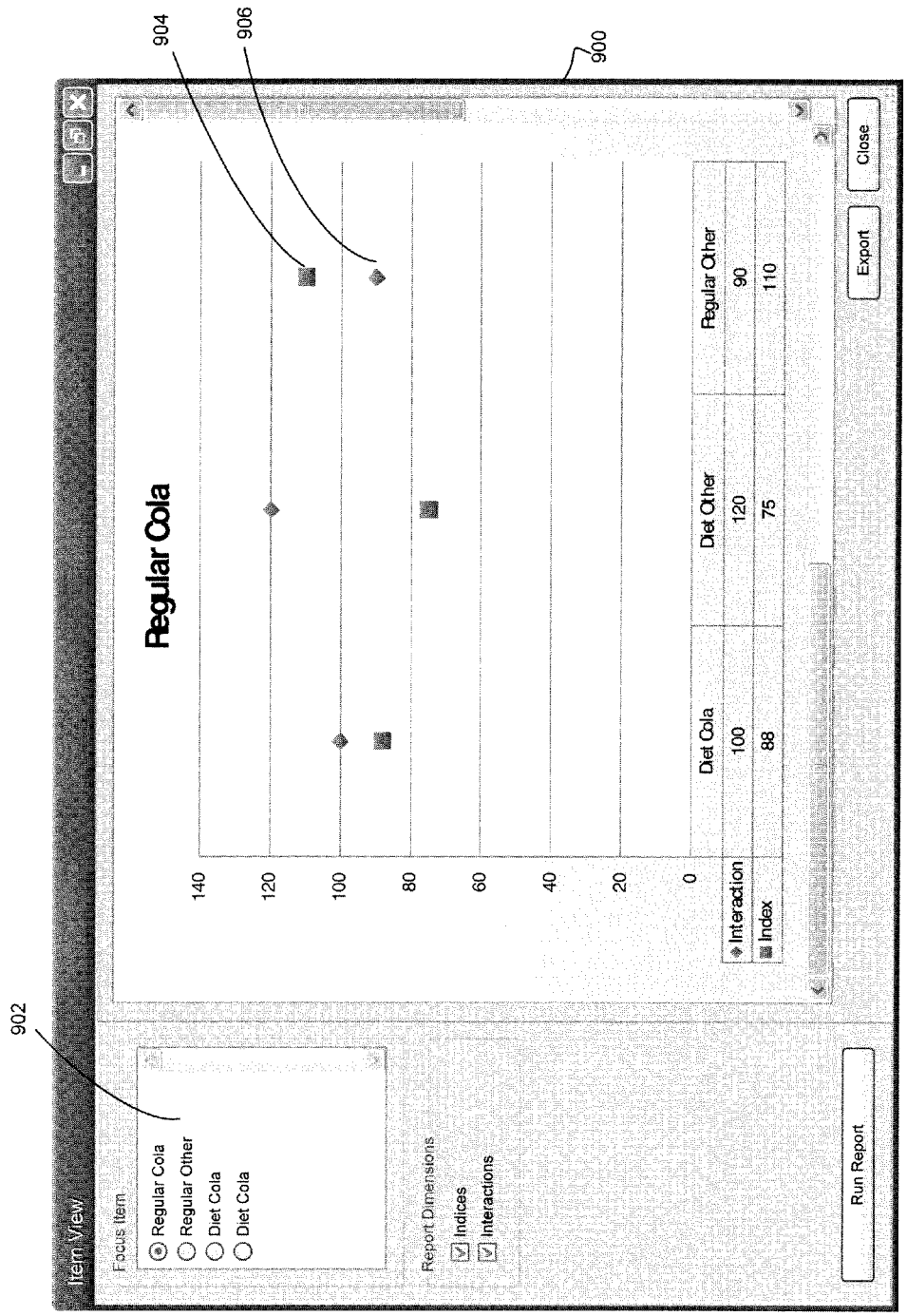
FIG. 18 is another example output of a structure analysis module which the system of FIG. 1 may apply to a structure defined using the interface illustrated in FIG. 15 and the syndicated data of FIGS. 2-3.

As yet another alternative, the interactions analysis module 200 may generate one or several focused, item-specific graphs illustrated in FIG. 18. In this example, the screen 900 illustrates the interaction of a certain item (selected, for example, using the focus item selection 902) with several other items by placing symbols 904 and 906 into the corresponding positions in the graph. The symbols 904 and 906 in this embodiment correspond to a switching index and an interactions metric, respectively. In this manner, the user can efficiently analyze the interaction of a selected item with some or all of the rest of the competitive set.

FIG. 19 illustrates another visualization technique which may be applied to a competitive set. In particular, the interactions analysis module 200 may generate a dendogram 922 in response to the user selecting the desired counting method using the controls 924 and selecting the competitive set using the controls 926. As is known, a dendrogram visually illustrates clustering of variables. In this example, items 930 and 932 have a distance coefficient of about of 7.5, after which point they merge into a single entity and may again merge with the next entity at the coefficient of about 8.1.

Figure 20:
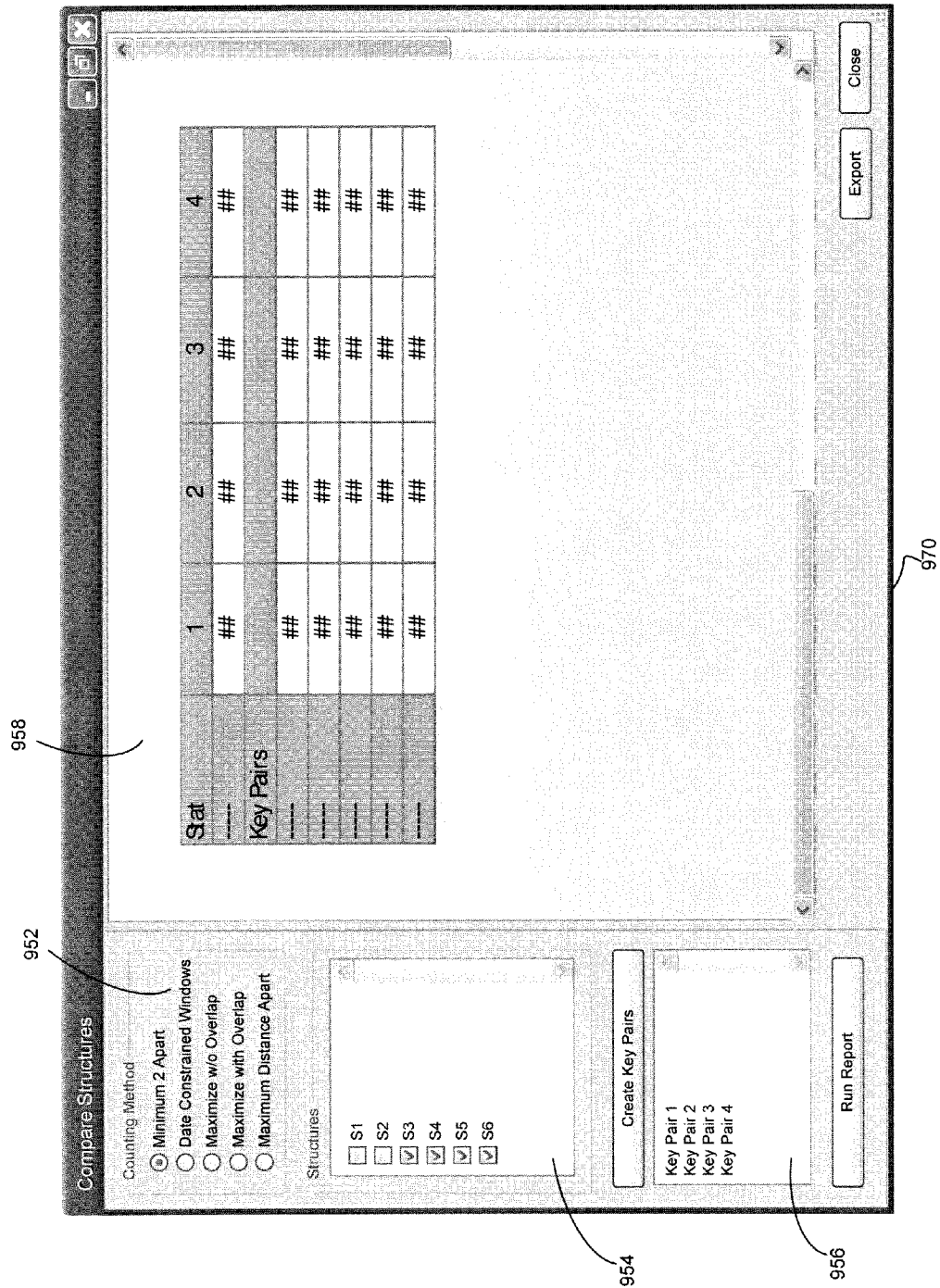
FIG. 20 is an example output of a structure compare module of the system of FIG. 1.
Figure 21:
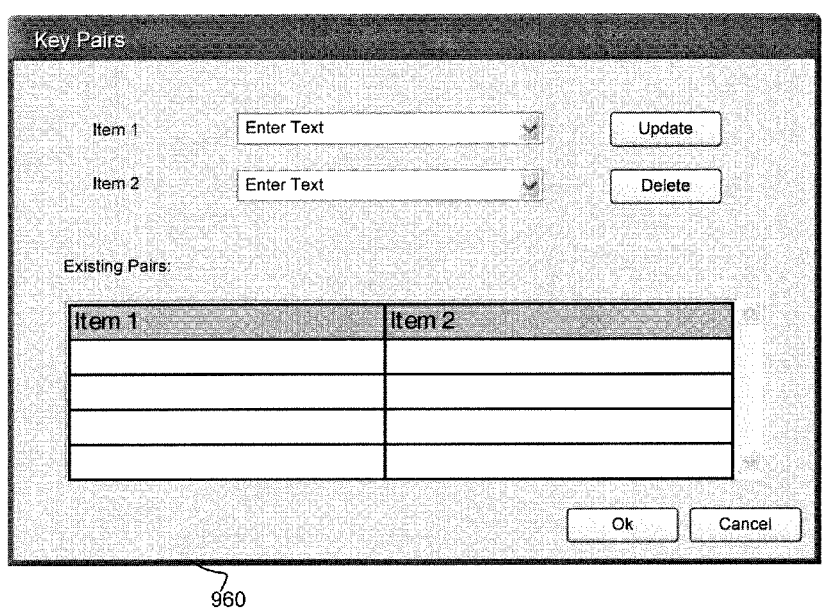
FIG. 21 is another example of an interface screen associated with the structure compare module of FIG. 20.

Referring to FIG. 20, the user may interact with the structure compare module 202 via an interface screen 950 to compare two or more structures. The interface screen 950 may include a counting method selector 952 to selecting the desired approach to comparing structures, a structure selector 954, a key pair selector 956, and a results pane 958. The structure selector 954 may optionally include a filter that prevents incompatible structures (i.e., structures that do not item definitions). As discussed above, a comparison between structures may be based on key pairs, and the key pair selector 956 may accordingly include a control for convenient selection or definition of key pairs. One example of a key pair definition interface is illustrated as a window 960 in FIG. 21.

Simulating New Products and Scenarios

Figure 22:
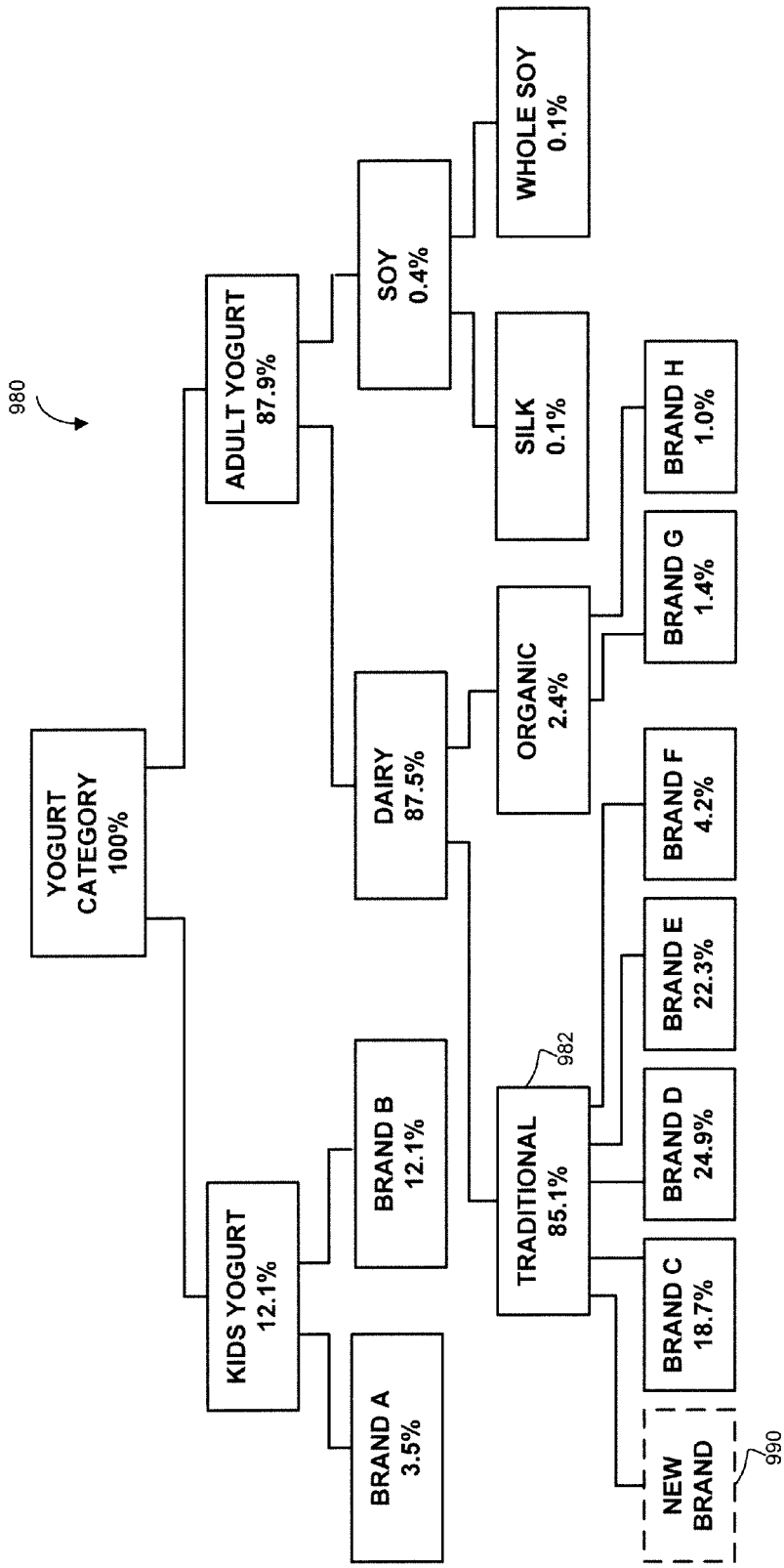
FIG. 22 schematically illustrates the introduction of an item as a new brand into an existing structure.
Figure 23:
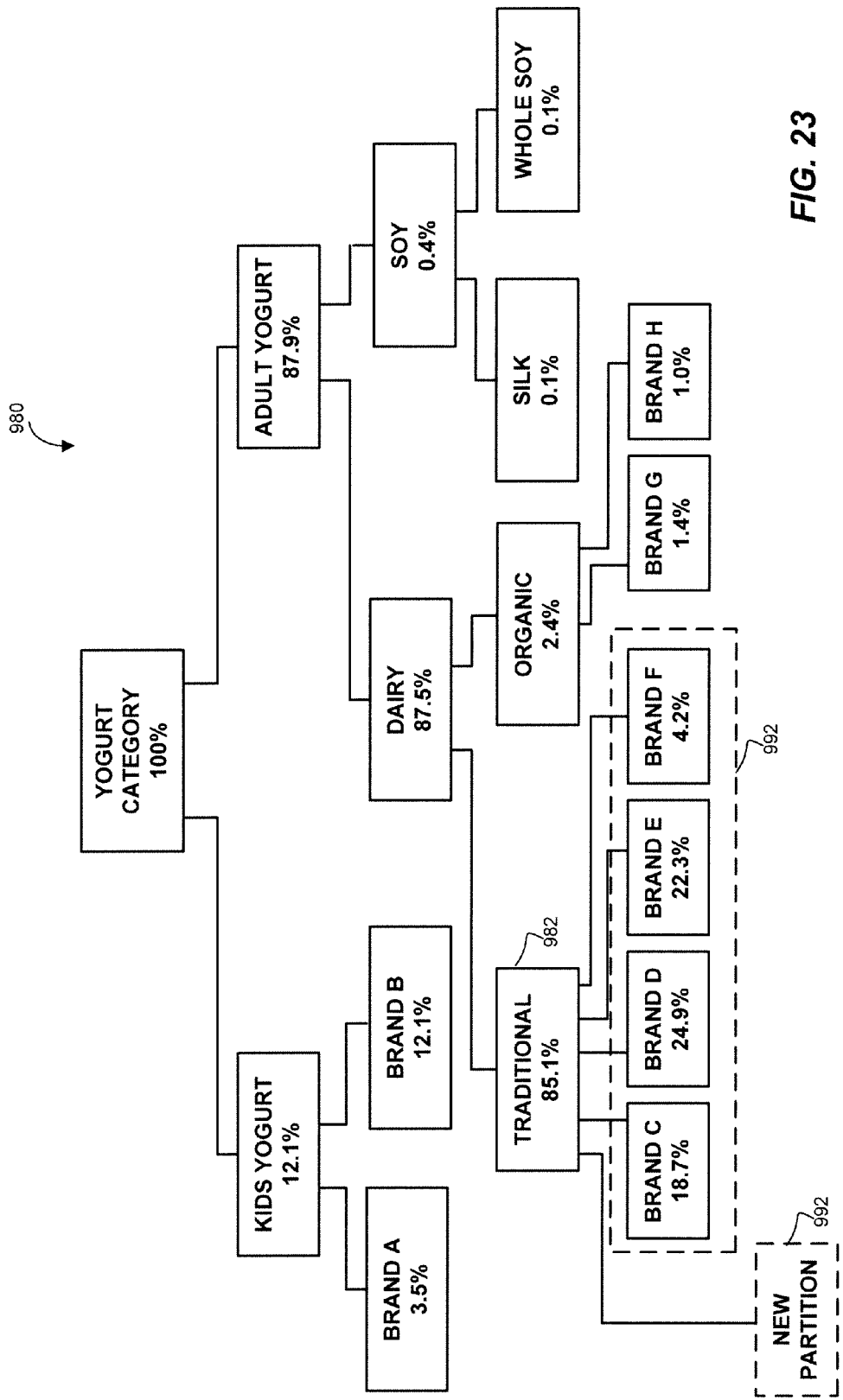
FIG. 23 schematically illustrates the introduction of an item as a new partition into an existing structure.

FIGS. 22 and 23 illustrate one example of a market 980 in which several yogurt products compete. The market structure 980 is illustrated as being divided into "kids yogurt" and "adult yogurt" at the least specific level 982 and further into dairy and soy, silk and whole soy, traditional and organic, and brand categories at the more specific levels. In addition to the categories illustrated in FIG. 22, the products may be further associated with a number of flavors, sizes, types of packaging, fat content, etc. Using simulation interface screens similar to those discussed above with reference to FIGS. 10-21, the user may add one or several new products to the structure 980 as, for example, a new brand at a selected level, a new partition at a selected level, or at another entry point. In particular, the new yogurt is introduced to the market 980 as a new brand 990 under the traditional category 992 in FIG. 22 and, in accordance with an alternative hypothesis, as a new partition 994 as positioned relative to the existing partition 996 in FIG. 23.

In response to the analyst activating a control for adding a new product at a desired point in the market structure and according to a specified type (brand, partition, etc.), the simulation engine 152 may provide a pop-up dialogue or a series of dialogues to receive such user-configurable data as, for example, share, volume, planned advertisement, trade promotion, and consumer promotion budged, retail price, list price, cost of goods sold (COGS) or other indication of the manufacturing cost, etc. Additionally, the simulation engine 152 may provide default or suggested values (e.g., market share estimated as discussed below).

Upon configuring the new product, the simulation engine 152 may calculate the impact of the new product on the market and display the projected marginal contribution, revenue, and other parameters. The user may additionally select which factors should be displayed to simplify the output. Similar to structure modeling and testing described above, the user may analyze the projected impact on the market calculated by the simulation engine 152, adjust the retail price, consumer promotion spending, trade promotion spending, or combination thereof, and re-run the simulation to see whether the projected impact is more desirable.

To effectively and accurately simulate a new product, the simulation engine 250 may require such information as the launch date of the product, the one or several specific entry points in the market structure, effectiveness relative to competition expressed numerically as discussed in more detail below, the distribution which may be uniform for the selected period of time or time interval-specific (e.g., year-by-year), retail pricing, list pricing, other cost factors, product features such as size, form, etc. that may be affected by cross-category preferences, category trends such as an indication whether the partition to which the product is being introduced in growing or declining. As a specific example of some of these parameters, the analyst may wish to perform some preliminary market simulations prior to introducing a new yogurt to the market in order to determine the market potential of the new yogurt, the required advertisement support, and probable product effectiveness for several potential entry points and under other conditions. The analyst may specify the desired distribution as 50% in the first year, 64% in the second year, and 70% in the third year in the "traditional" section of the market, and 30% in the first year, 40% in the second year, and 50% in the third year in the "organic" section. The analyst may then set the retail price at $2.64 per 16 ounces, the price to trade at $1.73 per 16 ounces, and variable cost at $0.96 per 16 ounces.

Figure 24:
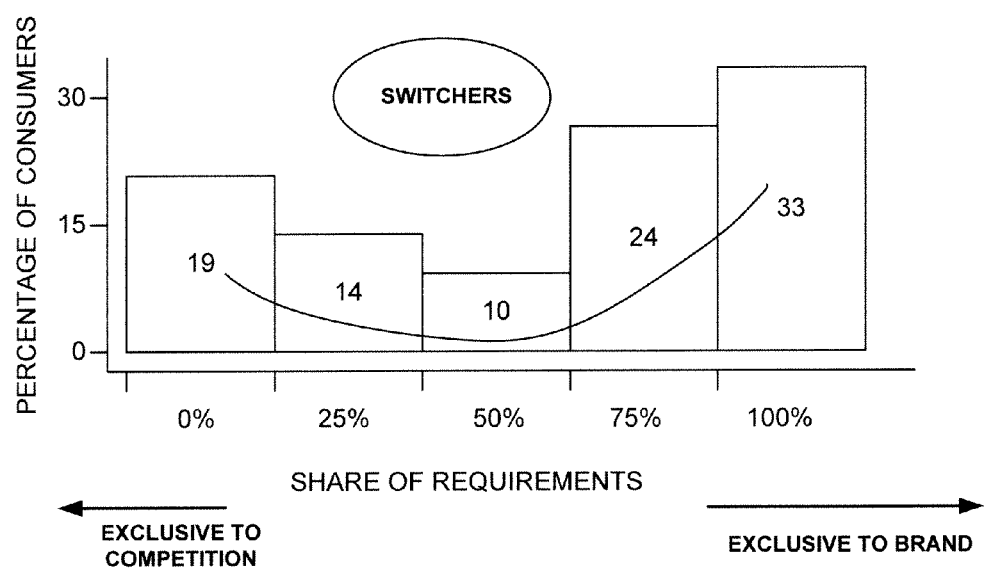
FIG. 24 illustrates the relationship between the number of consumers potentially switching to a product and the degree of loyalty to other products of these consumers.

In some embodiments, the system 10 may calculate a share of a new product by applying the same principles that affect segmentation and product interaction within an existing competitive set. In particular, the source of consumers (or, more generally, of business) for a new product depends on the number of switchers in the competitive set which, in turn, is a function of at least the number of competing items and loyalties to existing items. FIG. 24 illustrates the approximate number of potential switchers for the segments of the consumer pool grouped according to loyalty to a brand or competition. In accordance with these principles, the simulation engine 152 may approximate the par share of a new product as the average share of a product within the same competitive set multiplied by the percentage of uncommitted buyers. If a certain market is completely polarized (i.e., every consumer is always loyal to one alternative or another), there is no switching at all and the par share for a product with average pricing, distribution, support, etc. is zero. If, on the other hand, the market is completely un-polarized, every alternative is equally appealing to a consumer and the par share is equal to the average share. In general, the simulation engine 152 calibrates the par share in view of several factors such as distribution build, price, spending, product effectiveness, etc.

With respect to the entry points, it will be noted an entry point "higher" in a structure than another entry point (i.e., associated with a more general category) corresponds to more volume and a larger spending requirement. For some markets associated with the food or grocery industry, for example, the simulation engine 152 may also account for the industry-specific factor that new forms typically deliver larger benefits than new sizes, thereby resulting in a greater incremental volume in response to increased spending. In an embodiment, the simulation engine 152 may support a matrix of adjustment values with respect to some or all attributes to account for the difference in impact for one or several particular industries. In some embodiments, the matrix may be also user-configurable.

To estimate the share of a new product, the simulation engine 250 may follow the following approximation of an initial market share:

| | Number of competitive brands | | | | | |
|---|---|---|---|---|---|---|
| | 1 | 2 | 3 | 4 | 5 | 6 |
| Brand 1 | 100 | 73 | 62 | 55 | 50 | 41 |
| Brand 2 | | 27 | 22 | 20 | 18 | 18 |
| Brand 3 | | | 16 | 14 | 13 | 13 |
| Brand 4 | | | | 11 | 10 | 11 |
| Brand 5 | | | | | 9 | 9 |
| Brand 6 | | | | | | 8 |
| Total | 100 | 100 | 100 | 100 | 100 | 100 |

Thus, one of the primary factors affecting the market share of a new product is the order of entry into the corresponding segment. The table above illustrates, in part, that a new product entering a single-product market captures approximately 30% percent of the market if the new product is at parity with the existing product with respect to quality and marketing support (e.g., advertisement, promotion, etc.). In an embodiment, the simulation engine 152 may apply a matrix such as the table illustrated above to approximate an initial value of the share of the new product. The simulation engine 152 and the analyst selecting effectiveness factors, spending targets, etc. may then begin to refine the original estimate.

The simulation engine 250 may calculate the projected share of the new product and display results in form of a pie chart, a histogram, or in any other desired format. It will be noted that share distribution illustrated above corresponds to par shares, or shares assuming parity among items with respect to quality, availability, price, effectiveness, marketing support (e.g., advertisement and promotion). When introducing a new product to a simulated structure, the analyst may select at least effectiveness, price, and distribution. In an embodiment, the analyst may limit the effectiveness to segment-only (the partition or segment will not grow in terms of volume) or market-wide (the new product will source from other segments and the segment to which the new product has been introduced can grow). It is contemplated that the analyst may use the segment-only option to launch line extension items such as new flavors or sizes of an existing product. In other words, if the improvement is relatively minor, analysts typically do not expect the new product to have a noticeable impact on the entire market.

Referring to FIGS. 22 and 34, the analyst may introduce the new yogurt as the next brand in the category "traditional" (FIG. 22), a new partition in the category "traditional" (FIG. 23), the next brand in the category "organic," or a new partition in the category "organic." In this example, the analyst may discover that placing the new product in the organic section should result in lower advertising spending. Based on the assumed positioning and sourcing potential, the user may assign define the following effectiveness ranges:

| | Traditional | | Organic | |
|---|---|---|---|---|
| Entry Point | Next Brand | New Partition | Next Brand | New Partition |
| Effect | 0.8 1.2 | 1.0 1.2 | 0.8 1.2 | 1.0 1.2 |

As illustrated above, product effectiveness is relative to the level at which a product enters the market.

In general, the level of effectiveness corresponds to a certain level of preference in a paired product test. For example, a 1.5 effectiveness for a next brand entering a partition means an overall preference win of 65/35 versus other brands, in total, within a partition. An 0.8 effectiveness could reflect a niche product highly preferred by small group of consumers but not preferred by the majority. For example, a 75/25 win versus other brands among 10% of buyers but a 35/65 preference loss versus other brands among 90% of buyers may correspond to the weighted average of 0.8:

$$E = \frac{2.1*10\% + 0.7*90\%}{100\%} \approx 0.8$$

Preferably but not necessarily, product effectiveness is tested using home use tests or other real life data. The system 10 may utilize any scale of product effectiveness. In the examples discussed herein, a par product which corresponds to the average quality, satisfaction, taste attraction (such as salad dressing, for example) has the effectiveness factor of 1. A product associated with a superior performance with respect to the existing features or qualities and possible addition of new features (such as bleach as compared to detergents in general) has the effectiveness between 1 and 2. On the other hand, a product with sub-standard performance with respect to most or all benefits or features of the product has the effectiveness between 0.5 and 1.

In another aspect, product effectiveness corresponds to the ratio of consumers choosing the product over the rest of the competitive set (regarded as a single alternative). In accordance with the scale discussed above, a 50/50 ratio corresponds to a "me-too" product of effectiveness 1.00. With some improvements of the ability of the product to address current needs, the effectiveness may rise to 1.21 corresponding to the 57/43 preference ratio (i.e., 57 out 100 consumers would prefer the new product). Further, a blend competing against "straight" flavors or packaging that makes the use of the contents more convenient may correspond to the effectiveness of 1.31 or the 60/40 ratio. Still further, brands that reasonably address a certain unique need may rise to the effectiveness of 1.51 and the 65/35 preference ratio. Maximizing a certain benefit (for example, superior taste of a certain premium brand) may have the effectiveness of 1.76 and the preference ratio of 70/30. The ratio of 80/20 may require that the product provide a perceived advantage similar to, for example, the desirability of an expensive pizza relative to a frozen pizza. Next, when a product is likely to create a partition by identifying and accordingly addressing a new need (e.g., a multi-blade razor entering a market having only single-blade razors), the preference ratio may be 80/20 and the corresponding effectiveness may be measured at 2.49. Finally, products providing a superior number of functions or features incompatible with existing products (e.g., soy milk entering the general milk market for the first time), the effectiveness may correspond to 3.1 and the preference ratio may be 85/15.

Further, the simulation engine 152 may implement adjustment factors or a similar technique to account for the differences in how products respond to advertisement. For example, a new product may be 3-4 times more responsive advertisement than an existing product. Further, the simulation engine 152 may calculate projected shares in view of the assumption than advertisement in the first year of a new product's life cycle is more important than the advertisement in the second year (i.e., the impact on the market is more pronounced in response to a higher initial spending). When calculating optimal spending curves, the simulation engine 152 may approximate the desired advertisement spending in the second year as approximately 70% of the spending in the first year, and the spending in the third year as approximately 30% of the spending in the first year.

However, if the analyst attempts to launch the new product as a new partition (FIG. 23), the new product may require sustained spending over several years. Accordingly, the simulation engine 152 calculate the optimal spending in view of the placement preference. If, on the other hand, the new product is merely a line extension, the optimal spending may correspond to a 90/10 distribution of funds over the first and second years, respectively.

Figure 25:
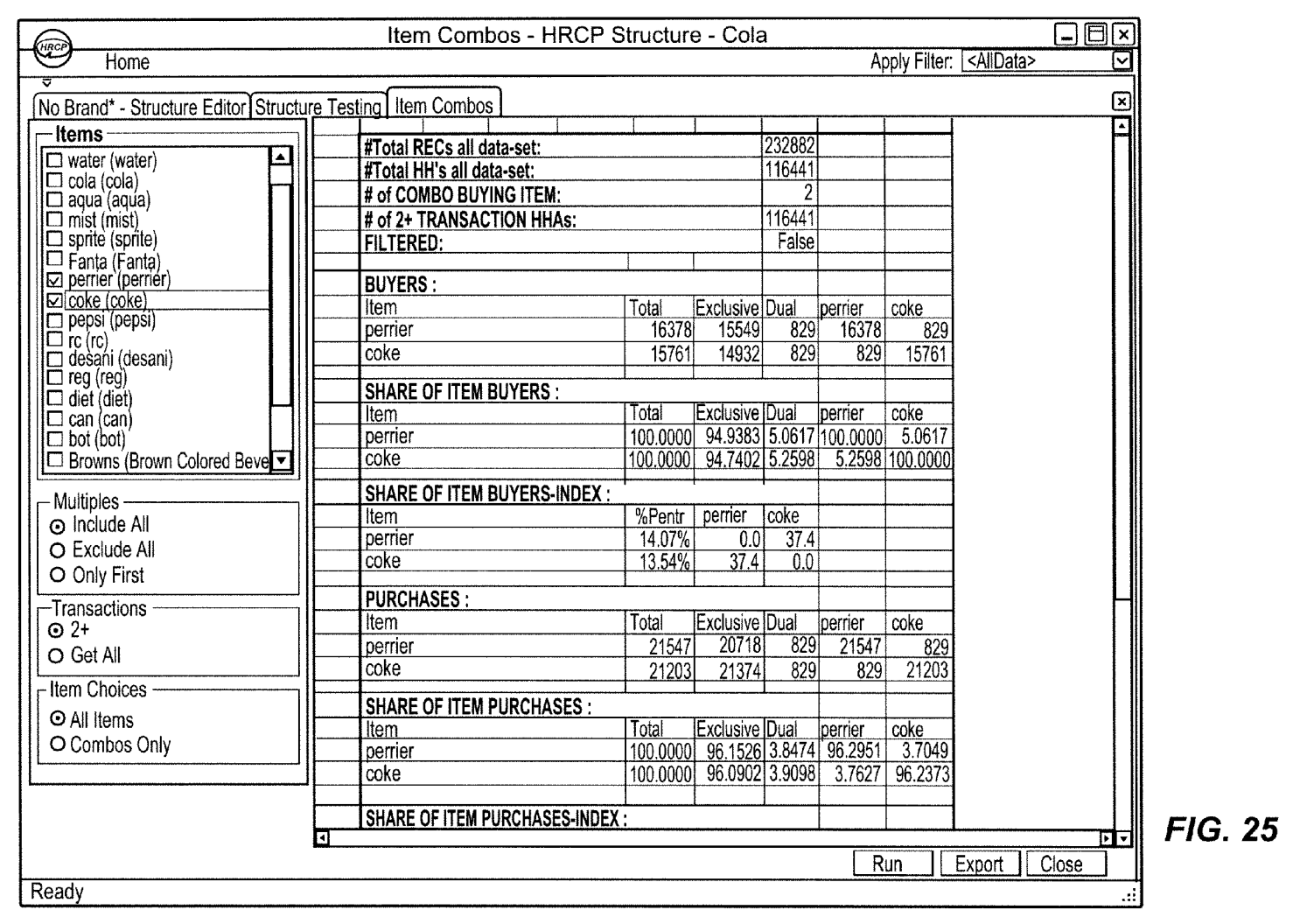
Figure 26:
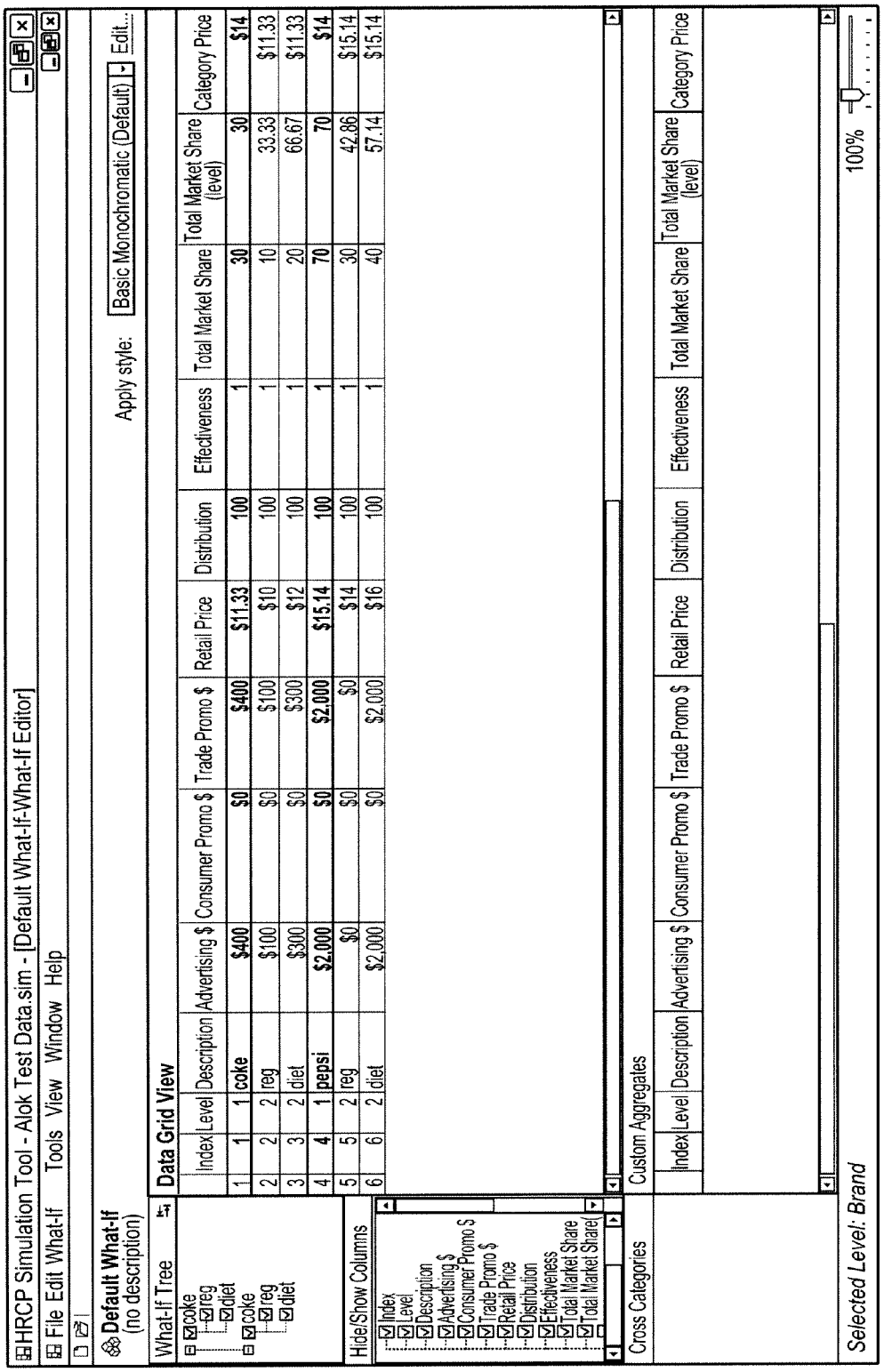
FIGS. 26 and 26A illustrate examples of an interface the system of FIG. 1 may provide to use for performing "what-if" scenario analysis.
Figure 26A:
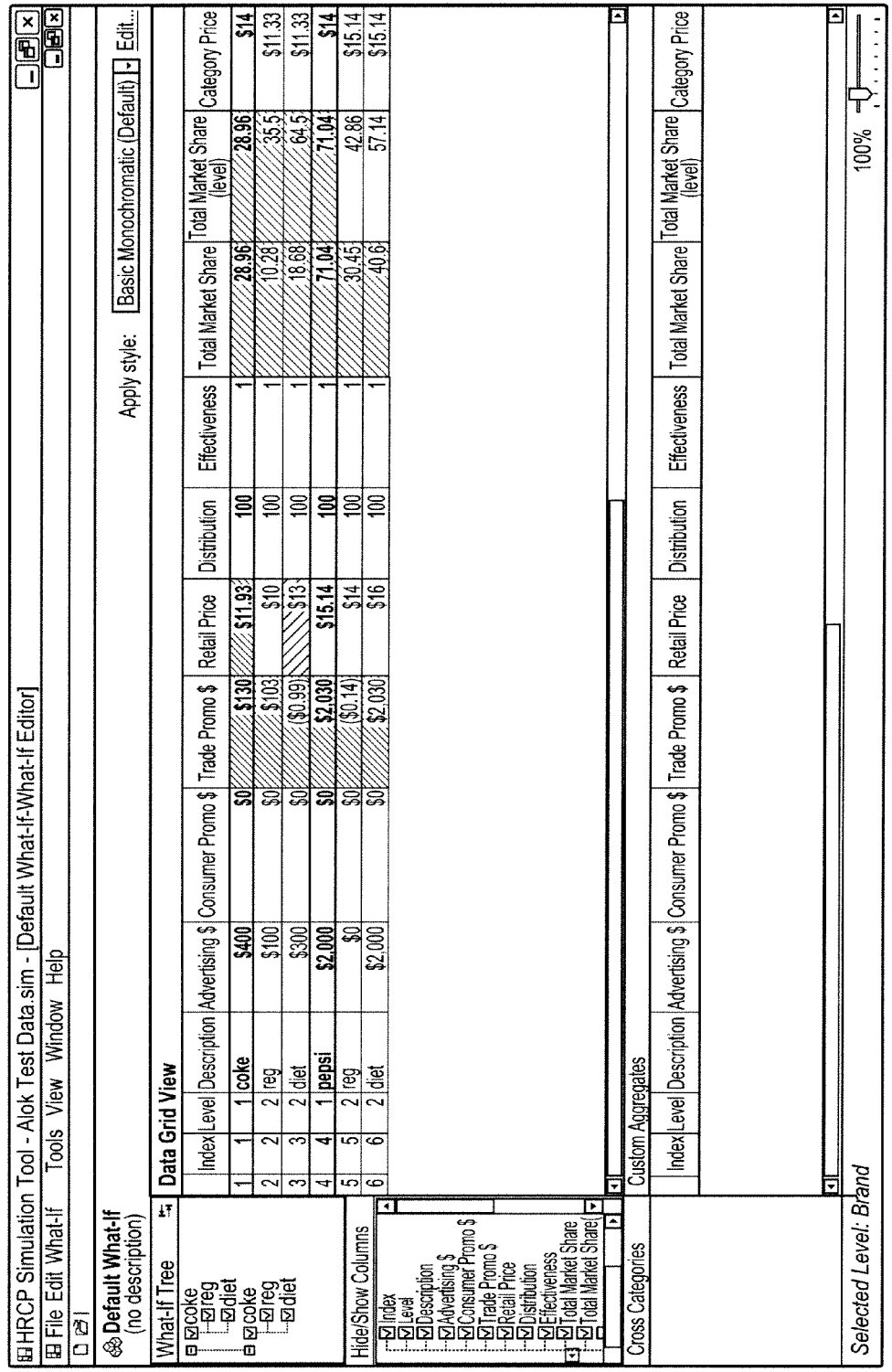
Figure 27:
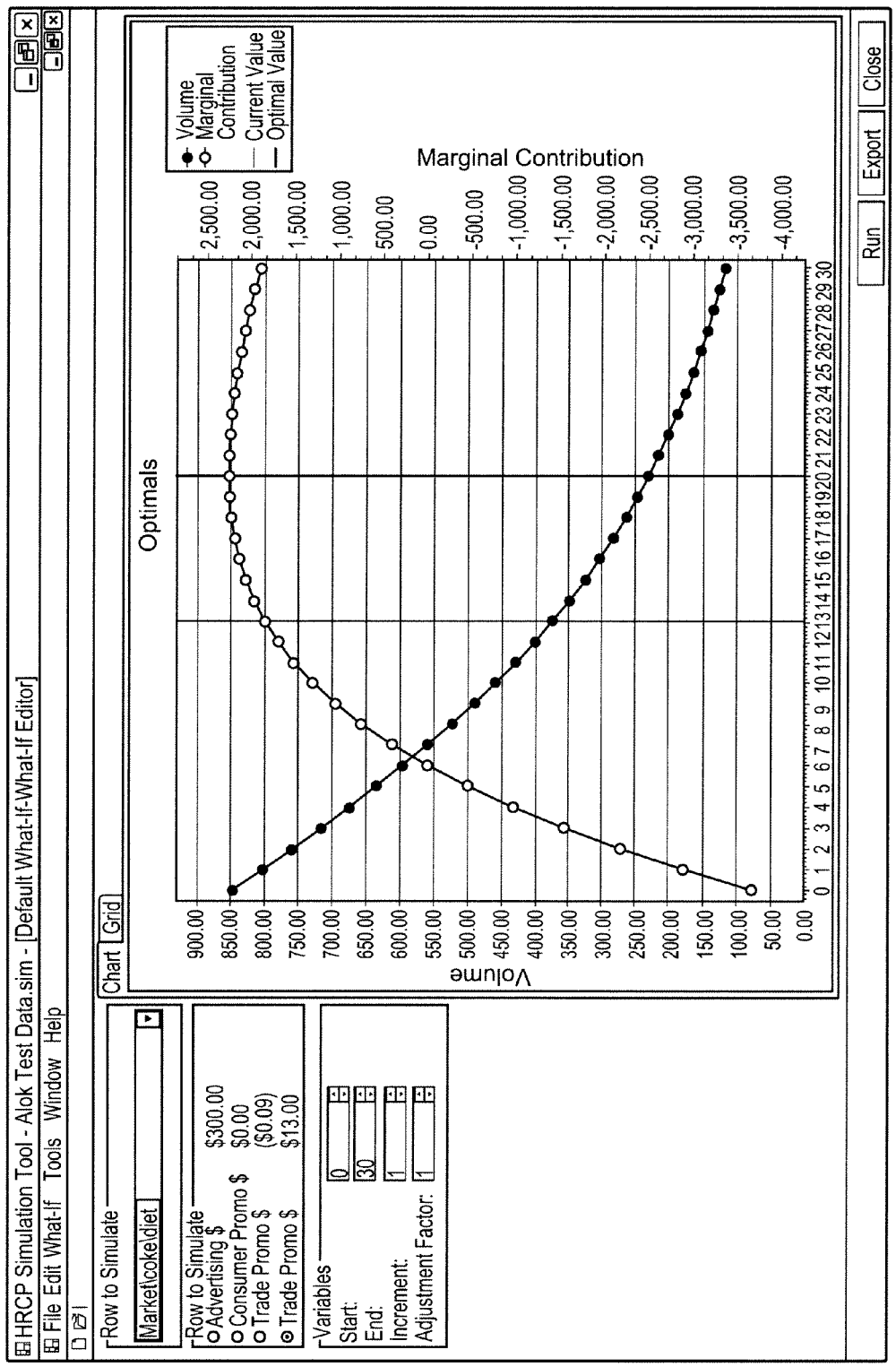
FIG. 27 illustrates several example optimal spending graphs generated by the system of FIG. 1.

FIGS. 25-27 provide further examples of the user interface of the simulation engine 250 and of other components of the 10. In particular, illustrates analysis of several items considered together ("item combos") and several controls the user may operate to select the desired items, specify inclusion and/or exclusion conditions, specify the desired number of transactions to be considered during the analysis, etc. FIGS. 26 and 26A illustrate examples of user interface to facilitate "what-if" scenario analysis. Finally, FIG. 27 provides several example of optimal spending graphs which the system 10 may generate in response to one or several user commands.

Figure 28:
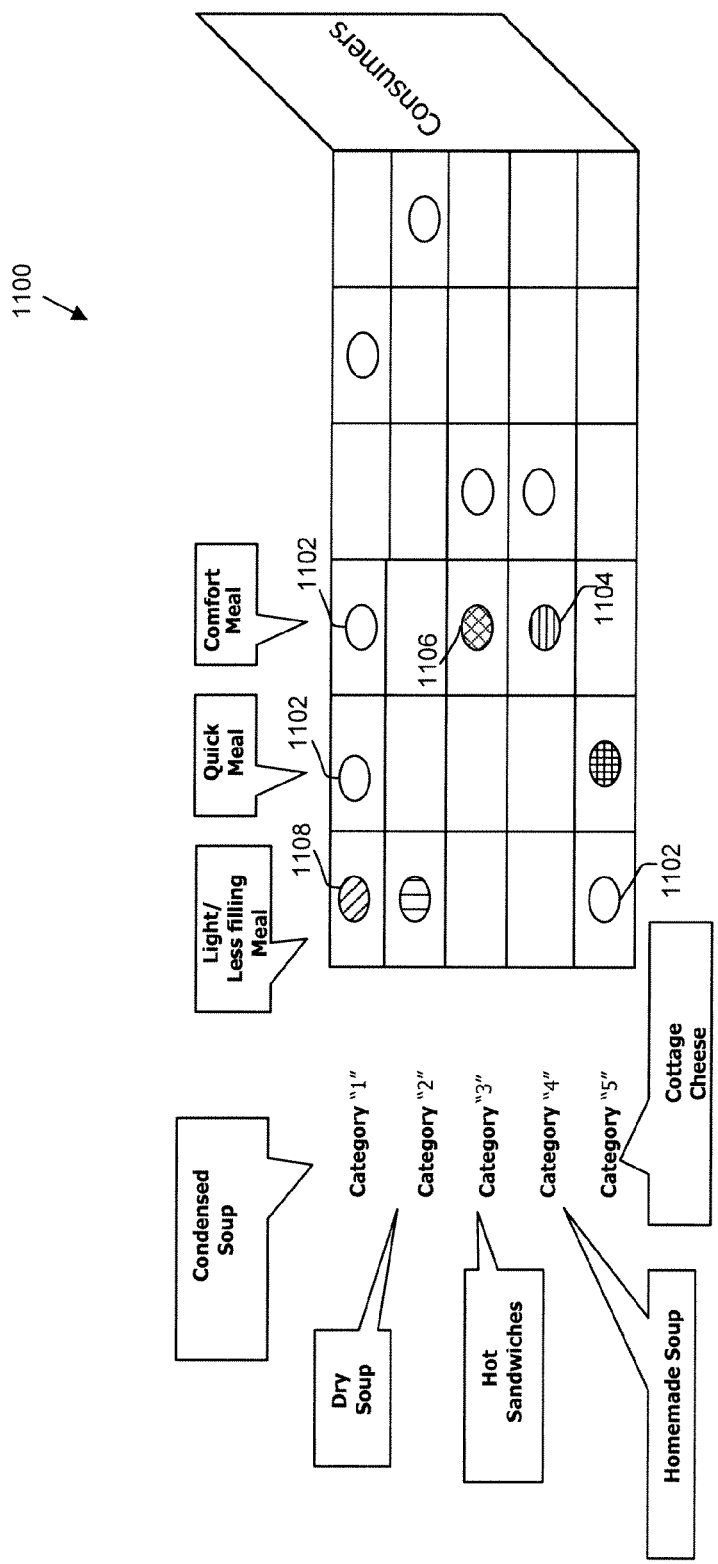
FIG. 28 is an example usage domain matrix developed using the software system of FIG. 1.

FIG. 28 illustrates a diagram 1100 of an example usage domain developed using the software system 10. For each of the categories 1-5, indicators 1102-1108 indicate whether products in the category correspond to usage for the purpose identified in the columns (e.g., light meal, quick meal, comfort meal). The fill patterns of the indicators 1102-1108 correspond to the relative numbers of consumers reporting the respective usage. For example, the usage of condensed soup (category 1) as a light meal may be higher than usage of condensed soup as a quick meal or a comfort meal, as indicated by the indicators 1108 and 1102. Of course, the software system 10 may use indicators 1102-1108 having different shapes, colors, patterns, etc. to reflect the survey data. Preferably, the diagram 1100 is constructed using actual survey data received from the database 17, for example (see FIG. 1).

The diagram 1100 describes competitive situations and usage situations within a broad market (in this example, soups and sandwiches). Based at least in part on the diagram 1100, the user may further identify groups of products that "go together." To this end, the software system 10 links CHAID, correspondence, and cluster analysis.

Figure 29:
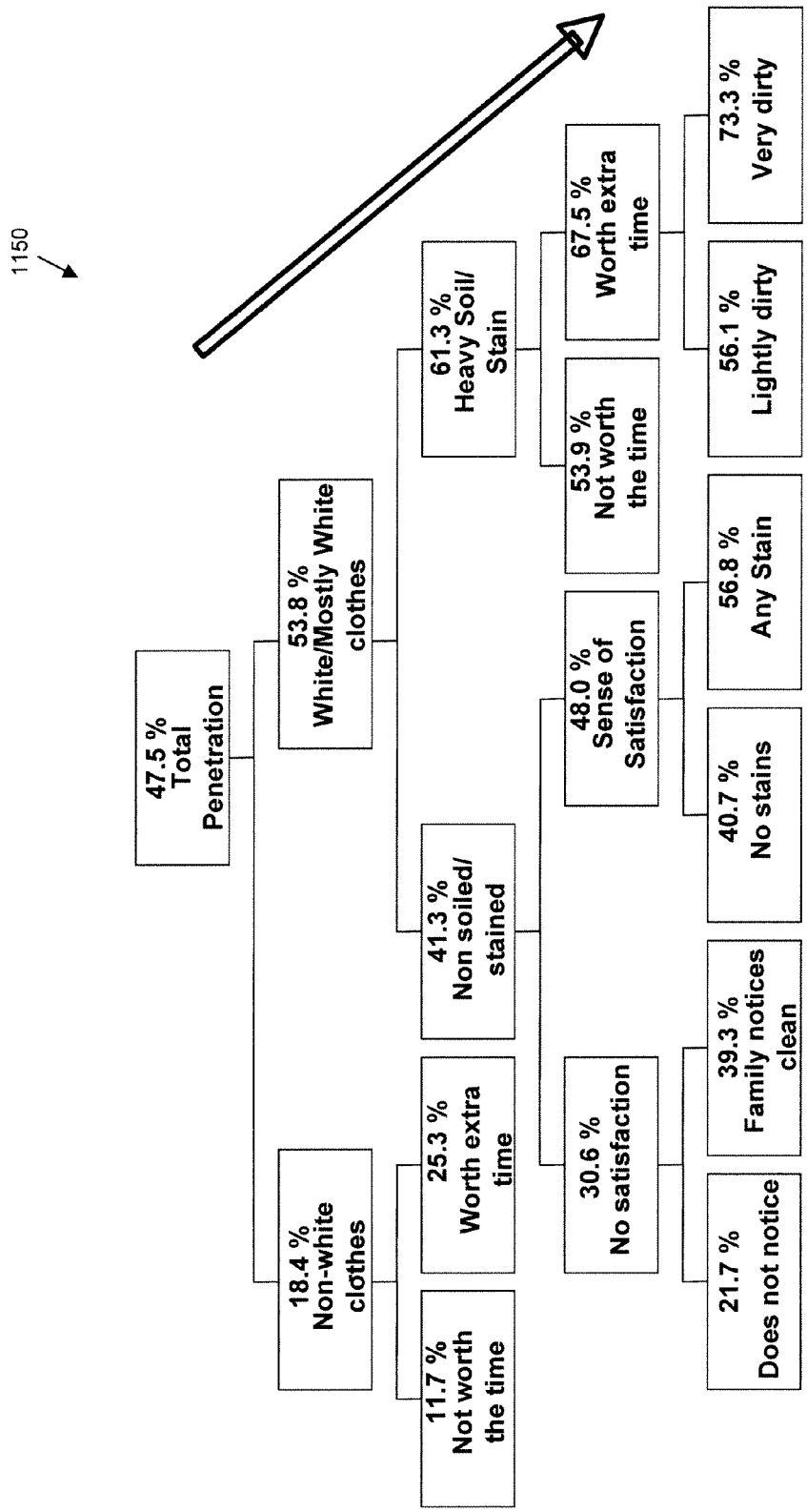
FIG. 29 illustrates an example CHAID analysis diagram.

As is known, CHAID is a branching tree procedure used to explore complex interactive relationships between a certain variable and several predictor variables. Generally speaking, this procedure involves sequentially splitting each predictor variable into two best discriminating groups to ultimately arrive at the best combination of different levels of drivers. FIG. 29 illustrates an example CHAID analysis diagram 1150 developed using survey data for a particular detergent. In this example, 47.5% of all households for which the data is available used the detergent. Using sequential splitting of each predictor variable, key drivers for using the detergent are identified as clothes color (white or non-white), soil/stain condition, effort level, and heavily dirty clothes.

Figure 30:
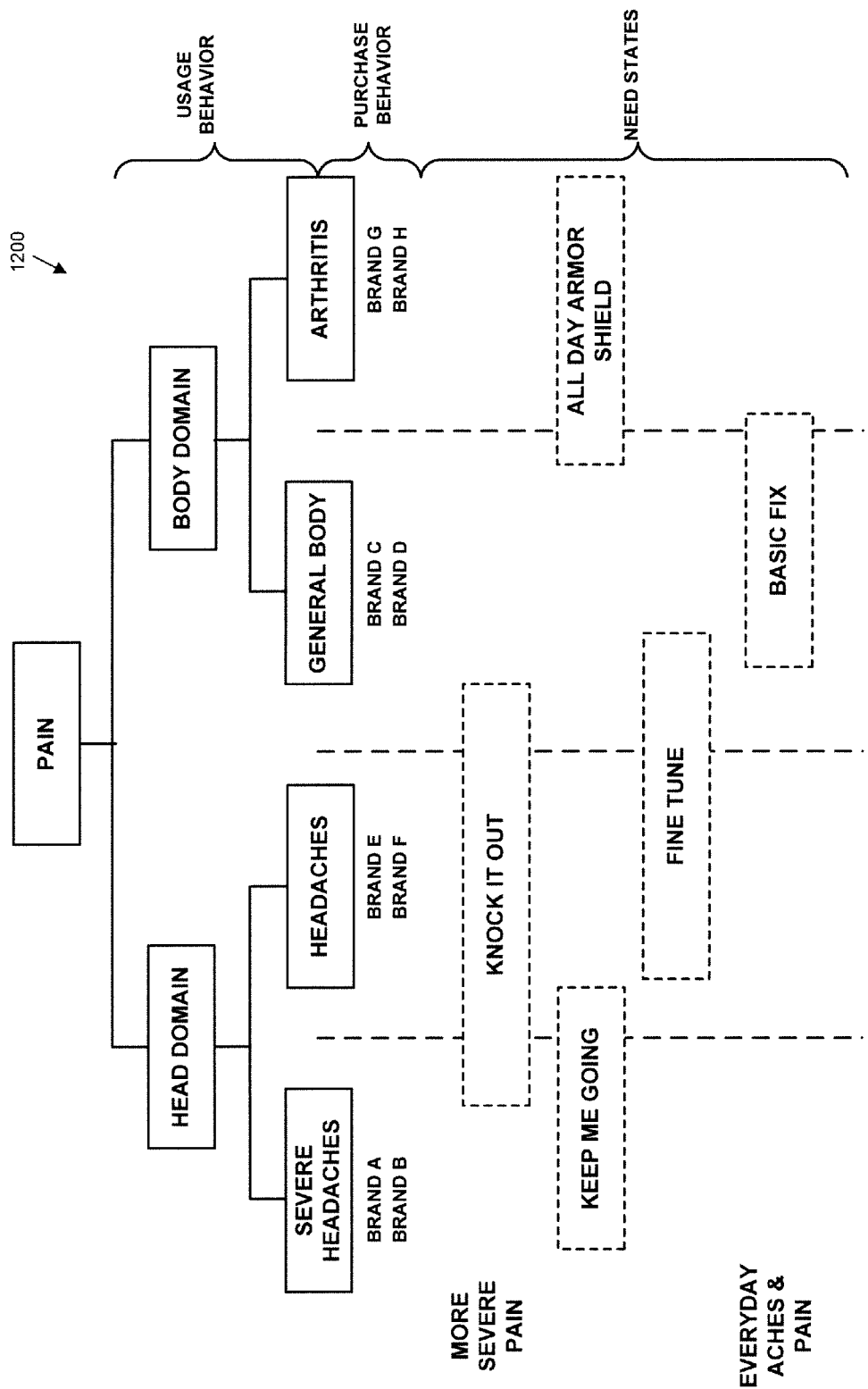
FIG. 30 is an example integrated market map for pain relief medicine.

Next, FIG. 30 illustrates an example of an integrated market map 1200 that illustrates usage behavior, purchase behavior, and need states for a pain reliever. The user 60 may use the software system 10 to construct the map 1200 at a relatively early stage of planning to introduce a new pain reliever to the marketplace. The map 1200, at the topmost level, broad competitive sets, head domain and body domain, that define usage behavior. Purchase behavior at the lower level identifies the most important product attributes within a competitive set, structured according to the techniques discussed above. Further, the map 1200 illustrates need states that provide in-depth understanding of consumer motivation, desire and needs within a competitive set, etc. It will be noted that usage of products for certain purposes may extend across categories. For example, the "keep me going" usage applies to both severe headaches and regular headaches, while the "fine tune" usage applies to headaches and general body aches. It will be further noted that the need states may also be viewed as defining a range from severe pains to everyday aches. The integrated market map 1200 may be constructed using the software system 10. In at least some of the embodiments, the system 10 provides a user interface for generating the convenient layout illustrated in FIG. 29.

Figure 31:
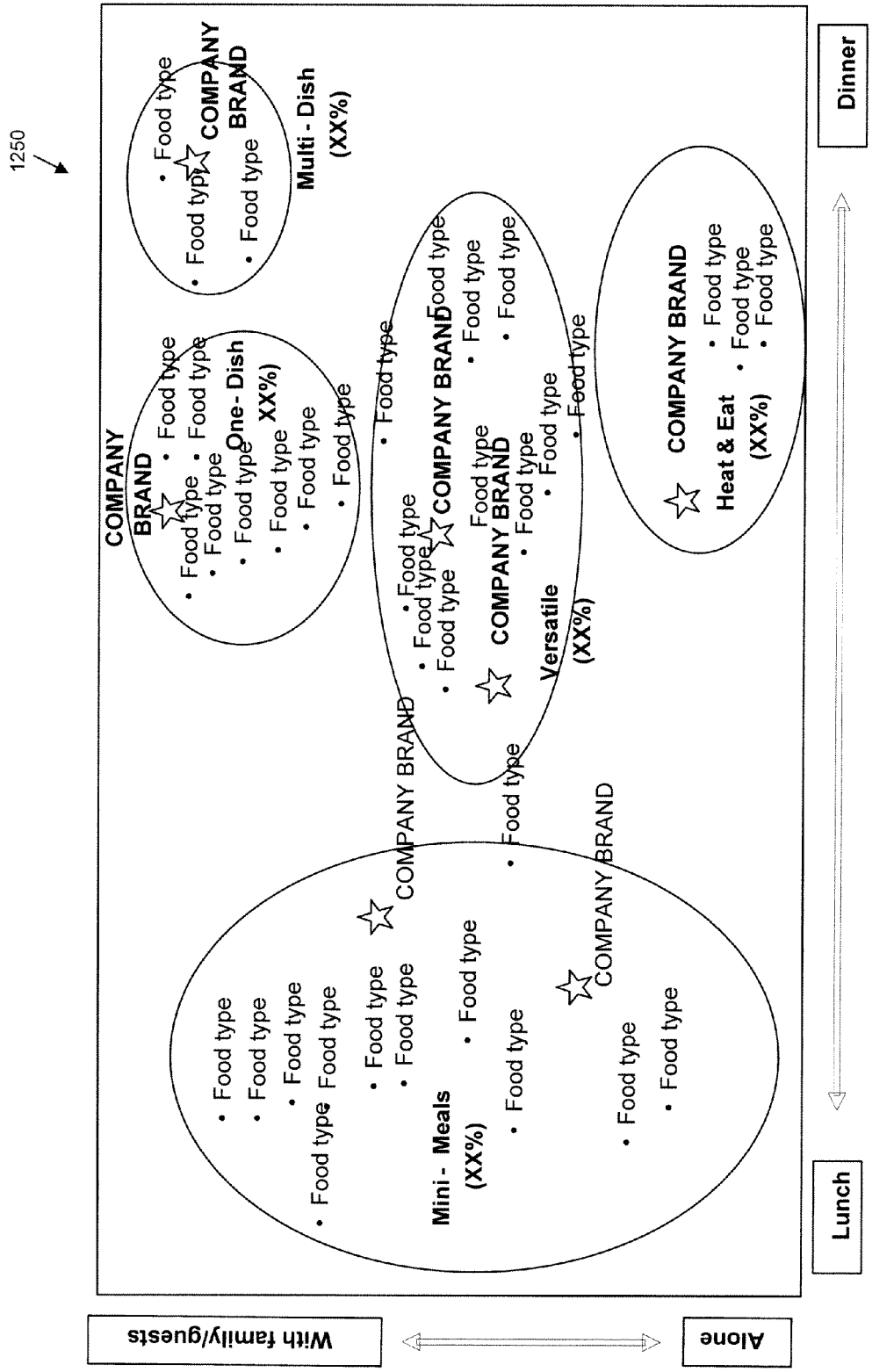
FIG. 31 illustrates an example domain structure diagram describing a certain meal market.

FIG. 31 illustrates a domain structure diagram 1250 that includes a graphical representation of the results of correspondence analysis. Generally speaking, correspondence analysis is an exploratory tool for graphically displaying data as a two-dimensional table to measure correspondence between rows and columns. The measurement can be any indication of usage similarity, affinity, association, or interaction. As illustrated in FIG. 31, similar categories are plotted close to each other, so that a user can easily identify a segmentation scheme. In this sense, diagrams such as the domain structure diagram 1250 define perceptual maps for market definition and brand positioning. The domain structure diagram 1250 illustrates, in part, that there are five main meal domains that vary according to whether the person eats alone and the time of day.

From the foregoing, it will be appreciated that the software system 10 provides a convenient and efficient environment for developing purchase structures that accurately describe competitive relations. In contrast to prior art techniques, purchase structures discussed above, as well as the methods for developing and testing these structures, enable analysts to achieve a high level of accuracy and account for a variety of variables associated with syndicated and survey data. In another aspect, the software system 10 enables analysts to derive key measures from syndicated data, survey data, etc. that may be processed by known statistical analysis software such as the software system 27.

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A non-transitory computer-readable medium of a computer storing a modeling tool adapted for implementation by the computer for developing a hierarchical model of a market associated with a set of competing products, the modeling tool comprising a set of computer-executable instructions that when executed by a processor of the computer cause the computer to implement:
   an item definition module to provide a first display interface, the item definition module configured to generate a plurality of items for use by the modeling tool, and the first display interface configured to receive, from a user, an item definition for each of the plurality of items, wherein each of the item definitions includes one or more product attributes associated with the corresponding item;
   a structure definition module to provide a second display interface, the second display interface configured to receive item selection data and positioning data associated with the plurality of items from the user and the structure definition module configured to execute on the processor to create the hierarchical model defining a plurality of nodes at a multiplicity of levels successively removed from a root node using the received item selection data and the positioning data and to generate a graphical representation of the hierarchical model for display on the second display interface; and
   a structure validation module to detect that there are not errors in the hierarchical market model, the detecting including:
      detecting that all the item definitions associated with any of the plurality of items that are positioned on a first level of the hierarchical market model are mutually exclusive,
      detecting that the positioning data associated with the plurality of items in the hierarchical market model is consistent with the item definition for each item of the plurality of items, and
      detecting that all the item definitions associated with any of the plurality of items that are positioned on a second level of the hierarchical market model exhaust all transactions in a collection of transactions used to create the item definitions.

2. The non-transitory computer-readable medium of claim 1, wherein the item definition module includes an expression builder interface configured to:
   select the one or more product attributes from a first list,
   select a logical operator from a second list,
   automatically form a logical construct including the selected one or more product attributes and the selected logical operator, and
   associate the logical construct with a desired item of the plurality of items.

3. The non-transitory computer-readable medium of claim 1, wherein the item selection data and the positioning data includes:
   a selection of one of the plurality of items, and
   a selection of a parent node of the hierarchical model to which the selected one of the plurality of items is being added;
   wherein the structure definition module generates a new node under the parent node and associates the new node with the one or more product attributes of the selected one of the plurality of items and with the one or more product attributes of the parent node.

4. The non-transitory computer-readable medium of claim 1, wherein the structure validation module is further configured to detect errors by checking whether any of the item definitions, the item selection data, or the positioning data violates a predefined rule.

5. The non-transitory computer-readable medium of claim 1, wherein the hierarchical model is a mathematical description of projected competitive relations within the set of competing products, wherein each node at a respective one of the multiplicity of levels corresponds to a series of choices of product attributes at each previous one of the multiplicity of levels, and wherein a first pair of nodes at a first one of the multiplicity of levels predicts a higher degree of switching between products corresponding to the first pair of nodes than a second pair of nodes at a second one of the multiplicity of levels, if the second one of the multiplicity of levels is closer to the root node than the first one of the multiplicity of levels.

6. The non-transitory computer-readable medium of claim 5, further comprising:
   a data import module configured to:
      receive transaction data corresponding to a plurality of consumer transactions associated with the set of competing products, and
      apply the transaction data to the hierarchical model to assess a quality of prediction of the hierarchical model.

7. A method for developing an hierarchical model of a market associated with a set of competing products, wherein the hierarchical model is stored as data in a computer readable memory, the method comprising:
   (1) providing a first display interface configured to receive, from a user, an item definition for each of a plurality of items, wherein each of the item definitions includes, one or more product attributes associated with the item;
   (2) providing a second display interface configured to receive, from the user, item selection data and positioning data associated with the plurality of items;
   (3) creating the hierarchical model defining a plurality of nodes at a multiplicity of levels successively removed from a root node using the received item selection data and the positioning data;
   (4) generating a graphical representation of the hierarchical model for display on the second display interface; and
   (5) validating that there are not errors in the hierarchical market model, including:
      detecting that all the item definitions associated with any of the plurality of items that are positioned on a first level of the hierarchical market model are mutually exclusive, detecting that the positioning data associated with the plurality of items in the hierarchical market model is consistent with the item definition for each item of the plurality of items, and detecting that all the item definitions associated with any of the plurality of items that are positioned on a second level of the hierarchical market model exhaust all transactions in a collection of transactions used to create the item definitions;

wherein steps (1) to (5) are performed using one or more processors.

8. The method of claim 7, wherein the first display interface includes an expression builder interface configured to:

select the one or more product attributes from a first list, select a logical operator from a second list, automatically form a logical construct including the selected one or more product attributes and the selected logical operator, and associate the logical construct with a desired item of the plurality of items.

9. The method of claim 7, wherein the item selection data and the positioning data includes:

a selection of one of the plurality of items, and a selection of a parent node of the hierarchical model to which the selected one of the plurality of items is being added;

wherein the method further comprises:

generating a new node under the parent node; and associating the new node with the one or more product attributes of the selected one of the plurality of items and with the one or more product attributes of the parent node.

10. The method of claim 7, wherein validating that there are not errors in the hierarchical market model includes checking whether any of the item definitions, the item selection data, or the positioning data violates a predefined rule.

11. The method of claim 7, wherein the hierarchical model is a mathematical description of projected competitive relations within the set of competing products, wherein each node at a respective one of the multiplicity of levels corresponds to a series of choices of product attributes at each previous one of the multiplicity of levels, and wherein a first pair of nodes at a first one of the multiplicity of levels predicts a higher degree of switching between products corresponding to the first pair of nodes than a second pair of nodes at a second one of the multiplicity of levels, if the second one of the multiplicity of levels is closer to the root node than the first one of the multiplicity of levels.

12. The method of claim 11, further comprising:

receiving transaction data corresponding to a plurality of consumer transactions associated with the set of competing products; and applying the transaction data to the hierarchical model to assess a quality of prediction of the hierarchical model.

* * * * *